US012277562B1

(12) United States Patent
Medure et al.

(10) Patent No.: US 12,277,562 B1
(45) Date of Patent: Apr. 15, 2025

(54) DECENTRALIZED CRYPTOGRAPHIC ASSET EXCHANGE WITH SECURE INTERACTIVE ELEMENT

(71) Applicant: Block, Inc., Oakland, CA (US)

(72) Inventors: Rocky Medure, Pittsburgh, PA (US); Christopher Walker, New York, NY (US)

(73) Assignee: Block, Inc., Oakland, CA (US)

( * ) Notice: Subject to any disclaimer, the term of this patent is extended or adjusted under 35 U.S.C. 154(b) by 130 days.

(21) Appl. No.: 17/865,158

(22) Filed: Jul. 14, 2022

(51) Int. Cl.
*G06Q 20/40* (2012.01)
(52) U.S. Cl.
CPC ..... *G06Q 20/4015* (2020.05); *G06Q 20/4014* (2013.01); *G06Q 2220/00* (2013.01)
(58) Field of Classification Search
CPC .................................................. G06Q 20/4015
See application file for complete search history.

(56) References Cited

U.S. PATENT DOCUMENTS

| 5,629,981 | A  | 5/1997  | Nerlikar       |
| 5,992,570 | A  | 11/1999 | Walter et al.  |
| 6,473,500 | B1 | 10/2002 | Risafi et al.  |
| 7,096,003 | B2 | 8/2006  | Joao et al.    |
| 7,711,620 | B2 | 5/2010  | Abifaker       |
| 7,953,654 | B2 | 5/2011  | Abifaker       |
| 7,983,951 | B2 | 7/2011  | Frohwein et al.|
| 8,065,226 | B2 | 11/2011 | Rizzo et al.   |
| 8,160,943 | B2 | 4/2012  | Smith et al.   |
| 8,175,972 | B2 | 5/2012  | Galit et al.   |
| 8,220,706 | B1 | 7/2012  | Miller et al.  |
| 8,326,770 | B1 | 12/2012 | Weisman        |
| 8,407,121 | B2 | 3/2013  | Paintin        |
| 8,412,630 | B2 | 4/2013  | Ross et al.    |
| 8,494,960 | B2 | 7/2013  | Galit et al.   |
| 8,538,845 | B2 | 9/2013  | Liberty        |

(Continued)

FOREIGN PATENT DOCUMENTS

| CA | 3138222       | * | 1/2020 | ............. G06Q 20/40 |
| WO | 2016/157114 A1|   | 10/2016|                          |

OTHER PUBLICATIONS

Yazici, et al., in "Next-Generation Payment System for Device-to-Device Content and Processing Sharing," from Sensors, 2022 (Year: 2022).*

(Continued)

*Primary Examiner* — Olabode Akintola
*Assistant Examiner* — Brandon M Duck
(74) *Attorney, Agent, or Firm* — Polsinelli PC

(57) ABSTRACT

A payment service system receives a request from a user's device for an exchange between a first asset (e.g., a fiat currency) and a second asset (e.g., a cryptocurrency) via an agent, and identifies the agent based on context of the request. The system generates an interactive element, provides the interactive element to the user's device, and detects when the agent's device interacts with the interactive element on the user's device. The system verifies respective identities of the user and the agent based on the interaction. The system verifies that the first asset has been transferred between the user and the agent, and facilitates transfer of the second asset between an account associated with the user and an account associated with the agent and/or the payment service system.

20 Claims, 13 Drawing Sheets

(56) References Cited

U.S. PATENT DOCUMENTS

| | | |
|---|---|---|
| 8,538,879 B2 | 9/2013 | Galit et al. |
| 8,548,334 B2 | 10/2013 | Mazed |
| 8,560,436 B2 | 10/2013 | Ingram et al. |
| 8,566,203 B1 | 10/2013 | Vieira et al. |
| 8,632,000 B2 | 1/2014 | Laracey |
| 8,694,401 B2 | 4/2014 | Stewart |
| 9,047,600 B2 | 6/2015 | Zhou et al. |
| 9,135,612 B1 | 9/2015 | Proctor, Jr. et al. |
| 9,202,250 B1 | 12/2015 | Palaniappan |
| 9,300,676 B2 | 3/2016 | Madhu et al. |
| 9,519,901 B1 | 12/2016 | Dorogusker |
| 9,552,573 B2 | 1/2017 | Kulpati et al. |
| 9,626,664 B2 | 4/2017 | Bouey et al. |
| 9,647,998 B2 | 5/2017 | Ronca |
| 9,665,858 B1 | 5/2017 | Kumar |
| 9,743,261 B2 | 8/2017 | Todasco |
| 9,767,503 B2 | 9/2017 | Grigg et al. |
| 9,786,005 B1 | 10/2017 | Poursartip et al. |
| 9,836,727 B1 | 12/2017 | Brennan et al. |
| 9,875,471 B1 | 1/2018 | Myrick et al. |
| 9,911,114 B2 | 3/2018 | Rackley, III et al. |
| 9,961,076 B2 | 5/2018 | Stoops et al. |
| 9,978,068 B2 | 5/2018 | Butterfield et al. |
| 9,978,076 B2 | 5/2018 | Mathew et al. |
| 9,984,412 B1 | 5/2018 | Poursartip et al. |
| 10,026,076 B2 | 7/2018 | Kumar et al. |
| 10,027,684 B1 | 7/2018 | Paterson et al. |
| 10,043,162 B1 | 8/2018 | Renke et al. |
| 10,108,940 B2 | 10/2018 | Kosloski et al. |
| 10,163,171 B1 | 12/2018 | Vippagunta et al. |
| 10,217,093 B2 | 2/2019 | Trivedi et al. |
| 10,223,707 B2 | 3/2019 | Granville, III |
| 10,354,246 B1 | 7/2019 | Janiga |
| 10,373,281 B2 | 8/2019 | Lutnick et al. |
| 10,510,066 B2 | 12/2019 | Lovett |
| 11,308,481 B1 | 4/2022 | Thomas et al. |
| 2002/0049644 A1 | 4/2002 | Kargman |
| 2002/0170959 A1 | 11/2002 | Madani |
| 2003/0144956 A1 | 7/2003 | Yu, Jr. et al. |
| 2003/0216960 A1 | 11/2003 | Postrel |
| 2003/0233278 A1 | 12/2003 | Marshall |
| 2004/0068552 A1 | 4/2004 | Kotz et al. |
| 2004/0267667 A1 | 12/2004 | Ohara |
| 2005/0177537 A1 | 8/2005 | Thompson |
| 2006/0025159 A1 | 2/2006 | Estevez et al. |
| 2006/0206709 A1 | 9/2006 | Abrou et al. |
| 2007/0005467 A1 | 1/2007 | Jethrow |
| 2007/0092112 A1 | 4/2007 | Awatsu et al. |
| 2009/0024506 A1 | 1/2009 | Houri |
| 2010/0114677 A1 | 5/2010 | Carlson et al. |
| 2011/0016047 A1 | 1/2011 | Wu et al. |
| 2011/0238573 A1 | 9/2011 | Varadarajan |
| 2011/0251956 A1 | 10/2011 | Cantley et al. |
| 2012/0173311 A1 | 7/2012 | Chang et al. |
| 2012/0239570 A1 | 9/2012 | Wolfs et al. |
| 2013/0031009 A1 | 1/2013 | Kapoor et al. |
| 2013/0046589 A1 | 2/2013 | Grigg et al. |
| 2013/0046697 A1 | 2/2013 | Schibuk |
| 2013/0054369 A1 | 2/2013 | Grigg et al. |
| 2013/0085931 A1 | 4/2013 | Runyan |
| 2013/0124411 A1 | 5/2013 | Kobres et al. |
| 2013/0178233 A1 | 7/2013 | McCoy et al. |
| 2013/0191232 A1 | 7/2013 | Calman et al. |
| 2013/0232064 A1 | 9/2013 | Bosch |
| 2013/0238497 A1 | 9/2013 | Ramachandran et al. |
| 2013/0262303 A1 | 10/2013 | Metral |
| 2013/0290172 A1 | 10/2013 | Mashinsky |
| 2014/0156435 A1 | 6/2014 | Rahman et al. |
| 2014/0156512 A1 | 6/2014 | Rahman et al. |
| 2014/0195427 A1 | 7/2014 | Reeve et al. |
| 2014/0195436 A1 | 7/2014 | Schleicher |
| 2014/0235205 A1 | 8/2014 | Paluch et al. |
| 2014/0279490 A1 | 9/2014 | Calman et al. |
| 2014/0335787 A1 | 11/2014 | Smadi et al. |
| 2014/0337138 A1 | 11/2014 | Chitalia et al. |
| 2015/0001289 A1 | 1/2015 | Smith et al. |
| 2015/0235190 A1 | 8/2015 | Urban |
| 2015/0254655 A1 | 9/2015 | Bondesen et al. |
| 2015/0302411 A1 | 10/2015 | Bondesen et al. |
| 2015/0339638 A1 | 11/2015 | DeLuca |
| 2016/0078417 A1 | 3/2016 | Deluca et al. |
| 2016/0104140 A1 | 4/2016 | Harrow et al. |
| 2017/0004503 A1 | 1/2017 | Yalamanchili |
| 2017/0124542 A1 | 5/2017 | Sharan |
| 2017/0124551 A1 | 5/2017 | Chitalia et al. |
| 2018/0005223 A1 | 1/2018 | Terra et al. |
| 2018/0096323 A1 | 4/2018 | Baber et al. |
| 2018/0096351 A1 | 4/2018 | Dahn |
| 2018/0204204 A1 | 7/2018 | Giraudo et al. |
| 2019/0005473 A1 | 1/2019 | De Villiers et al. |
| 2019/0220851 A1 | 7/2019 | Barnes et al. |
| 2021/0304571 A1 | 9/2021 | Sanghvi |
| 2022/0012326 A1* | 1/2022 | Ratnakaram ............ G06F 21/44 |
| 2022/0179989 A1* | 6/2022 | Hay ....................... G06F 21/62 |
| 2022/0188812 A1* | 6/2022 | Peterson ................ G06Q 20/38 |

OTHER PUBLICATIONS

Chen et al., "NFC Mobile Transactions and Authentication Based on GSM Network," Second International Workshop on Near Field Communication, 2010, pp. 83-89, (Year: 2010).

Buczkowski, A., "Location-based marketing," The Academic Framework, pp. 1-77 (Feb. 2012).

Wikipedia, "Payday Loan", Sep. 20, 2016. https://en.wikipedia.org/w/index.php?title=Payday_loan&oldid=740410133 (Year:2016).

Wolfe, D., "An E-Variation on Payday Loan Theme", American Banker. Published Jul. 28, 2005,https://www.americanbanker.com/news/an-e-variation-on-payday-loan-theme (Year: 2005).

* cited by examiner

DECENTRALIZED CRYPTOGRAPHIC ASSET EXCHANGE WITH SECURE INTERACTIVE ELEMENT

TECHNICAL FIELD

Distributed ledger technologies, such as blockchain, are used for various functions, such as mining, minting, transferring, and tracking of digital assets such as cryptocurrencies and non-fungible tokens (NFTs). Cryptocurrencies, such as Bitcoin®, are digital currencies. Cryptocurrencies do not include any physical coins or bills, as fiat currencies do.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features. Moreover, multiple instances of the same part are designated by a common prefix, in some cases separated from the instance number by a dash and/or parentheses. The drawings are not to scale.

DETAILED DESCRIPTION

Figure 1:
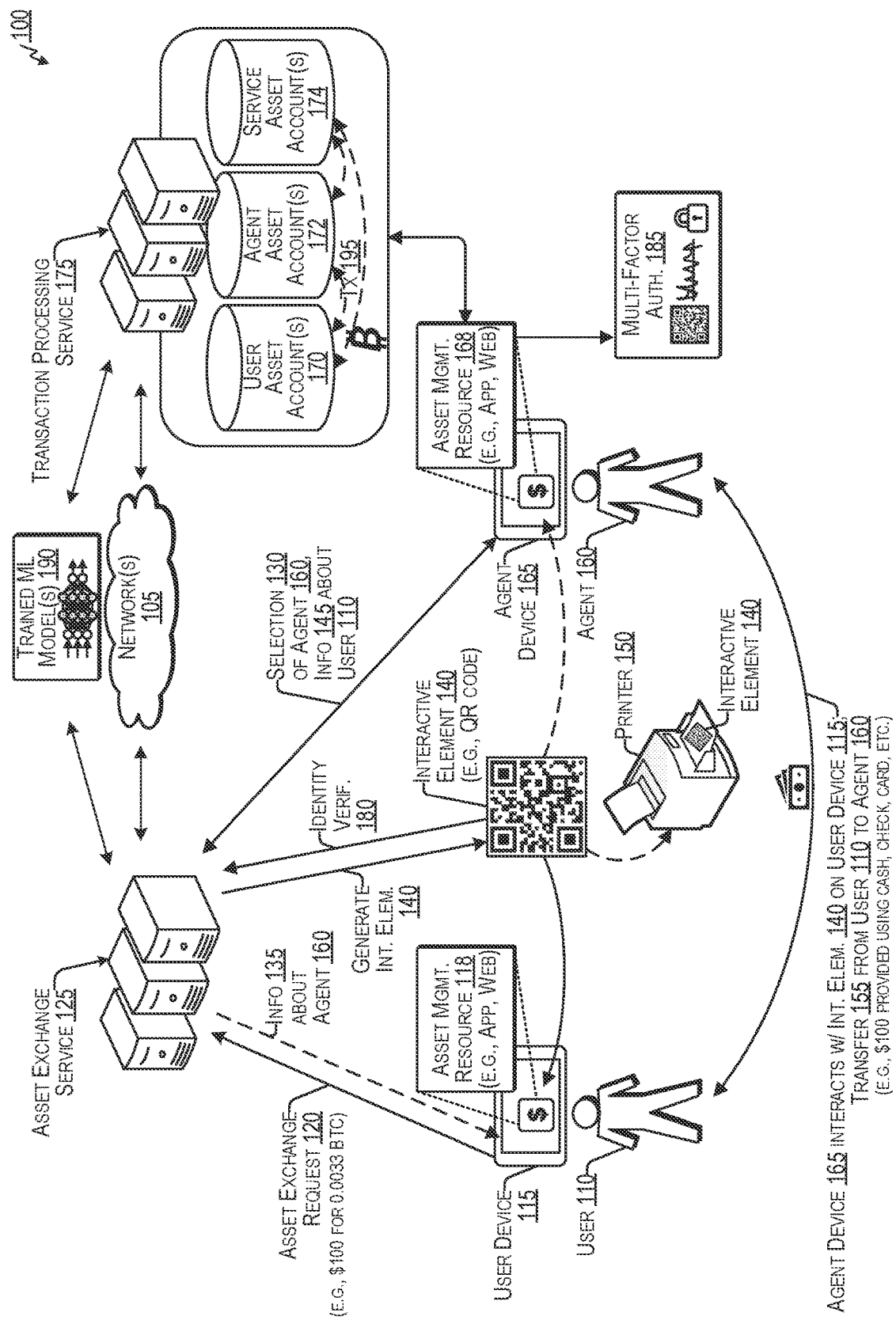
FIG. 1 is a block diagram illustrating an architecture of an asset exchange service system, in accordance with some examples.

Techniques and systems for asset exchange are described herein. In at least one example, at least one asset exchanged can be a digital asset that is based on blockchain technology and cryptography, such as cryptocurrency (e.g., Bitcoin, Ethereum, Tether, stablecoins, etc.). In additional or alternative examples, assets that can be exchanged can include fiat currency, stocks, bonds, non-fungible tokens, or the like. Cryptocurrencies can provide various benefits over fiat currencies, for instance providing secure and rapid transfers, with immutable and verifiable records of transfers kept in distributed ledgers. However, the digital nature of cryptocurrencies and other digital assets can make it difficult for some users to exchange cryptocurrencies and other digital assets for fiat currencies or other physical assets. For instance, users with limited computer literacy, users with limited access to computing devices, or users in regions in which cryptocurrencies have not yet become accessible, may be unable to perform such exchanges.

The techniques and systems for asset exchange that are described herein include an interactive element generated and used for identity verification and for facilitating the asset exchange. In at least one example, the interactive element can be encoded with data that is used to verify identities and/or otherwise facilitate the secure exchange of assets. That is, techniques and systems described herein relate to a decentralized cryptographic asset exchange using a secure interactive element.

Techniques and systems described herein describe a payment service system. In an example, the payment service system receives a request from a user's device for an exchange between a first asset and a second asset via an agent. In some examples, the first asset and second asset can respectively be a fiat currency and a cryptocurrency, or vice versa. The payment service system identifies the agent based on context of the request, for instance based on location(s) of the user's device and/or the agent's device, transactions histories, and the like. The payment service system generates an interactive element and provides the interactive element to the user's device. In some examples, the interactive element can include an optical glyph, such as a quick response (QR) code or a barcode, that optically encodes information, such as account information corresponding to an account associated with the user. The payment service system detects when the agent's device interacts with the interactive element on the user's device, for instance by receiving an indication that the agent's device has interacted with the interactive element. In some examples, the indication can be received from the agent's device. In some examples, the indication can be received from a server that is configured to serve information at a network location identified by a resource identifier encoded in the interactive element. The payment service system verifies respective identities of the user and the agent based on the interaction, the indication, information associated with the interaction, and/or information associated with the indication. The payment service system verifies that the agent has received the first asset from the user. The payment service system facilitates transfer of the second asset to an account associated with the user. In some examples, the account associated with the user may be indicated by information encoded in the interactive element.

As described above, techniques and systems described herein leverage a connected network of computing devices associated with the payment service system to connect a user to a nearby, or otherwise contextually relevant, trusted agent to facilitate an exchange of assets. In an example, the payment service system can generate an interactive element (e.g., barcode, QR code, etc.) that the user can present, via a user device, to the agent and that the agent, via a user device, can scan or otherwise interact with. This allows the payment service system to verify both the user's identity and the agent's identity, and to ensure that the correct parties are meeting, before any assets are exchanged. In an example, the user can give the agent fiat currency, and can automatically receive cryptocurrency from an account associated with the payment service system to their own account, in exchange. That is, by physically handing fiat currency to the agent, the user can have cryptocurrency added to their account with the payment service system. Similarly, the user can receive fiat currency from the agent, and cryptocurrency can be automatically withdrawn from an account associated with the user to an account associated with the payment service system and/or the agent, in exchange. That is, by physically receiving fiat currency from the user, the agent can have cryptocurrency withdrawn from their account with the payment service system. This exchange can be triggered by the interaction with the interactive element and facilitated by the payment service system.

The techniques and systems for asset exchange described herein provide various improvements over traditional asset exchange techniques and systems. For instance, one technical problem is a lack of security with traditional asset exchange techniques. Traditional asset exchange techniques generally provide little or no verification as to identity of the parties performing the exchange. The systems and methods described herein provide a technical solution for this technical problem by providing multiple factors of authentication (e.g., two-factor authentication or N-factor authentication, where N is greater than or equal to two). As an example, a first factor of authentication can be based on the use of an interactive element to verify the identities of the user and the agent. In some examples, location data and/or device data can be used as an additional factor of authentication to verify that the authorized parties are present for the exchange, and using the authorized devices. In some examples, the interactive element can encode information that may be used to authenticate the exchange, such as an encrypted security verification dataset that may be authenticated by decrypting the encrypted security verification dataset and comparing the decrypted security verification dataset to a previously-stored reference instance of the security verification dataset. This multi-factor authentication can provide a specific improvement to authentication that increases security, prevents unauthorized asset exchanges and transfers, can be easy for end users (e.g., the user and the agent) to implement, and can be performed using low-complexity user devices and/or agent devices, since, at least in some examples, much of the complexity can be performed at the server level (e.g., by one or more remote server computing devices). In some examples, the interactive element can be generated with certain restrictions to further improve security, for instance to be temporarily usable for up to a threshold number of transactions, to be temporarily usable for up to a threshold amount of asset(s) in deposits and/or withdrawals and/or transfers and/or exchanges, to only be usable as long as the user device remains within a particular area (e.g., based on geolocation), to be temporarily usable until a particular threshold time, or a combination thereof. The authentication can further be improved by basing a further layer of authentication on tracking location(s) of the user devices of the two end users (e.g., the user and the agent) for a time period associated with the transaction, for instance to know when to present the interactive element, and/or to further verify that the in-person portion of the exchange took place based on the locations of the user devices being in proximity to one another (e.g., within a predetermined range). This authentication, using an interactive element as described herein, therefore provides improvements to authentication in association with asset exchanges.

The techniques and systems described herein can provide further technical improvements by monitoring and tracking transaction data in real time to generate trust signals and/or risk signals for the parties to a transaction. For instance, the systems described herein can monitor and track various transactions that various users are involved in over time, and can collect reviews, ratings, comments, and/or other feedback about the users from other users involved in those transactions. The systems described herein can also automatically detect potential fraud attempts or other issues with certain transactions. The systems described herein can generate scores for each of the users based on such feedback and/or issues with transactions. The systems described herein can show indications of those scores to other users as indications of trust or risk. For instance, if a good score (e.g., a score above a threshold) for an agent is shown to a user, the user can feel confident in initiating an exchange with that agent. On the other hand, if a bad score (e.g., a score below the threshold) for an agent is shown to a user, the user can know to proceed with caution in initiating an exchange with that agent, or can choose a different agent. Thus, monitoring and tracking transaction data in real time to generate trust signals and/or risk signals can improve user safety, and result and more secure and efficient exchanges.

Another technical problem that the techniques and systems described herein overcome is the lack of flexibility in traditional asset exchange techniques and systems. For instance, traditional asset exchange techniques can be limited to exchanges at banks or other financial institutions, during bank business hours. Traditional asset exchange techniques can be limited in which types of assets can be transferred, for example generally not being able to transfer cryptocurrencies, NFTs, or other classes of digital assets. The technical solution presented by the techniques and systems described herein includes generation and/or use of one or more interactive element(s) and use of distributed ledgers that provide for customized exchanges at customized times, for any type of asset, including for cryptocurrencies, NFTs, or other classes of digital assets. The interactive element(s) can further securely encode account identifier(s) associated with cryptocurrency wallets, NFT wallets, and the like, without allowing users to steal such information.

In some examples, the techniques and systems described herein further provide multiple customized interactive elements that each automate exchange of the assets in different ways (e.g., into different accounts, as different asset types, through different networks and/or using different protocols, etc.) as indicated by data encoded in the interactive element. In some cases, the techniques and systems described herein intelligently and automatically select the one or more accounts that the assets for the exchange should be drawn from and/or deposited into, the networks and/or protocols used to facilitate the exchange, and/or the agent for the exchange, based on context (e.g., who is the user, who is the agent, where is the user, where is the agent, user exchange history, agent exchange history, user trust signals, agent trust signals, etc.) and without further input from the user. In some examples, such context can be analyzed using one or more rules, heuristics, machine learning models, and/or the like. In this way, the techniques and systems described herein describe a more customized, automated, and flexible asset exchange technology than traditional asset exchange technologies, which were very limited.

Another technical problem that the techniques and systems described herein overcome is the lack of speed in traditional asset exchange technologies and systems. For instance, traditional asset exchange technologies and systems can involve a delay and/or holding period before the funds association with the exchange are transferred. Some delays or holding periods may be imposed by governmental and/or regulatory agencies to allow such agencies to perform security verifications on the parties to the transaction, and/or to verify the validity of the transaction itself. Some delays may be caused by consensus mechanisms (e.g., proof of work) associated with distributed systems, which can include requiring miner systems to correctly solve cryptographic puzzles (e.g., computing various hashes to determine which randomized nonce value(s) result in a hash with a value that is less than a target), particularly in traditional blockchain-based exchanges and/or traditional cryptocurrency exchanges. The technical solution presented by the techniques and systems described herein includes transferring funds from holding account(s) associated with the payment service (e.g., to the user's account), automatically and/or rapidly indicating exchanges and/or transfers using one or more internal ledgers, and/or refunding the holding account(s) associated with the payment service for the advance from the agent's account. The techniques and systems described herein can perform security verifications on the parties to the transaction and/or verify the validity of the transaction itself automatically based on data from the parties to the transaction. These verifications can be faster and more effective than traditional asset exchange technologies and systems based on the large quantity of historical data and/or transaction data about both parties that is available to the described systems, and based on use of face-to-face verification (e.g., between a user and an agent) as an additional layer of verification, for instance for identity verification and as a double-check of the various automated verifications. These verifications can also be performed by the described systems without delays associated with mining and/or consensus mechanisms.

In these ways, the payment service systems described herein can bypass slow systems associated with securities exchanges, cryptocurrency exchanges, and so forth, to bypass these delays and/or holding periods. In some cases, delays and/or holding periods can be used by such systems to check if an exchange and/or transfer potentially violates any rules or laws before allowing the exchange and/or transfer to go through, whether the exchange and/or transfer is high or low risk, and/or whether the exchange and/or transfer or includes any errors. The payment service system described herein can, in some cases, quickly perform error checking, perform risk analysis, and/or check if an exchange potentially violates any rules or laws. If the check by the payment service system described herein finds no errors and/or no rule or law violations, the payment service system described herein can proceed with the exchange and/or transfer as described, saving time over existing asset exchange technologies and systems.

In some examples, technical solution presented by the systems and methods described herein can reduce network bandwidth and conserve computing resources, for instance by having one portion of an asset exchange occur in a face-to-face meeting, and the other through the network. For instance, allowing some aspects of security verification, such as identity verification, be at least partially performed by the parties to the transaction, may reduce reliance on computing resources. In some examples, an exchange performed using the systems and methods described herein can bypass conventional cryptocurrency and/or fiat currency exchange rails, and can be performed without interacting with an external exchange.

In some examples, the technical solution presented by the systems and methods described herein includes processing the exchange(s) and/or transfer(s) as peer-to-peer (P2P) transfers without involving third-party systems as middlemen, intermediaries, miners, and the like. For instance, the systems and methods described herein can bypass entities such as brokers that act as intermediaries between investors and exchanges, miners that can control what blocks are entered into a blockchain ledger, financial institutions that can sometimes set unfavorable exchange rates for users in order to take a percentage of an exchange, and so forth.

Various aspects of the application will be described with respect to the figures. FIG. 1 is a block diagram illustrating an architecture of an asset exchange system 100. The asset exchange system 100 includes a user device 115 associated with a user 110 and an agent device 165 associated with an agent 160. The user 110 may be referred to as a payor, a user, a transferor, a transferor user, a transferee, and/or a transferee user. The agent 160 may be referred to as a payee, a user, a transferor, a transferor user, a transferee, and/or a transferee user. Examples of the user 110 and/or the agent 160 include any of the users 914 (e.g., the merchants 916(A)-916(N), the customers 920, etc.) described below with reference to FIG. 9 or the users 1014 (e.g., the users 1016(A)-1016(B)) described below with reference to FIG. 10, any other users or persons discussed herein, or combinations thereof. Examples of the user device 115 and/or the agent device 165 include any of the user devices 906, the merchant devices 908(A)-908(N), the reader device 922, the POS system 924, the user devices 1006, the user devices 1008(A)-1008(B), the user device 1302, the reader device 1326, a computing system, any other devices described in FIGS. 9, 10, and 13 or any other place herein or a combination thereof. In some examples, the user device 115 and/or the agent device 165 can include a reader device, which can include a camera, optical scanner sensor, NFC reader, RFID reader, PAN receiver, or other device that can be used by the agent device 165 (and/or the user device 115) to interact with the interactive element 140.

The asset exchange system 100 includes an asset exchange service 125 with one or more servers. The asset exchange system 100 includes a transaction processing service 175 with one or more servers. The asset exchange service 125 and the transaction processing service 175 may be communicatively coupled to each other and/or to one or more user devices (e.g., the user device 115, the agent device 165, and/or the printer 150) through one or more networks 105, which may include one or more local area networks (LAN), one or more wireless local area networks (WLAN), one or more intranets, the Internet, one or more cellular networks, or a combination thereof.

The asset exchange system 100 performs an interactive element generation and processing process that is illustrated in FIG. 1. The interactive element generation and processing process begins with the user device 115 accessing a user instance of the asset management resource 118. In some examples, the asset management resource 118 is a software application associated with a payment service (e.g., with the asset exchange service 125 and/or the transaction processing service 175), as in the POS application 818, the payment application 918, the user interface 1220, or a combination thereof. The user device 115 may access (e.g., download from an application repository, install, launch, run, start, execute, transition from running as a background process to running as a foreground process, and/or otherwise access) the user instance of the asset management resource 118. In some examples, the asset management resource 118 is a website or other online portal associated with a payment service (e.g., with the asset exchange service 125 and/or the transaction processing service 175) and accessible to the user device 115 through a browser software application running on the user device 115, as in the user interface 1220.

A secure exchange of one or more assets between the user 110 to the agent 160 may be desired. The user device 115 uses the user instance of the asset management resource 118 to send an asset exchange request 120 to the server(s) of the asset exchange service 125 and/or to request that the server(s) of the asset exchange service 125 generate the interactive element 140. The server(s) of the asset exchange service 125 receive the asset exchange request 120 from the user device 115 (e.g., from the user instance of the asset management resource 118). In response to receipt of the asset exchange request 120, the server(s) of the asset exchange service 125 generate an interactive element 140, or cause other server(s) to generate the interactive element 140. In some examples, the interactive element 140 can be generated with certain restrictions, for instance to be temporarily usable for up to a threshold number of transactions, to be temporarily usable for up to a threshold amount of asset(s) in deposits and/or withdrawals and/or transfers and/or exchanges, to only be usable as long as the user device remains within a particular area (e.g., based on geolocation), to be temporarily usable until a particular threshold time, or a combination thereof.

In response to receipt of the asset exchange request 120, the server(s) of the asset exchange service 125 can select one or more agents and/or agent devices, such as the agent 160 and the corresponding agent device 165. For this selection 130, the server(s) of the asset exchange service 125 can select the one or more agents and/or agent devices from among a broader set of possible agents and/or agent devices, based on context data associated with the asset exchange request 120. In some examples, the context data can include information about the user(s), information about the agent(s), information about the user device(s), information about the agent device(s), criteria, rules, thresholds, conditions, or combinations thereof. The context data can be associated with the user 110, the user device 115, user asset account(s) 170 associated with the user 110, the agents, the agent devices, agent asset accounts (e.g., the agent asset account(s) 172) associated with the agents, various criteria, rules, and/or thresholds, or a combination thereof.

In some examples, the server(s) of the asset exchange service 125 can select the one or more agents and/or agent devices from the broader set based on the location(s) of the one or more agents and/or agent devices being within a specified area that the user 110 and/or the user device 115 is also in. In some examples, the server(s) of the asset exchange service 125 can select the one or more agents and/or agent devices from the broader set based on the location(s) of the one or more agents and/or agent devices being within a threshold distance of a location of the user 110 and/or the user device 115. In some examples, the server(s) of the asset exchange service 125 can select the one or more agents and/or agent devices from the broader set based on ratings or reviews of the one or more agents and/or agent devices exceeding a rating or review threshold (e.g., indicating that the one or more agents are trustworthy). In some examples, the server(s) of the asset exchange service 125 can select the one or more agents and/or agent devices from the broader set based on detection of a pre-existing relationship between the user 110 and the one or more agents. For instance, the relationship may be that of family, friends, friend of a friend, spouse, significant other, girlfriend or boyfriend, romantic relationship, co-workers, acquaintances, schoolmates, neighbors, customer and merchant, customer and service provider, partners, another type of relationship, or a combination thereof.

In some examples, the server(s) of the asset exchange service 125 can select one or more agents and/or agent devices based at least in part on account balances and/or assets available in associated agent asset accounts. For instance, the server(s) of the asset exchange service 125 can select one or more agents and/or agent devices can perform one or more load balancing operations to distribute or evenly allocate assets among agents. In some examples, the user 115 may be another agent, and/or the user device 115 may be another agent device, with respect to the exchange (e.g., the transfer 155 and the transfer 195). For instance, two agents can transfer different types of assets between one another, for instance if the first agent has too much of a particular type of asset (e.g., an amount exceeding a threshold) and/or the second agent does not have enough of the particular type of asset (e.g., an amount below a threshold). In some examples, the asset exchange service 125 can instruct the agents to perform the exchange to better balance what assets are held by which agents. In some examples, the user 115 and/or the user device 115 may be a server associated with the asset exchange service 125 and/or the transaction processing service 175, with respect to the exchange (e.g., the transfer 155 and the transfer 195). For instance, if the agent 160 has too much of a particular type of asset (e.g., an amount exceeding a threshold) or not have enough of the particular type of asset (e.g., an amount below a threshold), the agent 160 can receive the asset type from the system, or give the asset type to the system, for instance in exchange for stablecoin, fiat currency, or another asset type. In some examples, load balancing can be based on the value of associated assets, which in asset types such as securities or cryptocurrencies, can be volatile. That is, in some examples, to avoid one agent having too much of a particular asset (e.g., centralizing ownership), the server(s) of the asset exchange service 125 can select an agent and/or agent device associated with less of the particular asset in the selection 130. In some examples, to perform load balancing, the server(s) of the asset exchange service 125 can instruct an agent who has a large quantity of a specific asset (e.g., a cryptocurrency) to exchange some of that asset (e.g., that cryptocurrency) for another type of asset (e.g., fiat currency) with another agent who is also registered with the asset exchange service 125. In this way, more agents are available for users to choose from, regardless of the type of asset that the user wishes to exchange. In some examples, agents involved in load balancing exchanges may be given rewards, and/or the asset exchange service 125 may take a reduced portion (or no portion) of the exchange, in order to incentivize such load balancing exchanges. The server(s) of the asset exchange service 125 can use such load balancing exchanges to reduce volatility in exchanges of certain asset types, such as securities or cryptocurrencies. Furthermore, in some examples, the server(s) of the asset exchange service 125 can use stablecoin cryptocurrencies, such as programmatic stablecoins or algorithmic stablecoins, for certain exchanges and/or operations, in order to reduce volatility. For instance, in some examples, the server(s) of the asset exchange service 125 can use stablecoins as a replacement or temporary stand—in for a fiat currency in certain exchanges. In some examples, the exchange (e.g., the transfer 155 and the transfer 195) involves transfer of stablecoins, such as Tether (USDT), TrueUSD (TUSD), USD Coin (USDC), or a central bank digital currency (CBDC). In some examples, load balancing exchanges between agents, and/or between an agent 160 and a system (e.g., a server associated with the asset exchange service 125 and/or the transaction processing service 175) can use stablecoins, for instance to ensure that the agent is paid using a stable asset type, and/or to provide a stabilizing element to protect against more volatile asset types that the agent(s) may also have.

In some examples, for this selection 130, the server(s) of the asset exchange service 125 can select the one or more agents and/or agent devices from the broader set based on use of one or more trained machine learning (ML) models 190. For instance, the server(s) of the asset exchange service 125 can input, to the trained ML model(s) 190, information about the user 110, information about the user device 115, information about the possible agents in the broader set, information about the possible agent devices in the broader set, and/or information about the context data. The trained ML model(s) 190 can identify the one or more agents and/or agent devices to be selected from the broader set. In some examples, the trained ML model(s) 190 can be previously trained, for instance by the server(s) of the asset exchange service 125 or by another computing system, using training data. The training data may include previous selections of one or more agents and/or agent devices from previous broader sets, information about the corresponding previous broader sets, information about user(s) and/or user device(s) for which the previous selections of one or more agents and/or agent devices are made, or combinations thereof. In some examples, once the server(s) of the asset exchange service 125 select the one or more agents and/or agent devices from the broader set, either using the trained ML model(s) 190 as described or otherwise as described herein, the trained ML model(s) 190 can be updated (e.g., by the server(s) of the asset exchange service 125 or by another computing system) based on additional training data. The additional training data can identify the one or more agents and/or agent devices that are selected, information about the broader set, and information about the user 110 and/or the user device 115.

In some examples, for this selection 130, the server(s) of the asset exchange service 125 select one agent 160 and/or agent device 165 from the broader set of possible agents and/or agent devices, based on the context data and/or ML model(s) 190. The server(s) of the asset exchange service 125 can provide information 135 about the agent 160 and/or agent device 165 to the user device 115, for instance indicating a location of the agent 160 and/or agent device 165, a relative location (e.g., a direction or an area) from a location of the user 110 and/or the user device 115 to the location of the agent 160 and/or agent device 165, an identifier for the agent 160 and/or agent device 165 (e.g., a name, a username, an image, a phone number), a trust signal for the agent 160 (e.g., ratings and/or reviews for the agent 160), or a combination thereof. In some examples, for this selection 130, the server(s) of the asset exchange service 125 select a subset of agents and/or agent devices from the broader set of possible agents and/or agent devices, based on the context data and/or ML model(s) 190. The server(s) of the asset exchange service 125 can provide information 135 about the subset of agents and/or agent devices to the user device 115, for instance by indicating positions of the subset of agents and/or agent devices on a map as in the user interface 220 of FIG. 2, or by providing a listing of the subset of agents and/or agent devices. The information 135 about the subset of agents and/or agent devices can include any of the types of information 135 listed above with respect to the agent 160 and/or agent device 165. In some examples, the subset of agents and/or agent devices can be ranked or otherwise ordered based on one or more of the context data (e.g., relative location, best ratings or reviews, strongest relationship, or the like) or a determined relevance to the user 110. The user device 115, based on input(s) from the user 110, can provide, to the server(s) of the asset exchange service 125, a selection 130 of the agent 160 and/or agent device 165 from the subset of agents and/or agent devices.

In some examples, the server(s) of the asset exchange service 125 can also provide information 145 about the user 110 and/or the user device 115 to the agent device 165. The information 145 about the user 110 and/or the user device 115 can include, for example, a location of the user 110 and/or the user device 115, a relative location (e.g., a direction or an area) from a location of the agent 160 and/or the agent device 165 to the location of the user 110 and/or the user device 115, an identifier for the user 110 and/or the user device 115 (e.g., a name, a username, an image, a phone number), a trust signal for the user 110 (e.g., ratings and/or reviews for the user 110), or a combination thereof. In some examples, before proceeding, the server(s) of the asset exchange service 125 wait to receive a confirmation from the agent device 165 (e.g., based on an input from the agent 160) that the agent 160 wishes to proceed with the exchange with the user 110.

In some examples, some of the operations described above can be reversed, so that the user 110 is selected for the agent 160, rather than the agent 160 being selected for the user 110. For instance, the server(s) of the asset exchange service 125 can select one or more users and/or user devices from a broader set of users and/or user devices based on context data and/or use trained ML model(s) 190, such as those described above, and present the one or more users and/or user devices as information 145 to the agent device 165. The agent device 165 can select the user 110 and/or the user device 115 from the one or more users and/or user devices selected by the server(s) of the asset exchange service 125.

In some examples, information associated with a selected agent or user can be presented selectively and/or progressively overtime. For example, to limit the amount of information provided to an agent or user, a first piece of information (e.g., location or general area, trust signal, etc.) can be presented at a first time and as the agent device 165 and user device 115 get closer together (e.g., within a threshold distance, a particular range, or the like) additional pieces of information can be presented at later times. Different distance thresholds may be associated with provision of different types of information. For example, the user device 115 can first be presented with a limited quantity of information about the agent 160 (e.g., general area, trust signal, whether the agent 160 is able to perform the exchange, etc.). Likewise, the agent device 165 may be presented with similarly limited information about the user 110. As the distance between the user device 115 and the agent device 165 decreases (e.g., beyond a first threshold, then beyond a second and smaller threshold, and so forth), the provided area that the agent 160 is in can get smaller and more precise, to ensure that the user 110 knows where to go to meet the agent 160 but while preserving privacy for the user 110 and/or the agent 160. As the distance between the user device 115 and the agent device 165 decreases (e.g., beyond one of the thresholds), the user device 115 can be presented with an image of the agent 160, and the agent device 165 can be presented with an image of the user 110, so that the user device 115 and agent device 165 can be used for identity verification by the user 110 and/or by the agent 160. As the distance between the user device 115 and the agent device 165 decreases (e.g., beyond one of the thresholds), the user device 115 can be presented with a name or username or other identifier of the agent 160, and the agent device 165 can be presented with a name or username or other identifier of the user 110, so that the user 110 and/or the agent 160 can use such identifiers to speak with one another. As the distance between the user device 115 and the agent device 165 decreases (e.g., beyond one of the thresholds), the user device 115 can be presented with a list of assets that the agent 160 can exchange, in case the user 110 wishes to also exchange other assets. As the distance between the user device 115 and the agent device 165 decreases (e.g., beyond one of the thresholds), the agent device 165 can be presented with a list of assets that the user 110 can exchange and/or wants to exchange, so that the agent 160 can prepare for the exchange(s). Such progressive stepwise provision of information can provide an added layer of security such that information that identifies agents or users can be presented at a later time as the agent device 165 and user device 115 get closer to one another. In some examples, some information (e.g., location information, information about types of assets possessed, image(s), name(s) or other identifiers, etc.) may be provided and presented temporarily to provide additional layers of security, and can later be deleted or otherwise removed or withdrawn from storage at the user device 115 and/or the agent device 165. Such security measures can prevent malicious parties from using the provided information about the user 110 and/or about the agent 160 to determine that the user 110 and/or the agent 160 might have large quantities of currencies and/or other assets on their person(s) in preparation for an exchange, to prevent the user 110 and/or the agent 160 from being targeted for theft using such information.

The server(s) of the asset exchange service 125 generate the interactive element 140 based on the asset exchange request 120, the information 135 about the agent 160 and/or the agent device 165, the information 145 about the user 110 and/or the user device 115, or a combination thereof. The asset exchange request 120, and/or further communications from the user device 115 (e.g., from the user instance of the asset management resource 118) to the asset exchange service 125, may include any of the information described herein that is encoded in the interactive element 140 as generated. For instance, information that may be encoded in the interactive element 140, and/or that may be included in the asset exchange request 120, may include: information identifying the user 110, the user device 115, the user instance of the asset management resource 118, the agent 160, the agent device 165, the agent instance of the asset management resource 118, the agent instance of the asset management resource 168, a resource identifier for the agent instance of the asset management resource 118, a resource identifier for the agent instance of the asset management resource 168, an amount of a first asset to exchange for an amount of a second asset, the amount of the second asset, an amount of the first asset in the user asset account(s) 170, an amount of the first asset in the agent asset account(s) 172, an amount of the first asset in the service asset account(s) 174, an amount of the second asset in the user asset account(s) 170, an amount of the second asset in the agent asset account(s) 172, an amount of the second asset in the service asset account(s) 174, an asset type of the first asset (e.g., fiat currency, cryptocurrency, NFT, security asset), an asset type of the second asset, one or more institutions (e.g., banks, lenders, or other financial institutions) associated with the user asset account(s) 170, one or more institutions associated with the agent asset account(s) 172, one or more institutions associated with the service asset account(s) 174, a signature input from the user 110 and/or the user device 115 or an indication thereof, a biometric input from the user 110 and/or the user device 115 or an indication thereof, a signature input from the agent 160 and/or the agent device 165 or an indication thereof, a biometric input from the agent 160 and/or the agent device 165, or an indication thereof, or a combination thereof.

In some examples, server(s) of the asset exchange service 125 transmit the interactive element 140 to the user device 115. In some examples, the server(s) of the asset exchange service 125 transmit the interactive element 140 to the user device 115 as soon as it is generated (e.g., in response to the request 120). In some examples, the user device 115 can surface and/or output the interactive element 140 to the agent device 165 upon satisfaction of a condition or occurrence of an event. For example, the server(s) of the asset exchange service 125 can transmit the interactive element 140 to the user device 115 when the user 110 and/or the user device 115 is in the same area as (e.g., is within a threshold distance of) the agent 160 and/or the agent device 165.

The agent device 165 can interact with the interactive element 140 as output by the user device 115. The server(s) of the asset exchange service 125 can receive an indication that the agent device 165 has interacted with the interactive element 140. For instance, in some examples, the interactive element 140 includes an optical glyph, such as a bar code or quick response (QR) code, that optically encodes information, such as any of the types of information listed above. In such examples, the agent device 165 can interact with the interactive element 140 by scanning the optical glyph and decoding the information that is optically encoded in the optical glyph. In some examples, the interactive element 140 includes a dataset to be transferred wirelessly using a short-range wireless communication interface (e.g., near field communication (NFC), radio frequency identification (RFID), Bluetooth®, light-based communication, personal area network (PAN), and/or wireless local area network (WLAN)). The dataset can include information, such as any of the types of information listed above. In such examples, the agent device 165 can interact with the interactive element 140 by receiving the dataset wirelessly from the user device 115 using the short-range wireless communication interface The server(s) of the asset exchange service 125 can receive the indication that the agent device 165 has interacted with the interactive element 140 from the agent device 165, for instance based on the instructions encoded in the optical glyph that instruct the agent device 165 to send the indication to the server(s) of the asset exchange service 125. The server(s) of the asset exchange service 125 can receive the indication that the agent device 165 has interacted with the interactive element 140 from a server (e.g., a computing system) that the agent device 165 interacts with based on the agent device 165 using a resource identifier (e.g., a uniform resource locator (URL) or uniform resource identifier (URI)) that is encoded in the interactive element 140, and that the agent device 165 decodes from the interactive element 140.

The server(s) of the asset exchange service 125 can perform identity verification 180 to verify the respective identities of the user 110 and the agent 160 (e.g., and/or the user device 115 and the agent device 165) based on the indication that the server(s) of the asset exchange service 125 receive that the agent device 165 has interacted with the interactive element 140, and in some examples based on additional context data corresponding to the indication. In some examples, the indication can include at least some of the information that was encoded in the interactive element 140, and/or derivative information (e.g., a hash of at least a portion of the information encoded in the interactive element 140) that is generated by the user device 115 and/or the agent device 165 based on the information that was encoded in the interactive element 140. Because the server(s) of the asset exchange service 125 generate the interactive element 140, the server(s) of the asset exchange service 125 can verify that the correct interactive element 140 was interacted with based on presence of this information, and/or this derivative information, which the server(s) of the asset exchange service 125 can reproduce to verify its authenticity. In some examples, server(s) of the asset exchange service 125 can perform the identity verification 180 also based on contextual information corresponding to the indication, for instance by verifying that, at or near the time of the agent device 165 interacting with the interactive element 140 (e.g., within a threshold time of the interaction), the location of the user 110 and/or user device 115 is in the same area as (e.g., is within a threshold distance of) the location of the agent 160 and/or the agent device 165.

In some examples, some of the operations described above can be reversed, so that the server(s) of the asset exchange service 125 transmit the interactive element 140 to the agent device 165 rather than the user device 115. In such examples, the server(s) of the asset exchange service 125 can receive an indication that the user device 115 has interacted with the interactive element 140 as output by the agent device 165. The server(s) of the asset exchange service 125 can perform the identity verification 180 based on the indication and/or contextual information corresponding to the indication.

In some examples, the server(s) of the asset exchange service 125 generate respective interactive elements 140 for both the user device 115 and the agent device 165, and transmit the respective interactive elements 140 to the user device 115 and the agent device 165, respectively. In such examples, the server(s) of the asset exchange service 125 can receive respective indications that the user device 115 has interacted with one of the interactive elements 140 as output by the agent device 165, and that the agent device 165 has interacted with the other of the interactive elements 140 as output by the user device 115. The server(s) of the asset exchange service 125 can perform the identity verification 180 based on the indications and/or contextual information corresponding to the indications.

In some examples, the interactive element 140 encodes a resource identifier identifying an asset management resource 168. The resource identifier can direct the agent device 165 to access the asset management resource 168, and may include, for example, a uniform resource identifier (URI), a uniform resource locator (URL), a hyperlink, and/or a different type of identifier associated with access to the asset management resource 168. In some examples, the asset management resource 168 is a software application associated with a payment service (e.g., with the asset exchange service 125 and/or the transaction processing service 175), as in the POS application 818, the payment application 918, the user interface 1220, or a combination thereof. The agent device 165 may access (e.g., download from an application repository, install, launch, run, start, execute, transition from running as a background process to running as a foreground process, and/or otherwise access) the asset management resource 168 in response to accessing the resource identifier by interacting with the interactive element 140. In some examples, the asset management resource 168 is a website or other online portal associated with a payment service (e.g., with the asset exchange service 125 and/or the transaction processing service 175) and accessible to the agent device 165 through a browser software application running on the agent device 165, as in the user interface 1220. In some examples, the asset management resource 168 is an agent instance of the asset management resource 118.

In some examples, the resource identifier can cause the agent device 165 to perform other actions in addition to accessing the asset management resource 168, such as causing the agent device 165 to automatically fill in (e.g., pre-fill) information into the asset management resource 168 corresponding to the interactive element 140, causing the agent device 165 to request that the interactive element 140 be authenticated (e.g., using the multi-factor authenticator 185), causing the agent device 165 to request that the exchange be facilitated (e.g., using the transaction processing service 175), or a combination thereof.

As described above, in some examples, the interactive element 140 includes a glyph that optically, or otherwise, encodes information (e.g., including at least the resource identifier, any of the information 720, and/or any other information discussed herein as encoded in the interactive element 140). Examples of such a glyph include a quick response (QR) code, a bar code, a data matrix, an Aztec code, Maxicode, a CodaBlock-F code, a Maxicode, a MicroPDF417 code, a PDF417 code, a Han Xin code, a DotCode, a snaptag, a color variant of any of the previously-listed glyph types (increasing storage capacity by using color as an additional dimension), or a combination thereof. The agent device 165 can interact with the interactive element 140 by optically scanning the glyph using a camera, image sensor, and/or optical scanner sensor of the agent device 165 (or coupled to the agent device 165), and optically decoding the information that is optically encoded in the glyph.

In some examples, the interactive element 140 includes a link, such as a hypertext link or an image-based link. The link can encode information (e.g., including at least the resource identifier, any of the information 720, and/or any other information discussed herein as encoded in the interactive element 140). A user viewing the interactive element 140 can click, touch, or otherwise interact with the link to interact with the interactive element 140. For instance, if the agent device 165 receives the interactive element 140, the agent device 165 can interact with the interactive element 140 by having the agent 160 click, touch, or otherwise interact with the link. The link can encode the resource identifier for the asset management resource 168 (e.g., among other information), so the agent 160 interacting with the link through the agent device 165 can cause the agent device 165 to access the asset management resource 168. In some examples, the interactive element 140 includes an image depicting the glyph, and includes an image link corresponding to the image, so that a user (e.g., the agent 160) clicking, touching, or interacting with the image that depicts the glyph can cause the agent device 165 to access the asset management resource 168.

In some examples, the interactive element 140 includes a near-field communication (NFC) tag or transceiver that encodes information (e.g., including at least the resource identifier, any of the information 720, and/or any other information discussed herein as encoded in the interactive element 140) in the memory of the NFC tag. The agent device 165 can interact with the interactive element 140 by bringing an NFC reader of the agent device 165 (or that is coupled to the agent device 165) in proximity to the NFC tag, causing the NFC tag to transmit the information encoded in the NFC tag wirelessly to the NFC reader, and causing the NFC reader to wirelessly receive the information encoded in the NFC tag from the NFC tag. In some examples, the interactive element 140 includes a radio-frequency identification (RFID) tag or transceiver that encodes information in the memory of the RFID tag. The agent device 165 can interact with the interactive element 140 by bringing a RFID reader of the agent device 165 (or that is coupled to the agent device 165) in proximity to the RFID tag, causing the RFID tag to transmit the information encoded in the RFID tag wirelessly to the RFID reader, and causing the RFID reader to wirelessly receive the information encoded in the RFID tag from the RFID tag. In some examples, the interactive element 140 includes a personal area network (PAN) beacon or transceiver (e.g., Bluetooth® beacon or transceiver) that encodes information in the memory of the PAN beacon. The agent device 165 can interact with the interactive element 140 by bringing a PAN receiver of the agent device 165 (or that is coupled to the agent device 165) in proximity to the PAN beacon or transceiver, causing the PAN beacon or transceiver to transmit the information encoded in the PAN beacon or transceiver wirelessly to the PAN receiver, and causing the PAN receiver to wirelessly receive the information encoded in the PAN beacon or transceiver from the PAN beacon or transceiver.

In some examples, the server(s) of the asset exchange service 125, the user device 115, and/or the agent device 165 can send the interactive element 140 to a printer 150. The printer 150 can print out a printed instance of the interactive element 140. The user device 115 and/or the agent device 165 can then interact with the interactive element 140 by interacting with the printed instance of the interactive element 140.

To perform the exchange, an amount of a first asset is transferred between the user 110 and the agent 160 in a transfer 155. For example, if the exchange is an exchange from a physical asset (e.g., a fiat currency) of the user 110 to a digital asset (e.g., a cryptocurrency, an NFT, or a security asset), then the user 110 can give the amount of the physical asset (e.g., the fiat currency) to the agent 160 in the transfer 155. If the exchange is an exchange from a digital asset (e.g., a cryptocurrency, an NFT, or a security asset) of the user 110 to a physical asset (e.g., a fiat currency), then the agent 160 can give the amount of the physical asset (e.g., the fiat currency) to the user 110 in the transfer 155. The server(s) of the asset exchange service 125, and/or the server(s) of the transaction processing service 175, can receive a confirmation that the transfer 155 between the user 110 and the agent 160 has taken place, or some other indication of the transfer 155, from the agent device 165 and/or the user device 115.

To perform the exchange, the server(s) of the transaction processing service 175 facilitate a transfer 195 of an amount of a second asset between user asset account(s) 170 associated with the user 110 and asset account(s) (e.g., agent asset account(s) 172 and/or service asset account(s) 174) associated with the agent 160 and/or with the transaction processing service 175 itself. For example, if the exchange is an exchange from a physical asset (e.g., a fiat currency) of the user 110 to a digital asset (e.g., a cryptocurrency, an NFT, or a security asset), then the server(s) of the transaction processing service 175 can facilitate the transfer 195 of the amount of the digital asset (e.g., the cryptocurrency, the NFT, or the security asset) to the user asset account(s) 170 associated with the user 110 from the asset account(s) (e.g., agent asset account(s) 172 and/or service asset account(s) 174) associated with the agent 160 and/or with the transaction processing service 175 itself. If the exchange is an exchange from a digital asset (e.g., a cryptocurrency, an NFT, or a security asset) of the user 110 to a physical asset (e.g., a fiat currency), then the server(s) of the transaction processing service 175 can facilitate the transfer 195 of the amount of the digital asset (e.g., the cryptocurrency, the NFT, or the security asset) from the user asset account(s) 170 associated with the user 110 to the asset account(s) (e.g., agent asset account(s) 172 and/or service asset account(s) 174) associated with the agent 160 and/or with the transaction processing service 175 itself. In some examples, the service asset account(s) 174 can be used as escrow account(s) or holding account(s) for the transfer 195 if the transfer 195 is between the user asset account(s) 170 and the agent asset account(s) 172.

The amount of the first asset transferred in the transfer 155, and the amount of the second asset transferred in the transfer 195, can be based on one another. For instance, in some examples, the amount of the first asset transferred in the transfer 155 can be equivalent to, or based on, the value (in terms of the first asset) of the amount of the second asset transferred in the transfer 195, in some examples with an additional amount added or subtracted. Similarly, in some examples, the amount of the second asset transferred in the transfer 195 can be equivalent to, or based on, the value (in terms of the second asset) of the amount of the first asset transferred in the transfer 155, in some examples with an additional amount added or subtracted. The additional amount can go toward paying a fee to the agent 160 (e.g., automatically into the agent asset account(s) 172), paying a fee to the transaction processing service 175 (e.g., automatically into the service asset account(s) 174), paying a fee to the user 110 (e.g., automatically into the user asset account(s) 170), paying taxes for the transfer 195, paying for a transfer mechanism (e.g., paying for gas for an Ethereum® blockchain transfer, paying for a block to be added to a blockchain ledger), or a combination thereof. Such fees can be constant amounts or percentages of the exchanged amount(s).

The server(s) of the transaction processing service 175 facilitate the transfer 195 based on the server(s) of the transaction processing service 175 having access to various asset accounts, such as the user asset account(s) 170 associated with the user 110, the agent asset account(s) 172 associated with the agent 160, the service asset account(s) 174 associated with the transaction processing service 175 and/or the asset exchange service 125, or a combination thereof. These asset accounts can be associated with the transaction processing service 175 and/or the asset exchange service 125, institutions (e.g., banks, credit unions, merchants (for store credit), stockbrokers, stock exchanges, stock trading platforms, currency exchange platforms, retirement account institutions, payment processors, financial institutions, lending institutions, credit institutions, securities institutions, and the like). Any of these asset accounts can be fiat currency accounts that are configured to store amounts of fiat currencies (e.g., the U.S. Dollar ($), the Canadian Dollar, the Euro (€), the Yen (¥), the British Pound (£), and the like) and/or digital indications representing amounts of fiat currencies. Any of these asset accounts can be security asset account(s) that store security assets (e.g., stocks, bonds, investments, debt, equity, warrants, futures, shorts) and/or digital indications representing amounts of security assets. Any of these asset accounts can be cryptocurrency account(s) that store cryptocurrencies (e.g., Bitcoin (₿), Ethereum (ETH), Litecoin (LTC), Cardano (ADA), Dogecoin (DOGE), stablecoins, and the like) and/or digital indications representing amounts of cryptocurrencies. Any of these asset accounts can be NFT account(s) that store NFTs and/or digital indications representing amounts of NFTs. In some examples, the asset exchange service 125 and/or the transaction processing service 175 can perform a conversion between a first asset and a second asset without accessing external exchanges or services. In some examples, the asset exchange service 125 and/or the transaction processing service 175 can perform a conversion between a first asset and a second asset by accessing external exchanges or services to determine exchange rates. In some examples, the asset exchange service 125 and/or the transaction processing service 175 can utilize one or more distributed ledgers to execute and/or store records of an exchange, such as the asset wallet 1110, the asset ledger 1112, the fiat currency ledger 1114, other ledger(s) 1116, the transaction log 1118, the private blockchain 1119, the asset ledger 1134, the fiat currency ledger 1136, the other ledger(s) 1138, the asset wallet 1140, another blockchain ledger, a directed acyclic graph (DAG) ledger, or a combination thereof.

In some examples, the transfer 155 is also a transfer between account(s) (e.g., the user asset account(s) 170 associated with the user 110, the agent asset account(s) 172 associated with the agent 160, the service asset account(s) 174 associated with the transaction processing service 175 and/or the asset exchange service 125) that is facilitated by the server(s) of the transaction processing service 175.

In some examples, the exchange (e.g., the transfer 155 and the transfer 195) is performed between a customer and a merchant. For instance, in some examples, the user 110 is a customer (e.g., one of the users 914 and/or the customers 920), the user device 115 is a customer device (e.g., one of the user devices 906), the agent 160 is a merchant or a representative of a merchant (e.g., one of the merchants 916(A)-916(N)), and the agent device 165 is a merchant device (e.g., one of the merchant devices 908(A)-908(N), the reader device 922, and/or the POS system 924). For instance, the user 110 (the customer) can provide fiat currency (e.g., paper money) to the agent 160 (the merchant) at a POS terminal, and the agent 160 (the merchant) can provide another asset type (e.g., cryptocurrencies, security assets, NFTs) to the user 110 (the customer) in exchange. In another example, the user 110 is a merchant or a representative of a merchant (e.g., one of the merchants 916(A)-916(N)), the user device 115 is a merchant device (e.g., one of the merchant devices 908(A)-908(N), the reader device 922, and/or the POS system 924), the agent 160 is a customer (e.g., one of the users 914 and/or the customers 920), and the agent device 165 is a customer device (e.g., one of the user devices 906).

In some examples, the exchange (e.g., the transfer 155 and the transfer 195) is a peer-to-peer exchange. For instance, in some examples, the user 110 is a first peer user (e.g., the user 916(A)), the user device 115 is a first peer user device (e.g., the user device 908(A)), the agent 160 is a second peer user (e.g., the user 916(B)), and the agent device 165 is a second peer user device (e.g., the user device 908(B)).

In some examples, the asset exchange system 100 includes one or more trained machine learning (ML) models 190. The trained ML model(s) 190 can run on, and/or be a part of, the server(s) of the asset exchange service 125, the server(s) of the transaction processing service 175, the user device 115, the agent device 165, one or more network server(s) of the network(s) 105, or a combination thereof. The trained ML model(s) 190 can include, for instance, or more neural network (NNs), one or more convolutional neural networks (CNNs), one or more trained time delay neural networks (TDNNs), one or more deep networks, one or more autoencoders, one or more deep belief nets (DBNs), one or more recurrent neural networks (RNNs), one or more generative adversarial networks (GANs), one or more trained support vector machines (SVMs), one or more trained random forests (RFs), one or more encoders, one or more decoders, one or more deep learning systems, or combinations thereof. The trained ML model(s) 190 can be trained using the training data using supervised learning, unsupervised learning, or a combination thereof. The training data can include selections made in various situations, along with corresponding information (e.g., see examples of input information to the trained ML model(s) 190 and/or context data described herein) about the situations. An illustration of the trained ML model(s) 190 in FIG. 1 illustrates the input layer(s) of the trained ML model(s) 190 as a column of white circles on the left-hand side of the illustration, the output layer(s) of the trained ML model(s) 190 as another column of white circles on the right-hand side of the illustration, and the hidden layers of the trained ML model(s) 190 as two columns of grey-shaded circles in between the input layer(s) and the output layer(s). The circles can represent neurons, channels, layers, filters, pooling layers, normalization layers, maps, parameters, other elements of the trained ML model(s) 190, or combinations thereof. In some examples, the trained ML model(s) 190 include one or more trained ML models that are personalized to a specific user (e.g., the user 110 and/or the agent 160) by being trained based on data that is specific to that specific user. In some examples, the trained ML model(s) 190 include one or more trained ML models that are generalized for multiple users by being trained based on data specific to various users and/or simulated data for simulated users.

In some examples, the trained ML model(s) 190 are used by the user device 115 and/or the server(s) of the asset exchange service 125 to automatically generate the asset exchange request 120, for instance by intelligently predicting when the user 110 might want to perform an exchange, and what type of exchange between what types of assets the user 110 might want to perform, for instance based on past exchanges that the user 110 (and/or other users similar to the user 110) has performed. In some examples, the trained ML model(s) 190 are used by the user device 115 and/or the server(s) of the asset exchange service 125 to automatically select, as part of the selection 130, the agent 160 and/or the agent device 165 from a broader set of possible agents and/or agent devices, for instance based on past agent selections that the user 110 (and/or other users similar to the user 110) has made. In some examples, the trained ML model(s) 190 are used by the server(s) of the asset exchange service 125 to automatically generate the interactive element 140 and/or information to be encoded in the interactive element 140, for instance to generate a security verification dataset 705 that is based on information about the user 110, the user device 115, the agent 160, and/or the agent device 165. The input(s) received at the input layers of the trained ML model(s) 190 can include any of the information described above, such as the past exchanges, the past selections, the information about the user 110, the information about the user device 115, the information about the agent 160, the information about the agent device 165, any information described herein as encoded in the interactive element 140, or a combination thereof. The output(s) of the trained ML model(s) 190 can be output using output layers of the trained ML model(s) 190. In some examples, the trained ML model(s) 190 can include various hidden layers between the input layer(s) and the output layer(s), each of which can be associated with making specific selection(s) or decision(s) on the way to generating the outputs described above, for instance by narrowing broad groups of options into narrower subsets before making a selection.

Figure 2:
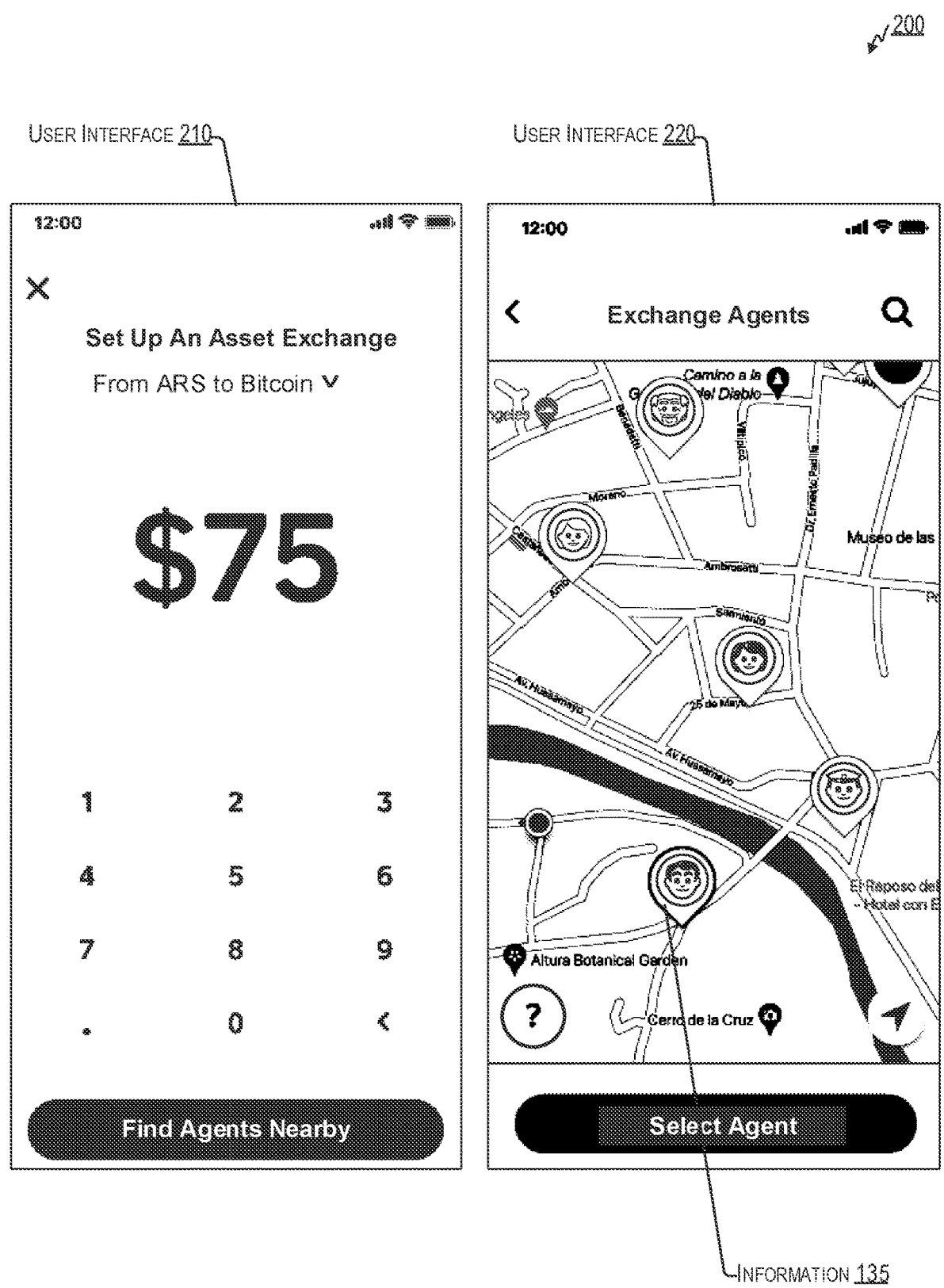
FIG. 2 is a conceptual diagram illustrating user interfaces of an asset management resource used by a user device of a user, including a user interface requesting an exchange and a user interface for identifying agents, in accordance with some examples.

FIG. 2 is a conceptual diagram illustrating user interfaces of an asset management resource 118 used by a user device 115 of a user 110, including a user interface 210 for requesting an exchange and a user interface 220 for identifying agents. In a non-limiting example, the user interface 210 includes a keypad through which the user 110 indicates that the user 110 wishes to convert an amount of a first asset (75 Argentinian Nuevo Peso (ARS)) into a corresponding amount of a second asset (Bitcoin). The user interface 210 includes a user interface element, shown as a button labelled "Find Agents Nearby," which can transition to the user interface 220 or another user interface that identifies agents near the location of the user 110 and/or the user device 115.

The user interface 220 includes a map with locations of different agents and/or agent devices, each represented by a marker with an image of the respective agent. These different agents and/or agent devices may be selected as a subset of a broader set by the server(s) of the asset exchange service 125, for instance as part of the selection 130 in FIG. 1. The marker that appears furthest south on the map is illustrated with a bold outline, indicating that the user 110 has selected this marker corresponding to this agent, for instance as part of the selection 130. This selected marker may correspond to the agent 160. This selected marker includes an image of the agent 160, depicted as an image of a man with dark hair. In some examples, additional or alternative information associated with the agents, as described above, can be presented in association with the markers. For instance, a relative distance, a rating or review, an indication of an existing relationship, etc. can be presented in association with the markers and/or upon interaction with a marker. In some examples, the map, and/or any of the information about any of the agents shown in the user interface 220, can be presented to the user 110 and/or the user device 115 as the information 135.

In some examples, to protect the privacy of agents, the server(s) of the asset exchange service 125 modify the locations of the agents shown in the user interface 220 by a random number within a predetermined range. In some examples, to protect the privacy of agents, the server(s) of the asset exchange service 125 can show, in the user interface 220, respective areas that the agents are in, rather than showing the specific locations of agents. In some examples, to protect the privacy of agents, the server(s) of the asset exchange service 125 can show, in the user interface 220, relative locations of the agents and/or agent devices, relative to the location of the user and/or user device (e.g., showing directional arrows and/or indications of distance). In some examples, as described above, additional or alternative information about the agents can be presented. In some examples, such information can be presented selectively and/or progressively.

In an example, when an agent or agent device has been selected, the user interface 220 can receive an input, from the user, associated with a user interface element, such as a button labelled "Select Agent." In some examples, selection of one of the markers may be sufficient to provide such an input (e.g., without requiring additional input to another user interface element or the like).

Figure 3:
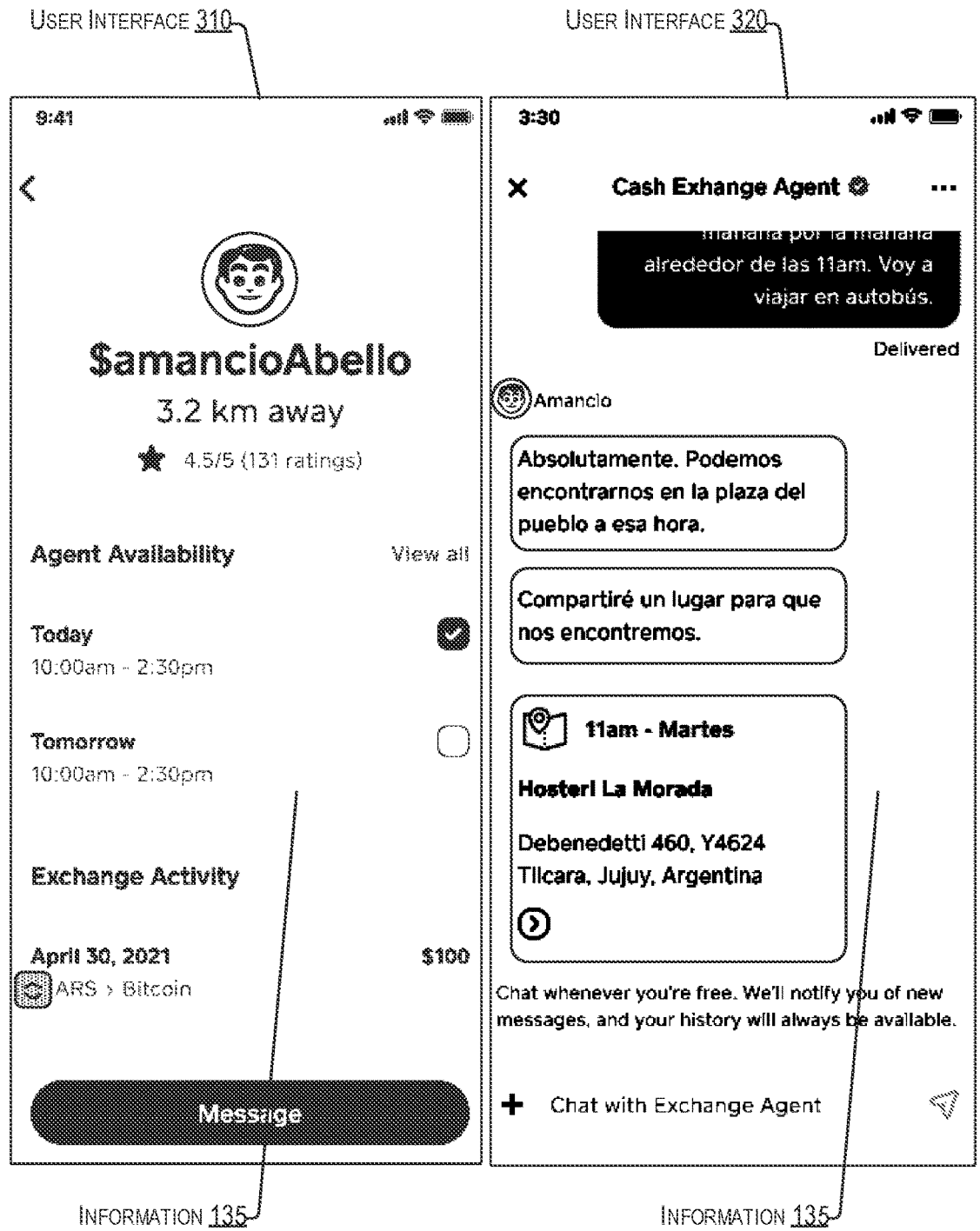
FIG. 3 is a conceptual diagram illustrating user interfaces of an asset management resource used by a user device of a user, including a user interface for information about an agent and a user interface for communicating with the agent, in accordance with some examples.

FIG. 3 is a conceptual diagram illustrating user interfaces of an asset management resource 118 used by a user device 115 of a user 110, including a user interface 310 for presenting information 135 about an agent 160 and a user interface 320 for communicating with the agent 160. The information 135 about the agent 160 and/or the agent device 165 presented in the user interface 310 includes, for example, an image of the agent 160 (e.g., a man with dark hair), an identifier of the agent 160 (e.g., the username "$amancioAbello"), a distance between the user device 115 and the agent device 165 (e.g., 3.2 kilometers (km)), a trust signal (e.g., an average rating of 4.5 out of 5 based on 131 ratings), the agent 160's availability schedule (today from 10:00 am to 2:30 pm or tomorrow from 10:00 am to 2:30 pm), and a history the agent 160's exchange activity (e.g., including an exchange from 100 ARS to Bitcoin on Apr. 30, 2021). In the user interface 310, the user 110 has selected the time slot today from 10:00 am to 2:30 μm in the agent 160's availability schedule, as indicated by a checkmark.

In some examples, information 135 about the agent 160 and/or agent device 165 can be stored in a profile associated with the agent 160. In some examples, the information 135 can be updated in real-time or near-real-time, for example, based on where the agent 160 and/or agent device 165 and/or user 110 and/or user device 115 are located. In some examples, information about the agent 160 and/or agent device 165 can be determined based on one or more integrations, for example, with a calendar service (e.g., to determine availability), a social networking service (e.g., to determine existing relationships or social networks), or the like. The information 135 can include information identifying the agent, such as a name, a username, or another identifier. The information can include trust or risk indicators, such as ratings, reviews, comments, feedback, or scores. The trust or risk indicators can be updated in real-time based on each new transaction, and/or based on any new ratings, reviews, comments, and/or feedback received about the agent (e.g., from users that interact with the agent). The information 135 can include information provided by the agent 160, information provided by users and/or user devices about the agent, information determined from the agent device 165, or a combination thereof.

The user interface 320 is a messaging interface allowing the user 110 and the agent 160 to communicate using the user device 115 and the agent device 165, respectively. Messages in Spanish are shown between an example user 110 ("Lyra") and an example agent 160 ("Amancio"). The user 110 asks the agent 160 if they can meet sometime around 11 am, and indicates that the user 110 is planning to travel by bus. The agent 160 confirms this time, and first suggests meeting at the town square, and then sends a more specific invitation to meet at 11 am at a specific inn ("Hosteri La Morada") at a specified address. The information 135 about the agent 160 and/or agent device 165 can be updated further based on messages and/or other communications between the user device 115 and the agent device 165, for instance through the user interface 320.

Figure 4:
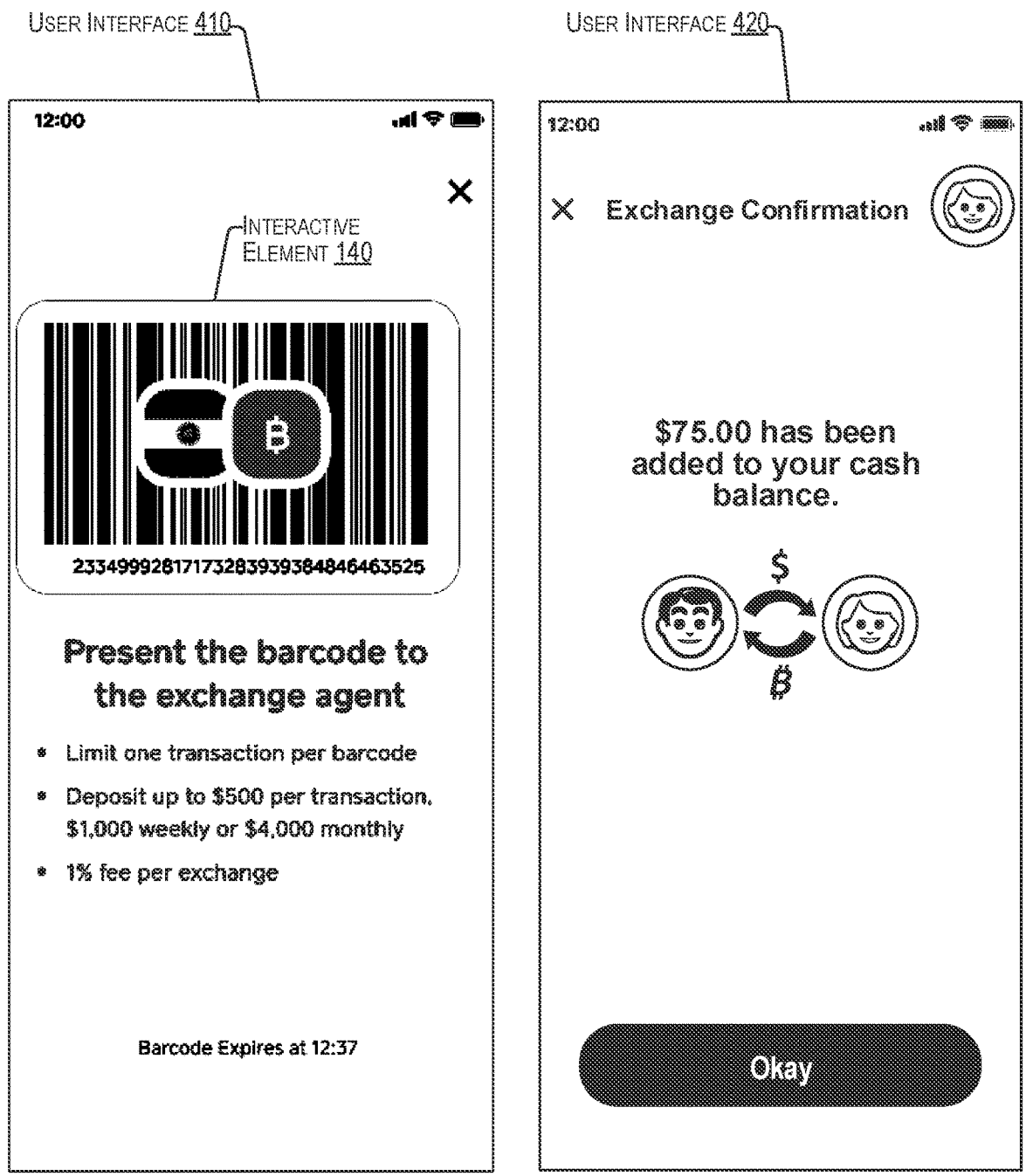
FIG. 4 is a conceptual diagram illustrating user interfaces of an asset management resource used by a user device of a user, including a user interface for providing an interactive element and a user interface for confirming an exchange, in accordance with some examples.

FIG. 4 is a conceptual diagram illustrating user interfaces of an asset management resource 118 used by a user device 115 of a user 110, including a user interface 410 for providing an interactive element 140 and a user interface 420 for confirming an exchange. The user interface 410 includes an interactive element 140 that includes a barcode and a corresponding numeric code. The user interface 420 specifies that the interactive element 140 has some limitations, in that the interactive element 140 can only be used for a single transaction, can be used to deposit up to $500, and expires at a specified time (12:37). Additional details in the user interface 420 indicate a weekly deposit limit of $1000 and a monthly deposit limit of $4000, and a 1% fee per exchange. The barcode of the interactive element 140 also includes an Argentinian flag and a Bitcoin symbol, indicating that the interactive element 140 is specific to an exchange between ARS and Bitcoin. It should be understood that these are merely examples of the current transaction and the user interface 410 can be customizable based on particular transactions.

The user interface 320 indicates that the user 110 has added 75.00 ARS to the user 110's cash balance, either in fiat currency, or a representation of fiat currency or cryptocurrency in the user asset account(s) 170. The addition of the 75.00 ARS can be an example of the transfer 155, the transfer 195, or a combination thereof.

Figure 5:
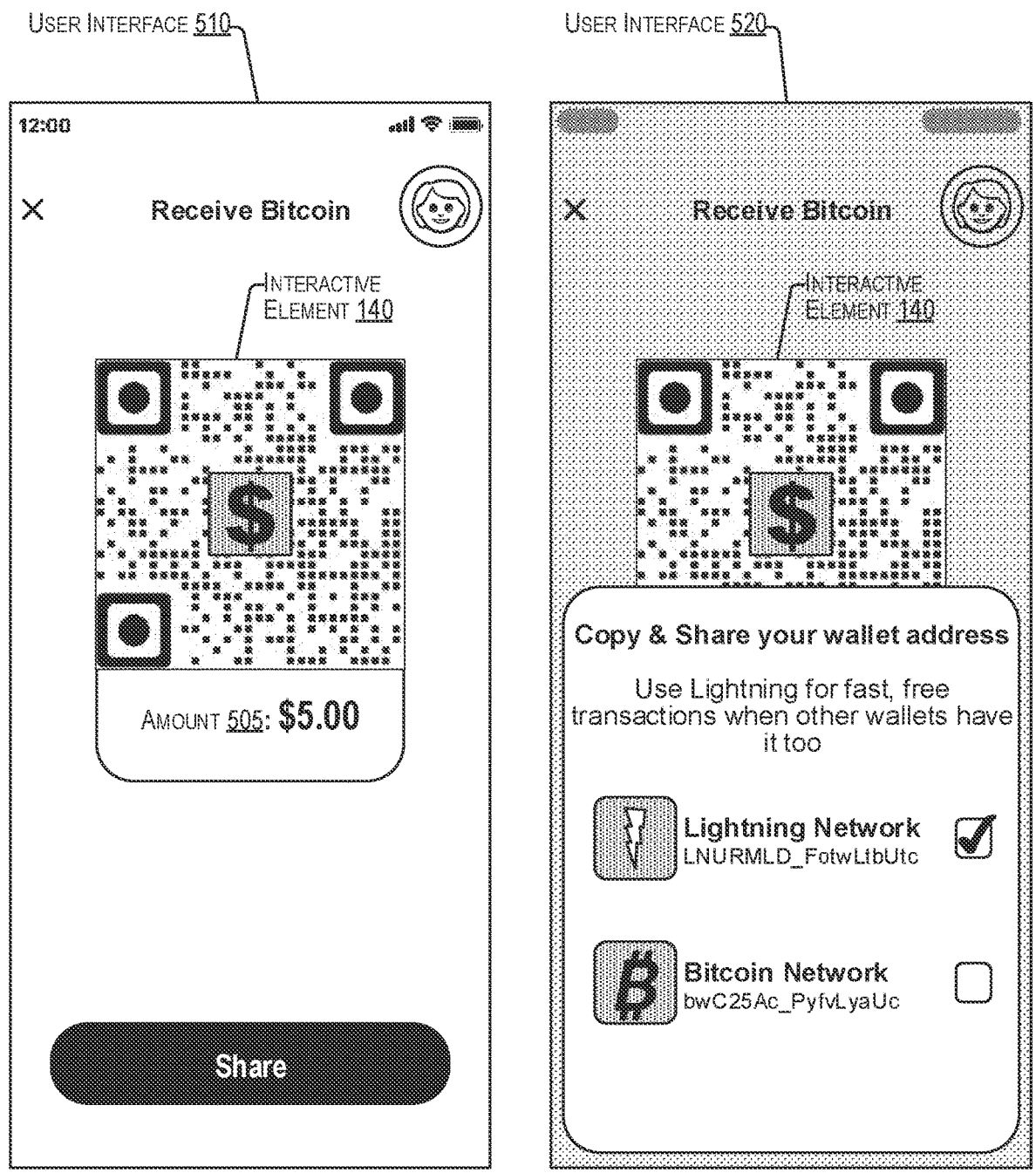
FIG. 5 is a conceptual diagram illustrating user interfaces of an asset management resource used by a user device of a user, including a user interface for providing an interactive element and selecting an amount to be exchanged, and a user interface for identifying a network over which to perform the exchange, in accordance with some examples.

FIG. 5 is a conceptual diagram illustrating user interfaces of an asset management resource 118 used by a user device 115 of a user 110, including a user interface 510 for providing an interactive element 140 and selecting an amount 505 to be exchanged, and a user interface 520 for identifying a network over which to perform the exchange. The interactive element 140 of the user interface 510 is a QR code. The amount 505 indicates that the user 110 wishes to receive $5.00 worth of Bitcoin at the user asset account(s) 170. In some examples, such an amount 505 can be received in association with an asset exchange request 120.

In some examples, the interactive element 140 is encoded with data enabling the transfer of funds via one or more networks. Such data can include, for instance, an amount, a timestamp, a tag, a description of the transfer, a description of the asset, an expiry time, a secret, a hash, a fallback on-chain address, a public key, a channel identifier, a fee, a remaining time until expiry, identified features supported by a given network, a signature, a uniform resource identifier (URI), a uniform resource locator (URL), a payment address, a payment destination address, a payment hash, or a combination thereof. In some examples, networks can offer different efficiencies. For example, the Lightning network s capable of handling 1,000,000 transactions per second, while the main Bitcoin blockchain can handle around 7 transactions per second.

In some examples, an interaction with the interactive element 140 can cause a first attempt to transfer funds via a first network. The first network can be identified as the fastest, most secure, most efficient, or otherwise optimal network. In some examples, if the first network is not available, a second attempt to transfer funds via a second network can be made, for example, as a fallback option, without further input or interaction from the user 110 or agent. In some examples, the second network may be slower, less secure, less efficient, or otherwise less optimal than the first network but still able to facilitate the transfer. That is, in some examples, the interactive element 140 can enable transfers via one or more networks via a single interaction. In some examples, the asset exchange service 125 can intelligently select which network to use for facilitating the transfer, for example based on context (e.g., speed, security, efficiency, etc.). In some examples, the asset exchange service 125 can automatically select which network to use for facilitating the transfer, without input from the user.

In some examples, the user interface 520 allows the user 110 to select a mechanism that the server(s) of the transaction processing service 175, the user device 115, and/or the agent device 165 can use to perform the transfer to receive $5.00 worth of Bitcoin at the user asset account(s) 170. As an example, the mechanisms to select from include the Lightning network or the Bitcoin network. As illustrated, the user 110 has selected the Lightning network as indicated by the checkmark. As such, the server(s) of the transaction processing service 175 can perform the transfer using the Lightning network.

Figure 6:
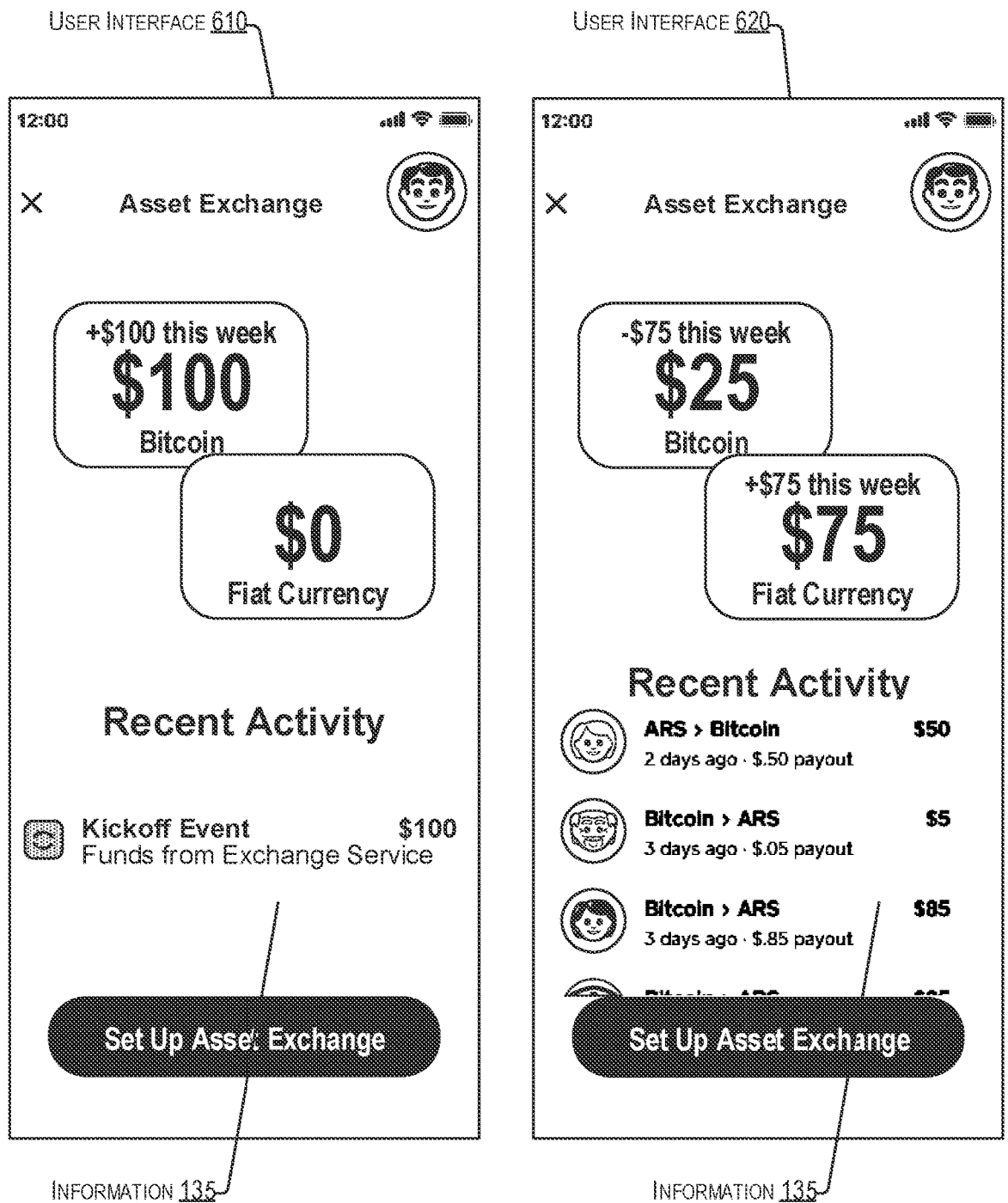
FIG. 6 is a conceptual diagram illustrating user interfaces of an asset management resource used by an agent device of an agent, including a user interface for onboarding and a user interface with a history of asset exchanges involving the agent, in accordance with some examples.

FIG. 6 is a conceptual diagram illustrating user interfaces of an asset management resource 168 used by an agent device 165 of an agent 160, including a user interface 610 for, for example, onboarding and a user interface 615 presenting a history of asset exchanges involving the agent 160. The user interface 610 indicates that, as part of an onboarding process for example, the agent asset account(s) 172 of the agent 160 received $100 worth of Bitcoin from the service asset account(s) 174 as "kickoff" funds to kickstart the agent asset account(s) 172. The user interface 610 indicates that the agent 160 currently has $100 worth of Bitcoin and $0 worth of cash in the agent asset account(s) 172. In some examples, a similar "gifting" of Bitcoin, or other cryptocurrency, can be made, for example, as a reward, an incentive, or the like.

The user interface 620 identifies a history of exchange activity by the agent 160. The exchange activity includes an exchange from 50 ARS to Bitcoin two days ago, for which the agent 160 earned a 0.50 ARS payout. The exchange activity includes an exchange from 5 ARS worth of Bitcoin into ARS three days ago, for which the agent 160 earned a 0.05 ARS payout. The exchange activity includes an exchange from 85 ARS worth of Bitcoin into ARS three days ago, for which the agent 160 earned a 0.85 ARS payout. The exchange activity includes another exchange from Bitcoin into ARS for which the details are obscured. All four exchanges are with different users, who are represented by circular images to the left of the transactions. The user interface 620 indicates that the agent 160 currently has $25 worth of Bitcoin and $75 worth of cash in the agent asset account(s) 172. In some examples, the information provided in the user interface 610 and/or the user interface 620, such as the total amounts of assets, the changes in amounts of assets, and/or the recent activity, can be presented to the user 110 and/or the user device 115 as the information 135.

While FIG. 6 provides a specific example of onboarding an agent with "kickoff" funds, as illustrated in the user interface 610, and tracking exchange activity, which can be reflected in real-time or near-real-time, via the user interface 620, the same or similar user interfaces can be used to represent a balance between assets at a first time and at a second time. The exchange activity can represent recent asset exchanges, asset exchanges over a period of time, a subset of asset exchanges, or the like.

The user interfaces described above in FIGS. 2-6 illustrate example user interfaces for facilitating asset exchanges as described herein. In additional or alternative examples, the user interfaces described above in FIGS. 2-6 can include additional or alternative designs, functionalities, features, or the like.

Figure 7:
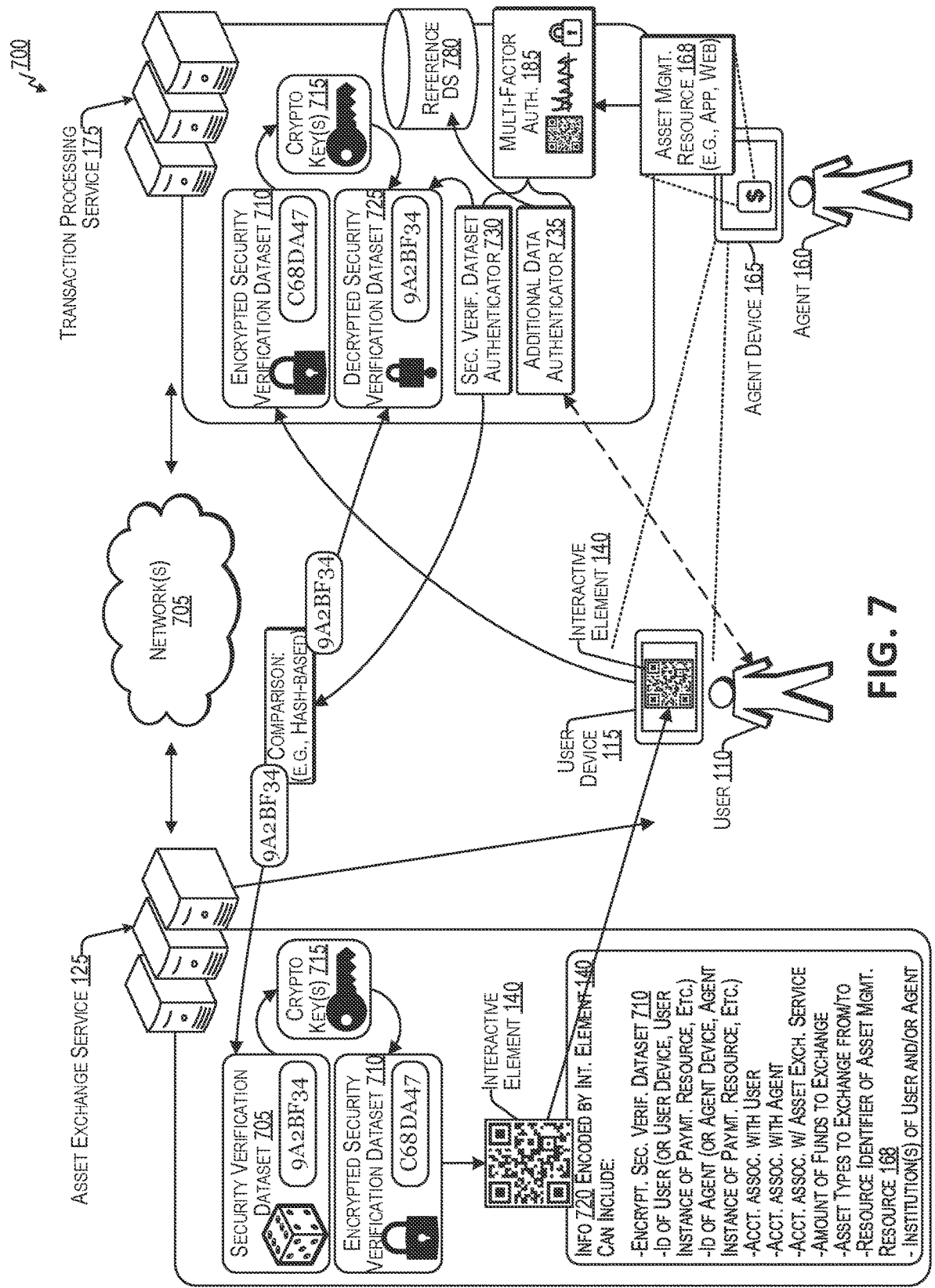
FIG. 7 is a block diagram illustrating aspects of a multi-factor authentication using the interactive element and a multi-factor authenticator, in accordance with some examples.

FIG. 7 is a block diagram 700 illustrating aspects of a multi-factor authentication using the interactive element 140 and a multi-factor authenticator 185. The multi-factor authenticator 185 can include, for instance, a security verification dataset authenticator 730 and/or an additional data authenticator 735.

In some examples, the server(s) of the asset exchange service 125 generate a security verification dataset 705. The server(s) of the asset exchange service 125 can generate the security verification dataset 705 to be unique to the exchange, to the transfer 155, to the transfer 195, to the user 110, to the user device 115, to the agent 160, to the agent device 165, to the user asset account(s) 170, to the agent asset account(s) 172, to the service asset account(s) 174, to one or more institutions (e.g., banks or other financial institutions), to one or more payment services, and/or a combination thereof. An example security verification dataset 705 illustrated in FIG. 7 includes the alphanumeric code "9A2BF34." In some examples, the security verification dataset 705 can include random numbers, characters, and/or strings. In some examples, the security verification dataset 705 can be based on contextual information relevant to the exchange associated with the interactive element 140, for instance based on a hash of such information generated using a secure hash algorithm or other hash function. The information can be any information described herein as encoded in the interactive element 140, any information discussed herein as being part of the asset exchange request 120, and/or any other information (e.g., associated with the exchange, the transfer 155, the transfer 195, the user 110, to user device 115, the agent 160, the agent device 165, the user asset account(s) 170, the agent asset account(s) 172, the service asset account(s) 174, one or more institutions, one or more payment services, a combination thereof).

The server(s) of the asset exchange service 125 can store one or more cryptographic keys 715. The cryptographic key(s) 715 can be symmetric or asymmetric (e.g., public key and private key, encryption key and decryption key, etc.). In some examples, the server(s) of the asset exchange service 125 can generate the cryptographic key(s) 715. The server(s) of the asset exchange service 125 can generate the cryptographic key(s) 715 and/or security verification dataset 705 to be unique to the exchange, to the transfer 155, to the transfer 195, to the user 110, to the user device 115, to the agent 160, to the agent device 165, to the user asset account(s) 170, to the agent asset account(s) 172, to the service asset account(s) 174, to one or more institutions (e.g., banks or other financial institutions), to one or more payment services, a combination thereof. The server(s) of the asset exchange service 125 can generate an encrypted security verification dataset 710 by encrypting the security verification dataset 705 using at least one of the cryptographic key(s) 715 (e.g., the private key and/or the encryption key). An example encrypted security verification dataset 710 illustrated in FIG. 7 includes the alphanumeric code "C68DA47," which is distinct from the alphanumeric code ("9A2BF34") of the example security verification dataset 705.

In some examples, the user device 115 generates and/or stores the cryptographic key(s) 715 instead of or in addition to the server(s) of the asset exchange service 125, and the user device 115 can generate the encrypted security verification dataset 710 by encrypting the security verification dataset 705 using at least one of the cryptographic key(s) 715, and can send the encrypted security verification dataset 710 to the server(s) of the asset exchange service 125. In some examples, the server(s) of the transaction processing service 175 generate and/or store the cryptographic key(s) 715 instead of or in addition to the server(s) of the asset exchange service 125, and the server(s) of the transaction processing service 175 can generate the encrypted security verification dataset 710 by encrypting the security verification dataset 705 using at least one of the cryptographic key(s) 715, and can send the encrypted security verification dataset 710 to the server(s) of the asset exchange service 125.

The server(s) of the asset exchange service 125 generate the interactive element 140 to encode information 720. The information 720 can include the encrypted security verification dataset 710, among other information (e.g., the resource identifier for the asset management resource 168). In some examples, the information 720 can include, for instance, information identifying the user 110, the user device 115, the user instance of the asset management resource 118, the agent 160, the agent device 165, the agent instance of the asset management resource 118, the agent instance of the asset management resource 168, a resource identifier for the agent instance of the asset management resource 118, a resource identifier for the agent instance of the asset management resource 168, an amount of a first asset to exchange for an amount of a second asset, the amount of the second asset, an amount of the first asset in the user asset account(s) 170, an amount of the first asset in the agent asset account(s) 172, an amount of the first asset in the service asset account(s) 174, an amount of the second asset in the user asset account(s) 170, an amount of the second asset in the agent asset account(s) 172, an amount of the second asset in the service asset account(s) 174, an asset type of the first asset (e.g., fiat currency, cryptocurrency, NFT, security asset), an asset type of the second asset, one or more institutions (e.g., banks, lenders, or other financial institutions) associated with the user asset account(s) 170, one or more institutions associated with the agent asset account(s) 172, one or more institutions associated with the service asset account(s) 174, a signature input from the user 110 and/or the user device 115 or an indication thereof, a biometric input from the user 110 and/or the user device 115 or an indication thereof, a signature input from the agent 160 and/or the agent device 165 or an indication thereof, a biometric input from the agent 160 and/or the agent device 165, or an indication thereof, or a combination thereof.

As discussed with respect to FIG. 1, the server(s) of the asset exchange service 125 and/or the server(s) of the transaction processing service 175 receive an indication of the interaction between the agent device 165 and the interactive element 140. For instance, the interaction between the agent device 165 and the interactive element 140 includes the agent device 165 interacting with the interactive element 140 (e.g., using a camera or other optical scanner sensor to scan a glyph) to decode the information 720 that is encoded in the interactive element 140. Through the interaction between the agent device 165 and the interactive element 140, the agent device 165 can receive the encrypted security verification dataset 710 and/or convey the encrypted security verification dataset 710 to the transaction processing service 175.

In some examples, the indication includes an encrypted security verification dataset 710 that is encoded in the interactive element 140. The security verification dataset authenticator 730 (which may be part of the server(s) of the transaction processing service 175 and/or the server(s) of the asset exchange service 125) authenticates the interactive element 140 (and/or the associated exchange) by decrypting the encrypted security verification dataset 710 using at least one of the cryptographic key(s) 715 (e.g., a public key and/or a decryption key) to generate a decrypted security verification dataset 725, and comparing the decrypted security verification dataset 725 to a previously-stored reference instance of the security verification dataset 705. An example decrypted security verification dataset 725 illustrated in FIG. 7 includes the alphanumeric code "9A2BF34," which matches the alphanumeric code ("9A2BF34") of the example security verification dataset 705 and is distinct from the alphanumeric code ("C68DA47") of the example encrypted security verification dataset 710. In some examples, the server(s) of the transaction processing service 175 and/or the asset exchange service 125 can use a hash algorithm to generate a hash (or hash digest) of the decrypted security verification dataset 725 and/or to generate a hash (or hash digest) of a previously-stored reference instance of the security verification dataset 705. A match between the decrypted security verification dataset 725 (or a hash thereof) and a previously-stored reference instance of the security verification dataset 705 (or a hash thereof) indicates to the security verification dataset authenticator 730 that the interactive element 140 is authentic, can perform identity verification 180, and can permit the exchange (e.g., the transfer 155 and/or the transfer 195) to be processed. A disparity or mismatch between the decrypted security verification dataset 725 (or a hash thereof) and the previously-stored reference instance of the security verification dataset 705 (or a hash thereof) indicates to the security verification dataset authenticator 730 that the interactive element 140 is not authentic, can prohibit the exchange (e.g., the transfer 155 and/or the transfer 195) from being processed, and/or can void the exchange (e.g., the transfer 155 and/or the transfer 195).

In some examples, the security verification dataset authenticator 730 (which may be part of the server(s) of the transaction processing service 175 and/or the server(s) of the asset exchange service 125) may lack access to at least one of the cryptographic key(s) 715, and may send the encrypted security verification dataset 710 to a specific device (e.g., the server(s) of the transaction processing service 175, the server(s) of the asset exchange service 125, the user device 115, the agent device 165) that does have access to the cryptographic key(s) 715 so that device can decrypt the encrypted security verification dataset 710 to generate the decrypted security verification dataset 725.

In some examples, the indication includes an instance of a signature (e.g., of the user 110 and/or of the agent 160) that is encoded in the interactive element 140 or transmitted to the server(s) of the asset exchange service 125. The additional data authenticator 735 (which may be part of the server(s) of the transaction processing service 175 and/or the server(s) of the asset exchange service 125) authenticates the interactive element 140 and/or the exchange by comparing the signature to a previously-stored reference instance of the signature (e.g., of the user 110 and/or of the agent 160) that is stored in a reference data store 780. In some examples, the additional data authenticator 735 authenticates the signature by comparing at least one or more aspects (e.g., letters, shapes, curvatures) of a signature (or a hash thereof) to at least one or more corresponding aspects of a previously-stored reference instance of the signature (or a hash thereof) that is stored in a reference data store 780. If either or both these signature pairs match, the additional data authenticator 735 indicates that the signature is authentic, and can permit the exchange to be processed. If either or both these signature pairs do not match or otherwise correspond (e.g., they include a disparity), the additional data authenticator 735 indicates that the signature is not authentic, can prohibit the exchange (e.g., the transfer 155 and/or the transfer 195) from being processed, and/or can void the exchange (e.g., the transfer 155 and/or the transfer 195). In some examples, the additional data authenticator 735 can check whether signature(s) of the user 110 and/or agent 160 are included in the asset exchange request 120 or another communication between the server(s) of the asset exchange service 125, the user device 115, and/or the agent device 165, in addition to or instead of checking whether the signature(s) are valid as described above.

In some examples, the indication includes additional data that is encoded in the interactive element 140 and/or that is part of the asset exchange request 120 or another communication between the server(s) of the asset exchange service 125, the user device 115, and/or the agent device 165. The additional data authenticator 735 (which may be part of the server(s) of the transaction processing service 175 and/or the server(s) of the asset exchange service 125) authenticates the interactive element 140 and/or the exchange by comparing the additional contextual data that is encoded in the interactive element 140 and/or that is part of the asset exchange request 120 or another communication between the server(s) of the asset exchange service 125, the user device 115, and/or the agent device 165 to previously-stored reference instance of the additional data that is stored in a reference data store 780, to information about the agent device 165 that interacts with the interactive element 140, to information about the agent 160, to information about the user device 115 that sends the asset exchange request 120, to information about the user 110, or a combination thereof. If the compared additional data matches, the additional data authenticator 735 indicates that the additional data is authentic, and can permit the exchange to be processed. If compared additional data does not match (e.g., includes a disparity), the additional data authenticator 735 indicates that the additional data is not authentic, can prohibit the exchange (e.g., the transfer 155 and/or the transfer 195) from being processed, and/or can void the exchange (e.g., the transfer 155 and/or the transfer 195). In some examples, instead of prohibiting or voiding the exchange, the server(s) of the asset exchange service 125 can prompt the user 110 and/or agent 160 for additional verification.

Figure 8:
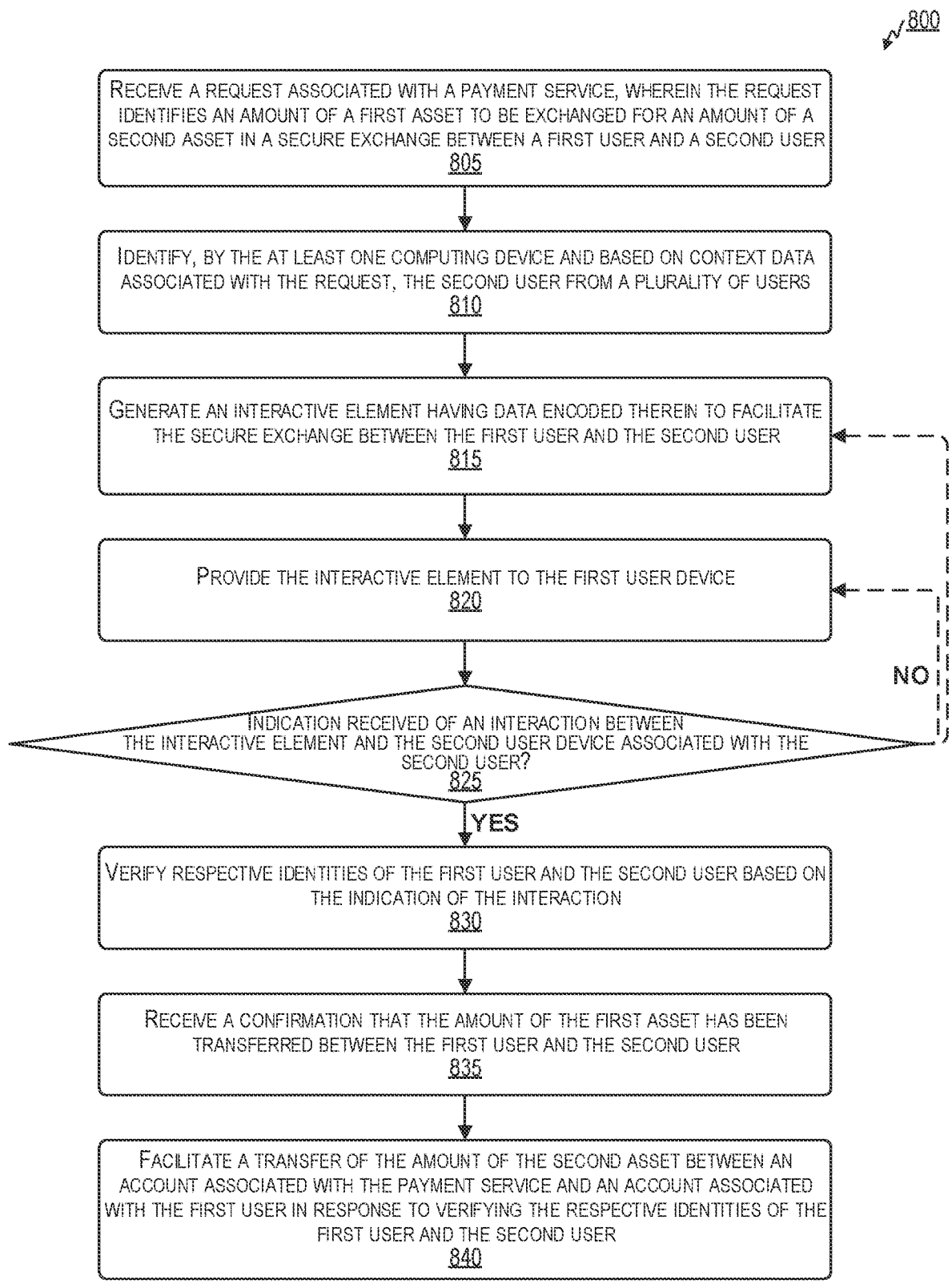
FIG. 8 is a flow diagram illustrating an asset exchange process, in accordance with some examples.

FIG. 8 is a flow diagram illustrating an asset exchange process 800. In some examples, the asset exchange process 800 is performed by an asset exchange system. The asset exchange system can include, for instance, the asset exchange system 100, the network 105, user device 115, the asset management resource 118, the asset exchange service 125, the printer 150, the agent device 165, the asset management resource 168, the transaction processing service 175, the multi-factor authenticator 185, the trained ML model(s) 190, the user interface 210, the user interface 220, the user interface 310, the user interface 320, the user interface 410, the user interface 420, the user interface 510, the user interface 520, the user interface 610, the user interface 620, the reference data store 780, the server(s) 902, the network(s) 904, the user devices 906, the merchant device(s) 908(A)-908(N), the server(s) 910, the POS application 918, the reader device 922, the POS system 924, the server(s) 1002, the network(s) 1004, the user devices 1006, the user device(s) 1008(A)-908(N), the server(s) 1010, the payment application 1018, the data store(s) 1100, the asset storage 1102, the user account(s) 1104, the private blockchain 1119, the application programming interfaces (APIs) 1204, the network(s) 1202, the user device 1302, the server(s) 1304, the reader device(s) 1326, the datastore 1344, a computing system, an apparatus, a processor executing instructions stored in a non-transitory computer-readable storage medium, one or more components or subsets of any of the previously-listed systems, or a combination thereof. The order in which the operations of the process 800 are described is not intended to be construed as a limitation, and any number of the described blocks can be combined in any order and/or in parallel to implement the processes. In some embodiments, one or more blocks of the process 800 can be omitted entirely. Moreover, the process 800 can be combined in whole or in part with other processes, methods, actions, and/or operations described herein.

At operation 805, the asset exchange system is configured to, and can, receive a request associated with the payment service. The request identifies an amount of a first asset to be exchanged for an amount of a second asset in a secure exchange between a first user and a second user. The asset exchange request 120 is an example of the request. Examples of the amounts of the assets are the $75 in the user interface 210, the $75 in the user interface 420, the amount 505, the $100 in the user interface 610, the amounts in the user interface 620, or a combination thereof. Examples of the first user include the user 110, the agent 160, any of the users 914, any of the merchants 916(A)-916(N), any of the customers 920, any of the users 1014, any of the users 1016(A)-1016(B), a user associated with the user account(s) 1104, a user associated with the user device 1302, or a combination thereof.

In some examples, the request may be received by the asset exchange system from a user device of the first user or a user device of the second user. Examples of the user device of the first user, or of the user device of the second user, include the user device 115, the agent device 165, a user device that displays the user interface 210, a user device that displays the user interface 220, a user device that displays the user interface 310, a user device that displays the user interface 320, a user device that displays the user interface 410, a user device that displays the user interface 420, a user device that displays the user interface 510, a user device that displays the user interface 520, a user device that displays the user interface 610, a user device that displays the user interface 620, any of the user devices 906, any of the merchant devices 908(A)-908(N), the reader device 922, the POS system 924, any of the user devices 1006, any of the user devices 1008(A)-1008(N), the user device 1302, or a combination thereof.

In some examples, the first asset is a physical asset, such as a fiat currency. In some examples, the first asset is a digital asset, such as a cryptocurrency and/or a non-fungible token (NFT). In some examples, the second asset is a digital asset, such as a cryptocurrency and/or a non-fungible token (NFT). In some examples, the second asset is a physical asset, such as a fiat currency.

At operation 810, the asset exchange system is configured to, and can, identify, based on context data associated with the request, the second user from a plurality of users. Examples of the second user include the user 110, the agent 160, any of the users 914, any of the merchants 916(A)-916(N), any of the customers 920, any of the users 1014, any of the users 1016(A)-1016(B), a user associated with the user account(s) 1104, a user associated with the user device 1302, or a combination thereof.

In some examples, the context data includes at least one of user data about the first user, agent data about the second user, one or more user preferences of the first user, one or more agent preferences of the second user, one or more trust indications for the first user, one or more trust indications for the second user, one or more social network indications for the first user, one or more social network indications for the second user, one or more relationship indications for the first user, one or more relationship indications for the second user, a location of the first user, a location of the second user, the amount of the fiat currency, the amount of the cryptocurrency, a total amount of the cryptocurrency that is accessible to draw from for the secure exchange, or a combination thereof.

In some examples, the context data includes an output of an analysis of information about the first user and information about the second user, wherein the analysis uses at least one of a rule, a heuristic, or a machine learning model (e.g., the trained ML model(s) 190).

For instance, if the first user wishes to exchange a specified amount of a specified asset, the asset exchange system can use this context data to identify the second user because the second user has at least the specified amount of the specified asset available to exchange. If the first user is in a specified geographic area (e.g., a certain country, city, street, or other region), the asset exchange system can use this context data to identify the second user because the second user is also in that specified geographic area, or is within a threshold range of that specified geographic area. If the first user has indicated a preference to only exchange with a second user whose rating, score, or other trust indicator exceeds a minimum threshold for trust, the asset exchange system can use this context data to identify the second user because the second user's rating, score, or other trust indicator exceeds the minimum threshold for trust. If the first user has indicated a preference to only exchange with a second user with a certain type of relationship with the first user (e.g., at least acquaintances or friends-of-friends) or social network connectedness level with the first user (e.g., under a maximum under of degrees of separation), the asset exchange system can use this context data to identify the second user because the second user has that type of relationship with the first user ad/or has that social network connectedness level with the first user In some examples, the first user is an example of the user 110, the first user device is an example of the user device 115, the second user is an example of the agent 160, and the second user device is an example of the agent device 165.

In some examples, the first user is an example of the agent 160, the first user device is an example of the agent device 165, the second user is an example of the user 110, and the second user device is an example of the user device 115.

At operation 815, the asset exchange system is configured to, and can, generate an interactive element having data encoded therein to facilitate the secure exchange between the first user and the second user. The interactive element 140 is an example of the interactive element of operation 815.

In some examples, the asset exchange system can generate the interactive element so that the data encoded therein includes at least a subset of the information 720, information identifying a user account associated with the first user, information identifying an asset account for the first asset associated with the first user, information identifying an asset account for the second asset associated with the first user, information identifying the first asset, information identifying the second asset, information identifying the amount of the first asset, information identifying the amount of the second asset, information identifying a mechanism for facilitating the transfer of the amount of the second asset, or a combination thereof.

In some examples, the asset exchange system is configured to, and can, provide, to the first user device associated with the first user, at least one of an indication of an identity of the second user, a trust indication of the second user, an indication of the location of the second user device relative to the location of the first user device, or a combination thereof. For instance, the indication of an identity of the second user may include a name, a username, an image, a phone number, an email address, a location of the second user and/or agent device, an area that the second user and/or agent device is located in, directions from the location of the first user and/or user device to the location of the second user and/or agent device, or a combination thereof. The trust indication of the second user can include reviews, ratings, comments, scores and/or feedback about the second user (e.g., from previous users who have had exchanges with the second user). The indication of the location of the second user device relative to the location of the first user device can include a location of the second user and/or agent device, an area that the second user and/or agent device is located in, directions from the location of the first user and/or user device to the location of the second user and/or agent device, or a combination thereof. In some examples, some information (e.g., location information, information about types of assets possessed, image(s), name(s) or other identifiers, etc.) may be provided and presented temporarily to provide additional layers of security, and can later be deleted or otherwise removed or withdrawn from storage at the user device(s) of the first user and/or the second user. Such security measures can prevent malicious parties from using the provided information about the first user and/or the second user to determine that the first user and/or the second user might have large quantities of currencies and/or other assets on their person(s) in preparation for an exchange, to prevent the first user and/or the second user from being targeted for theft using such information.

In some examples, the asset exchange system is configured to, and can, dynamically change at least a subset of the data that is encoded in the interactive element over time. For instance, the interactive element can be dynamic, and can change periodically so that the interactive element expires and is replaced periodically. In some examples, the interactive element can be generated with certain restrictions, for instance to be temporarily usable for up to a threshold number of transactions, to be temporarily usable for up to a threshold amount of asset(s) in deposits and/or withdrawals and/or transfers and/or exchanges, to only be usable as long as the user device remains within a particular area (e.g., based on geolocation), to be temporarily usable until a particular threshold time, or a combination thereof.

At operation 820, the asset exchange system is configured to, and can, provide the interactive element to a first user device. In some examples, the asset exchange system is configured to, and can, cause the first user device (e.g., an instance of a payment application running thereon) to surface (e.g., display or otherwise output) the interactive element at the first user device, for instance so that the second user device can interact with the interactive element. The user interface 410, the user interface 510, and the user interface 520 all illustrate examples of first user device outputting the interactive element after the asset exchange system provides the interactive element to the first user device.

In some examples, the asset exchange system is configured to, and can, cause, based on monitoring a location of the first user device, the first user device (e.g., an instance of a payment application running thereon) to surface the interactive element at the first user device in response to a determination that a location of the first user device is within a threshold distance of a location of the second user device associated with the second user. For instance, the instance of the payment application can surface the interactive element so that the second user device can interact with the interactive element.

At decision 825, the asset exchange system is configured to, and can, determine whether the asset exchange system has received an indication of an interaction between the interactive element and a second user device associated with the second user. If the asset exchange system receives the indication, the asset exchange process 800 can continue to operation 830. If the asset exchange system does not receive the indication, the asset exchange process 800 can continue to wait for the indication, or can revert back to operation 805, operation 810, operation 815, or operation 820. In some examples, the indication can be received from the agent's device. In some examples, the indication can be received from a server that is configured to serve information at a network location identified by a resource identifier encoded in the interactive element. The payment service system verifies respective identities of the user and the agent based on the interaction, the indication, information associated with the interaction, and/or information associated with the indication.

In some examples, the interactive element includes an optical glyph. The data encoded in the interactive element is optically encoded in the optical glyph. The interaction between the interactive element and the second user device includes an optical scan of the optical glyph by the second user device. Examples of an optical glyph include a quick response (QR) code, a bar code, a data matrix, an Aztec code, Maxicode, a CodaBlock-F code, a Maxicode, a MicroPDF417 code, a PDF417 code, a Han Xin code, a DotCode, a snaptag, a color variant of any of the previously-listed glyph types (increasing storage capacity by using color as an additional dimension), or a combination thereof.

In some examples, the interactive element includes a dataset to be transferred wirelessly using a short-range wireless communication interface, such as NFC, RFID, Bluetooth®, PAN, WLAN, light-based communication, or a combination thereof. Providing the interactive element to the first user device includes transmitting the dataset to the first user device. The interaction between the interactive element and the second user device includes a wireless transfer of the dataset from the first user device to the second user device via the short-range wireless communication interface.

At operation 830, the asset exchange system is configured to, and can, verify respective identities of the first user and the second user based on the indication of the interaction (e.g., as in the identity verification 180). For instance, the asset exchange system can verify respective identities of the first user and the second user based on the security verification dataset authenticator 730, the additional data authenticator 735, the multi-factor authenticator 185, or a combination thereof.

At operation 835, the asset exchange system is configured to, and can, receive a confirmation that the second user has received the amount of the first asset from the first user (e.g., as part of the transfer 155). In some examples, the transfer 155 may be of a physical asset (e.g., a fiat currency), of a digital asset (e.g., a cryptocurrency, an NFT, or a security asset), or a combination thereof. If the transfer 155 is of a physical asset, the confirmation can come from the second user (and/or from the first user) confirming that the transfer 155 took place via user interface(s) of the first user device and/or the second user device. If the transfer 155 is of a digital asset, the confirmation can come directly from the first user device and/or the second user device, and/or can come from the second user (and/or from the first user) confirming that the transfer 155 took place via user interface(s) of the first user device and/or the second user device.

At operation 840, the asset exchange system is configured to, and can, facilitate a transfer (e.g., the transfer 195) of the amount of the second asset between an account associated with the payment service and an account associated with the first user in response to verifying the respective identities of the first user and the second user. Examples of the account associated with the first user include the user asset account(s) 170, a user account 1120, or a combination thereof. Examples of the account associated with the payment service includes the service asset account(s) 174, the agent asset account(s) 172, a user account 1120, or a combination thereof. In some examples, the account associated with the payment service is also associated with the second user (e.g., the agent asset account(s) 172).

In some examples, the confirmation is indicative of the amount of the first asset having been transferred from the first user to the second user, and the transfer of the amount of the second asset is from the account associated with the payment service to the account associated with the first user.

In some examples, the confirmation is indicative of the amount of the first asset having been transferred from the second user to the first user, and the transfer of the amount of the second asset is from the account associated with the first user to the account associated with the payment service.

In some examples, facilitating the transfer of the amount of the second asset from the account associated with the payment service to the account associated with the first user includes causing a record indicative of the transfer to be added to a payload of a block of a distributed ledger corresponding to the second asset. The distributed ledger can be a blockchain ledger or a directed acyclic graph (DAG) ledger.

Figure 9:
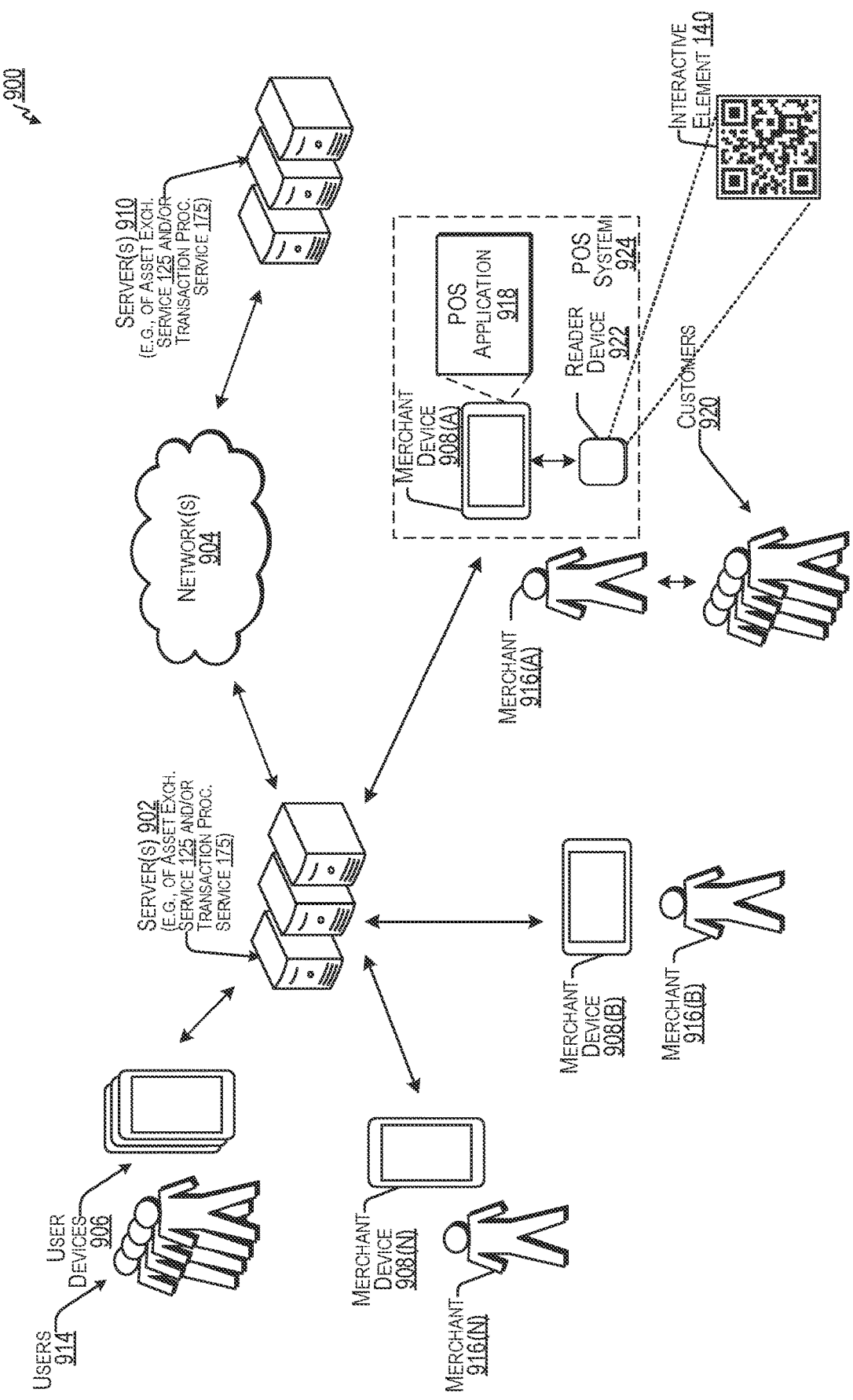
FIG. 9 is a block diagram illustrating an environment that includes various devices associated with one or more merchants, in accordance with some examples.

FIG. 9 is a block diagram illustrating an environment 900 that includes various devices associated with one or more merchants. The environment 900 includes server(s) 902 that can communicate over a network 904 with user devices 906 (which, in some examples can be merchant devices 908 (individually, 908(A)-908(N))) and/or server(s) 910 associated with third-party service provider(s). The server(s) 902 can be associated with a service provider that can provide one or more services for the benefit of users 914, as described below. Actions attributed to the service provider can be performed by the server(s) 902.

The user 110 may be an example of one of the users 914 and/or the customers 920. The user device 115 may be an example of one of the user devices 906. The agent 160 may be an example of one of the merchants 916(A)-916(N)). The agent device 165 may be an example of one of the merchant devices 908(A)-908(N), the reader device 922, and/or the POS system 924. For instance, the interactive element 140 can be interacted with, and the corresponding information read by, one of the merchant devices 908(A)-908(N), the reader device 922, and/or the POS system 924. The information can include a resource identifier that causes the merchant devices 908(A)-908(N), the reader device 922, and/or the POS system 924 to access a depositing resource of the POS application 918. The asset exchange resource 118 and/or the asset exchange resource 168 may be examples of the POS application 918, any software or websites running on the user devices 906, or a combination thereof. The printer 150 may be an example of one of the user devices 906, one of the merchant devices 908(A)-908(N), and/or the POS system 924. The network(s) 105 may be example(s) of the network(s) 904. The server(s) associated with the asset exchange service 125 may be examples of the server(s) 902, the server(s) 910, or a combination thereof. The server(s) associated with the transaction processing service 175 may be examples of the server(s) 902, the server(s) 910, or a combination thereof.

The environment 900 can include a plurality of user devices 906, as described above. Each one of the plurality of user devices 906 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 914. The users 914 can be referred to as customers, buyers, merchants, sellers, borrowers, employees, employers, payors, payees, couriers and so on. The users 914 can interact with the user devices 906 via user interfaces presented via the user devices 906. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 906 can have an instance or versioned instance of an application, which can be downloaded from an application store, for example, which can present the user interface(s) described herein. In at least one example, a user 914 can interact with the user interface via touch input, spoken input, or any other type of input.

As described above, in at least one example, the users 914 can include merchants 916 (individually, 916(A)-916(N)). In an example, the merchants 916 can operate respective merchant devices 908, which can be user devices 906 configured for use by merchants 916. For the purpose of this discussion, a "merchant" can be any entity that offers items (e.g., goods or services) for purchase or other means of acquisition (e.g., rent, borrow, barter, etc.). The merchants 916 can offer items for purchase or other means of acquisition via brick-and-mortar stores, mobile stores (e.g., popup shops, food trucks, etc.), online stores, combinations of the foregoing, and so forth. In some examples, at least some of the merchants 916 can be associated with a same entity but can have different merchant locations and/or can have franchise/franchisee relationships. In additional or alternative examples, the merchants 916 can be different merchants. That is, in at least one example, the merchant 916(A) is a different merchant than the merchant 916(B) and/or the merchant 916(C).

For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN) s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

Each merchant device 908 can have an instance of a POS application 918 stored thereon. The POS application 918 can configure the merchant device 908 as a POS terminal, which enables the merchant 916(A) to interact with one or more customers 920. As described above, the users 914 can include customers, such as the customers 920 shown as interacting with the merchant 916(A). For the purpose of this discussion, a "customer" can be any entity that acquires items from merchants. While only two customers 920 are illustrated in FIG. 9, any number of customers 920 can interact with the merchants 916. Further, while FIG. 9 illustrates the customers 920 interacting with the merchant 916(A), the customers 920 can interact with any of the merchants 916.

In at least one example, interactions between the customers 920 and the merchants 916 that involve the exchange of funds (from the customers 920) for items (from the merchants 916) can be referred to as "transactions." In at least one example, the POS application 918 can determine transaction data associated with the POS transactions. Transaction data can include payment information, which can be obtained from a reader device 922 associated with the merchant device 908(A), user authentication data, purchase amount information, point-of-purchase information (e.g., item(s) purchased, date of purchase, time of purchase, etc.), etc. The POS application 918 can send transaction data to the server(s) 902 such that the server(s) 902 can track transactions of the customers 920, merchants 916, and/or any of the users 914 over time. Furthermore, the POS application 918 can present a UI to enable the merchant 916(A) to interact with the POS application 918 and/or the service provider via the POS application 918.

In at least one example, the merchant device 908(A) can be a special-purpose computing device configured as a POS terminal (via the execution of the POS application 918). In at least one example, the POS terminal may be connected to a reader device 922, which is capable of accepting a variety of payment instruments, such as credit cards, debit cards, gift cards, short-range communication based payment instruments, and the like, as described below. In at least one example, the reader device 922 can plug in to a port in the merchant device 908(A), such as a microphone port, a headphone port, an audio-jack, a data port, or other suitable port. In additional or alternative examples, the reader device 922 can be coupled to the merchant device 908(A) via another wired or wireless connection, such as via a Bluetooth®, BLE, and so on. Additional details are described below with reference to FIG. 12. In some examples, the reader device 922 can read information from alternative payment instruments including, but not limited to, wristbands and the like.

In some examples, the reader device 922 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards or devices configured for tapping). The POS terminal may provide a rich user interface, communicate with the reader device 922, and communicate with the server(s) 902, which can provide, among other services, a payment processing service. The server(s) 902 associated with the service provider can communicate with server(s) 910, as described below. In this manner, the POS terminal and reader device 922 may collectively process transaction(s) between the merchants 916 and customers 920. In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device). In some examples, there could be multiple POS terminal(s) connected to a number of other devices, such as "secondary" terminals, e.g., back-of-the-house systems, printers, line-buster devices, POS readers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While the POS terminal and the reader device 922 of the POS system 924 are shown as separate devices, in additional or alternative examples, the POS terminal and the reader device 922 can be part of a single device. In some examples, the reader device 922 can have a display integrated therein for presenting information to the customers 920. In additional or alternative examples, the POS terminal can have a display integrated therein for presenting information to the customers 920. POS systems, such as the POS system 924, may be mobile, such that POS terminals and reader devices may process transactions in disparate locations across the world. POS systems can be used for processing card-present transactions and card-not-present (CNP) transactions, as described below.

A card-present transaction is a transaction where both a customer 920 and his or her payment instrument are physically present at the time of the transaction. Card-present transactions may be processed by swipes, dips, taps, or any other interaction between a physical payment instrument (e.g., a card), or otherwise present payment instrument, and a reader device 922 whereby the reader device 922 is able to obtain payment data from the payment instrument. A swipe is a card-present transaction where a customer 920 slides a card, or other payment instrument, having a magnetic strip through a reader device 922 that captures payment data contained in the magnetic strip. A dip is a card-present transaction where a customer 920 inserts a payment instrument having an embedded microchip (i.e., chip) into a reader device 922 first. The dipped payment instrument remains in the payment reader until the reader device 922 prompts the customer 920 to remove the card, or other payment instrument. While the payment instrument is in the reader device 922, the microchip can create a one-time code which is sent from the POS system 924 to the server(s) 910 (which can be associated with third-party service providers that provide payment services, including but not limited to, an acquirer bank, an issuer, and/or a card payment network (e.g., Mastercard®, VISA®, etc.)) to be matched with an identical one-time code. A tap is a card-present transaction where a customer 920 may tap or hover his or her payment instrument (e.g., card, electronic device such as a smart phone running a payment application, etc.) over a reader device 922 to complete a transaction via short-range communication (e.g., NFC, RFID, Bluetooth®, BLE, etc.). Short-range communication enables the payment instrument to exchange information with the reader device 922. A tap may also be called a contactless payment.

A CNP transaction is a transaction where a card, or other payment instrument, is not physically present at the POS such that payment data is required to be manually keyed in (e.g., by a merchant, customer, etc.), or payment data is required to be recalled from a card-on-file data store, to complete the transaction.

The POS system 924, the server(s) 902, and/or the server(s) 910 may exchange payment information and transaction data to determine whether transactions are authorized. For example, the POS system 924 may provide encrypted payment data, user authentication data, purchase amount information, point-of-purchase information, etc. (collectively, transaction data) to server(s) 902 over the network(s) 904. The server(s) 902 may send the transaction data to the server(s) 910. As described above, in at least one example, the server(s) 910 can be associated with third-party service providers that provide payment services, including but not limited to, an acquirer bank, an issuer, and/or a card payment network (e.g., Mastercard®, VISA®, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server(s) 910 associated therewith) can send a fund transfer request to a server computing device of a card payment network (e.g., Mastercard®, VISA®, etc.) to determine whether the transaction is authorized or deficient. In at least one example, the service provider can serve as an acquirer and connect directly with the card payment network.

The card payment network (e.g., the server(s) 910 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server(s) 910 associated therewith) can make a determination as to whether the customer has the capacity to absorb the relevant charge associated with the payment transaction. In at least one example, the service provider can serve as an issuer and/or can partner with an issuer. The transaction is either approved or rejected by the issuer and/or the card payment network (e.g., the server(s) 910 associated therewith), and a payment authorization message is communicated from the issuer to the POS device via a path opposite of that described above, or via an alternate path.

As described above, the server(s) 910, which can be associated with payment service provider(s), may determine whether the transaction is authorized based on the transaction data, as well as information relating to parties to the transaction (e.g., the customer 920 and/or the merchant 916(A)). The server(s) 910 may send an authorization notification over the network(s) 904 to the server(s) 902, which may send the authorization notification to the POS system 924 over the network(s) 904 to indicate whether the transaction is authorized. The server(s) 902 may also transmit additional information such as transaction identifiers to the POS system 924. In one example, the server(s) 902 may include a merchant application and/or other functional components for communicating with the POS system 924 and/or the server(s) 910 to authorize or decline transactions.

Based on the authentication notification that is received by the POS system 924 from server(s) 902, the merchant 916(A) may indicate to the customer 920 whether the transaction has been approved. In some examples, approval may be indicated at the POS system 924, for example, at a display of the POS system 924. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, onboarding services, identity verification (IDV) services, and so on. In some examples, the users 914 can access all of the services of the service provider. In other examples, the users 914 can have gradated access to the services, which can be based on risk tolerance, IDV outputs, subscriptions, and so on. In at least one example, access to such services can be availed to the merchants 916 via the POS application 918. In additional or alternative examples, each service can be associated with its own access point (e.g., application, web browser, etc.).

The service provider can offer payment processing services for processing payments on behalf of the merchants 916, as described above. For example, the service provider can provision payment processing software, payment processing hardware and/or payment processing services to merchants 916, as described above, to enable the merchants 916 to receive payments from the customers 920 when conducting POS transactions with the customers 920. For instance, the service provider can enable the merchants 916 to receive cash payments, payment card payments, and/or electronic payments from customers 920 for POS transactions and the service provider can process transactions on behalf of the merchants 916.

As the service provider processes transactions on behalf of the merchants 916, the service provider can maintain accounts or balances for the merchants 916 in one or more ledgers. For example, the service provider can analyze transaction data received for a transaction to determine an amount of funds owed to a merchant 916(A) for the transaction. In at least one example, such an amount can be a total purchase price less fees charged by the service provider for providing the payment processing services. Based on determining the amount of funds owed to the merchant 916(A), the service provider can deposit funds into an account of the merchant 916(A). The account can have a stored balance, which can be managed by the service provider. The account can be different from a conventional bank account at least because the stored balance is managed by a ledger of the service provider and the associated funds are accessible via various withdrawal channels including, but not limited to, scheduled deposit, same-day deposit, instant deposit, and a linked payment instrument.

A scheduled deposit can occur when the service provider transfers funds associated with a stored balance of the merchant 916(A) to a bank account of the merchant 916(A) that is held at a bank or other financial institution (e.g., associated with the server(s) 910). Scheduled deposits can occur at a prearranged time after a POS transaction is funded, which can be a business day after the POS transaction occurred, or sooner or later. In some examples, the merchant 916(A) can access funds prior to a scheduled deposit. For instance, the merchant 916(A) may have access to same-day deposits (e.g., wherein the service provider deposits funds from the stored balance to a linked bank account of the merchant on a same day as POS transaction, in some examples prior to the POS transaction being funded) or instant deposits (e.g., wherein the service provider deposits funds from the stored balance to a linked bank account of the merchant on demand, such as responsive to a request). Further, in at least one example, the merchant 916(A) can have a payment instrument that is linked to the stored balance that enables the merchant to access the funds without first transferring the funds from the account managed by the service provider to the bank account of the merchant 916(A).

In at least one example, the service provider may provide inventory management services. That is, the service provider may provide inventory tracking and reporting. Inventory management services may enable the merchant 916(A) to access and manage a database storing data associated with a quantity of each item that the merchant 916(A) has available (i.e., an inventory). Furthermore, in at least one example, the service provider can provide catalog management services to enable the merchant 916(A) to maintain a catalog, which can be a database storing data associated with items that the merchant 916(A) has available for acquisition (i.e., catalog management services). In at least one example, the catalog may include a plurality of data items and a data item of the plurality of data items may represent an item that the merchant 9121(A) has available for acquisition. The service provider can offer recommendations related to pricing of the items, placement of items on the catalog, and multi-party fulfilment of the inventory.

In at least one example, the service provider can provide business banking services, which allow the merchant 916(A) to track deposits (from payment processing and/or other sources of funds) into an account of the merchant 916(A), payroll payments from the account (e.g., payments to employees of the merchant 916(A)), payments to other merchants (e.g., business-to-business) directly from the account or from a linked debit card, withdrawals made via scheduled deposit and/or instant deposit, etc. Furthermore, the business banking services can enable the merchant 916(A) to obtain a customized payment instrument (e.g., credit card), check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the merchants 916 to visualize their cash flow to track their financial health, set aside money for upcoming obligations (e.g., savings), organize money around goals, etc.

In at least one example, the service provider can provide financing services and products, such as via business loans, consumer loans, fixed term loans, flexible term loans, and the like. In at least one example, the service provider can utilize one or more risk signals to determine whether to extend financing offers and/or terms associated with such financing offers.

In at least one example, the service provider can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, the service provider can offer different types of capital loan products. For instance, in at least one example, the service provider can offer a daily repayment loan product, wherein a capital loan is repaid daily, for instance, from a portion of transactions processed by the payment processing service on behalf of the borrower. Additionally and/or alternatively, the service provider can offer a monthly repayment loan product, wherein a capital loan is repaid monthly, for instance, via a debit from a bank account linked to the payment processing service. The credit risk of the merchant may be evaluated using risk models that take into account factors, such as payment volume, credit risk of similarly situated merchants, past transaction history, seasonality, credit history, and so on.

Additionally or alternatively, the service provider can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of the merchants 916. The service provider can generate the loan based at least in part on determining that the borrower purchased or intends to purchase the item from the merchant. The loan can be associated with a balance based on an actual purchase price of the item and the borrower can repay the loan over time. In some examples, the borrower can repay the loan via installments, which can be paid via funds managed and/or maintained by the service provider (e.g., from payments owed to the merchant from payments processed on behalf of the merchant, funds transferred to the merchant, etc.). The service provider can offer specific financial products, such as payment instruments, tied specifically to the loan products. For example, in one implementation, the server provider 912 associates capital to a merchant or customer's debit card, where the use of the debit card is defined by the terms of the loan. In some examples, the merchant may only use the debit card for making specific purchases. In other examples, the "installment" associated with the loan product is credited directly via the payment instrument. The payment instrument is thus customized to the loan and/or the parties associated with the loan.

The service provider can provide web-development services, which enable users 914 who are unfamiliar with HTML, XML, Javascript, CSS, or other web design tools to create and maintain professional and aesthetically pleasing websites. Some of these web page editing applications allow users to build a web page and/or modify a web page (e.g., change, add, or remove content associated with a web page). Further, in addition to websites, the web-development services can create and maintain other online omni-channel presences, such as social media posts for example. In some examples, the resulting web page(s) and/or other content items can be used for offering item(s) for sale via an online/e-commerce platform. That is, the resulting web page(s) and/or other content items can be associated with an online store or offering by the one or more of the merchants 916. In at least one example, the service provider can recommend and/or generate content items to supplement omni-channel presences of the merchants 916. That is, if a merchant of the merchants 916 has a web page, the service provider—via the web-development or other services—can recommend and/or generate additional content items to be presented via other channel(s), such as social media, email, etc.

Furthermore, the service provider can provide payroll services to enable employers to pay employees for work performed on behalf of employers. In at least one example, the service provider can receive data that includes time worked by an employee (e.g., through imported timecards and/or POS interactions), sales made by the employee, gratuities received by the employee, and so forth. Based on such data, the service provider can make payroll payments to employee(s) on behalf of an employer via the payroll service. For instance, the service provider can facilitate the transfer of a total amount to be paid out for the payroll of an employee from the bank of the employer to the bank of the service provider to be used to make payroll payments. In at least one example, when the funds have been received at the bank of the service provider, the service provider can pay the employee, such as by check or direct deposit, often a day, a week, or more after when the work was actually performed by the employee. In additional or alternative examples, the service provider can enable employee(s) to receive payments via same-day or instant deposit based at least in part on risk and/or reliability analyses performed by the service provider.

Moreover, in at least one example, the service provider can provide employee management services for managing schedules of employees. Further, the service provider can provide appointment services for enabling users 914 to set schedules for scheduling appointments and/or users 914 to schedule appointments.

In some examples, the service provider can provide restaurant management services to enable users 914 to make and/or manage reservations, to monitor front-of-house and/or back-of-house operations, and so on. In such examples, the merchant device(s) 908 and/or server(s) 902 can be configured to communicate with one or more other computing devices, which can be located in the front-of-house (e.g., POS device(s)) and/or back-of-house (e.g., kitchen display system(s) (KDS)). In at least one example, the service provider can provide order management services and/or fulfillment services to enable restaurants to manage open tickets, split tickets, and so on and/or manage fulfillment services. In some examples, such services can be associated with restaurant merchants, as described above. In additional or alternative examples, such services can be any type of merchant.

In at least one example, the service provider can provide fulfilment services, which can use couriers for delivery, wherein couriers can travel between multiple locations to provide delivery services, photography services, etc. Couriers can be users 914 who can travel between locations to perform services for a requesting user 914 (e.g., deliver items, capture images, etc.). In some examples, the courier can receive compensation from the service provider. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the service provider can receive requests for courier services, automatically assign the requests to active couriers, and communicate dispatch instructions to couriers via user interface (e.g., application, web browser, or other access point) presented via respective devices 906.

In some examples, the service provider can provide omni-channel fulfillment services. For instance, if a customer places an order with a merchant and the merchant cannot fulfill the order because one or more items are out of stock or otherwise unavailable, the service provider can leverage other merchants and/or sales channels that are part of the platform of the service provider to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the service provider can enable conversational commerce via conversational commerce services, which can use one or more machine learning mechanisms to analyze messages exchanged between two or more users 914, voice inputs into a virtual assistant or the like, to determine intents of user(s) 914. In some examples, the service provider can utilize determined intents to automate customer service, offer promotions, provide recommendations, or otherwise interact with customers in real-time. In at least one example, the service provider can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, a user 914 may be new to the service provider such that the user 914 that has not registered (e.g., subscribed to receive access to one or more services offered by the service provider) with the service provider. The service provider can offer onboarding services for registering a potential user 914 with the service provider. In some examples, onboarding can involve presenting various questions, prompts, and the like to a potential user 914 to obtain information that can be used to generate a profile for the potential user 914. In at least one example, the service provider can provide limited or short-term access to its services prior to, or during, onboarding (e.g., a user of a peer-to-peer payment service can transfer and/or receive funds prior to being fully onboarded, a merchant can process payments prior to being fully onboarded, etc.). In at least one example, responsive to the potential user 914 providing all necessary information, the potential user 914 can be onboarded to the service provider. In such an example, any limited or short-term access to services of the service provider can be transitioned to more permissive (e.g., less limited) or longer-term access to such services.

The service provider can be associated with IDV services, which can be used by the service provider for compliance purposes and/or can be offered as a service, for instance to third-party service providers (e.g., associated with the server(s) 910). That is, the service provider can offer IDV services to verify the identity of users 914 seeking to use or using their services. Identity verification requires a customer (or potential customer) to provide information that is used by compliance departments to prove that the information is associated with an identity of a real person or entity. In at least one example, the service provider can perform services for determining whether identifying information provided by a user 914 accurately identifies the customer (or potential customer) (i.e., Is the customer who they say they are?).

The service provider is capable of providing additional or alternative services and the services described above are offered as a sampling of services. In at least one example, the service provider can exchange data with the server(s) 910 associated with third-party service providers. Such third-party service providers can provide information that enables the service provider to provide services, such as those described above. In additional or alternative examples, such third-party service providers can access services of the service provider. That is, in some examples, the third-party service providers can be subscribers, or otherwise access, services of the service provider.

Techniques described herein can be configured to operate in both real-time/online and offline modes. "Online" modes refer to modes when devices are capable of communicating with the service provider (e.g., the server(s) 902) and/or the server(s) 910 via the network(s) 904. In some examples, the merchant device(s) 908 are not capable of connecting with the service provider (e.g., the server(s) 902) and/or the server(s) 910, due to a network connectivity issue, for example. In additional or alternative examples, the server(s) 902 are not capable of communicating with the server(s) 910 due to network connectivity issue, for example. In such examples, devices may operate in "offline" mode where at least some payment data is stored (e.g., on the merchant device(s) 908) and/or the server(s) 902 until connectivity is restored and the payment data can be transmitted to the server(s) 902 and/or the server(s) 910 for processing.

In at least one example, the service provider can be associated with a hub, such as an order hub, an inventory hub, a fulfillment hub and so on, which can enable integration with one or more additional service providers (e.g., associated with the additional server(s) 910). In some examples, such additional service providers can offer additional or alternative services and the service provider can provide an interface or other computer-readable instructions to integrate functionality of the service provider into the one or more additional service providers.

Techniques described herein are directed to services provided via a distributed system of user devices 906 that are in communication with one or more server computing devices 902 of the service provider. That is, techniques described herein are directed to a specific implementation—or, a practical application—of utilizing a distributed system of user devices 906 that are in communication with one or more server computing devices 902 of the service provider to perform a variety of services, as described above. The unconventional configuration of the distributed system described herein enables the server(s) 902 that are remotely-located from end-users (e.g., users 914) to intelligently offer services based on aggregated data associated with the end-users, such as the users 914 (e.g., data associated with multiple, different merchants and/or multiple, different buyers), in some examples, in near-real time. Accordingly, techniques described herein are directed to a particular arrangement of elements that offer technical improvements over conventional techniques for performing payment processing services and the like. For small business owners in particular, the business environment is typically fragmented and relies on unrelated tools and programs, making it difficult for an owner to manually consolidate and view such data. The techniques described herein constantly or periodically monitor disparate and distinct merchant accounts, e.g., accounts within the control of the service provider, and those outside of the control of the service provider, to track the business standing (payables, receivables, payroll, invoices, appointments, capital, etc.) of the merchants. The techniques herein provide a consolidated view of a merchant's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services and/or additional or alternative services described herein. In some implementations, the distributed system is capable of applying the intelligence derived from an existing user base to a new user, thereby making the onboarding experience for the new user personalized and frictionless when compared to traditional onboarding methods. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 914 and user devices 906. Furthermore, such features are changed dynamically based on the profiles of the users involved interacting with the GUIs. As such, techniques described herein are directed to improvements to computing systems.

Figure 10:
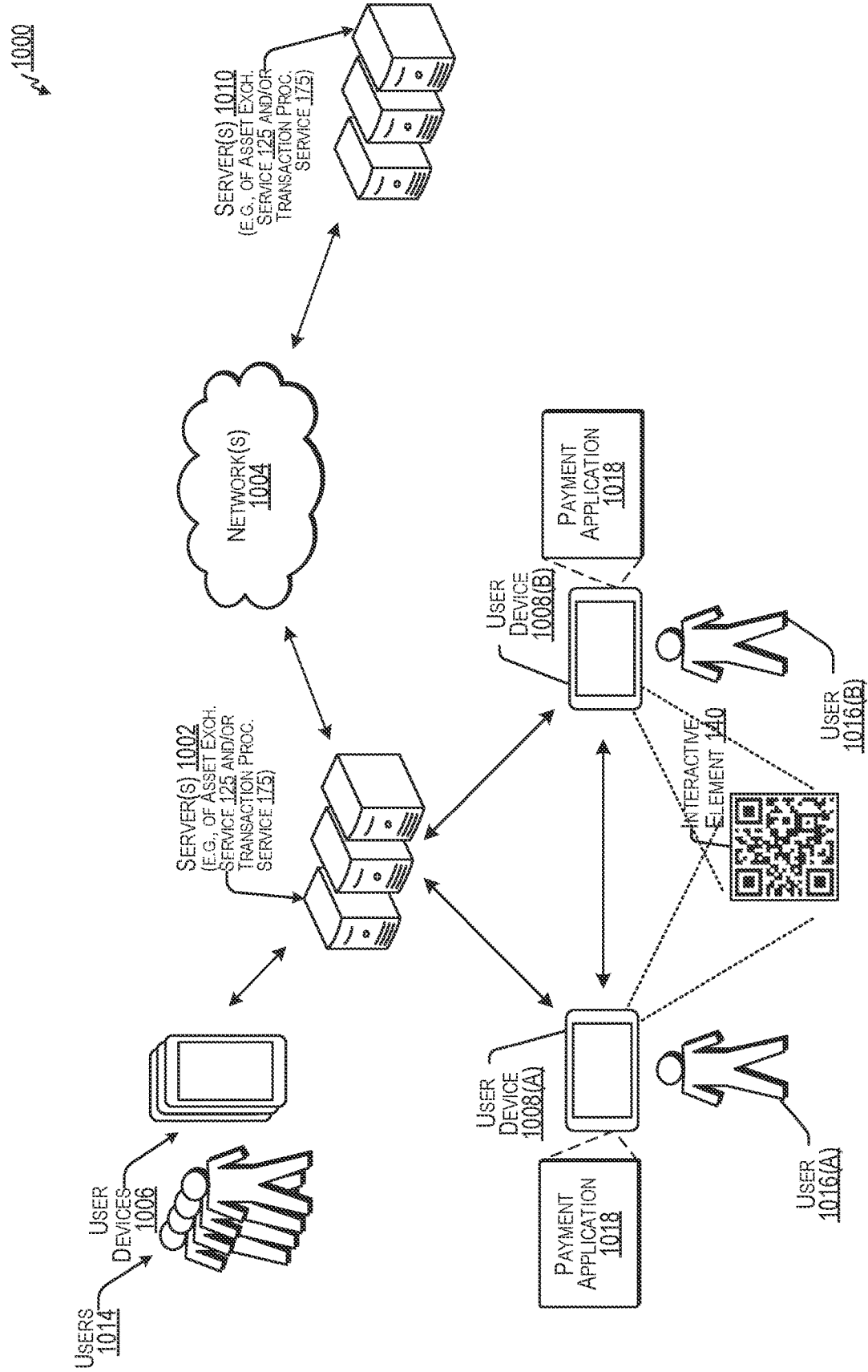
FIG. 10 is a block diagram illustrating an environment that includes various device associated with one or more payment services, in accordance with some examples.

FIG. 10 is a block diagram illustrating an environment 1000 that includes various devices associated with one or more payment services. The environment 1000 includes server(s) 1002 that can communicate over a network 1004 with user devices 1006 (which, in some examples can be user devices 1008(individually, 1008(A), 1008(B)) and/or server(s) 1010 associated with third-party service provider(s). The server(s) 1002 can be associated with a service provider that can provide one or more services for the benefit of users 1014, as described below. Actions attributed to the service provider can be performed by the server(s) 1002. In some examples, the service provider referenced in FIG. 9 can be the same or different than the service provider referenced in FIG. 10.

The user 110 may be an example of one of the users 1014 and/or the users 1016(A)-1016(B). The user device 115 may be an example of one of the user devices 1006 and/or one of the one of the user devices 1008(A)-1008(B). The agent 160 may be an example of one of the users 1014 and/or the users 1016(A)-1016(B). The agent device 165 may be an example of one of the user devices 1006 and/or one of the one of the user devices 1008(A)-1008(B). The printer 150 may be an example of one of the user devices 1006 and/or one of the one of the user devices 1008(A)-1008(B). The payment resource 118 and/or the transfer instrument depositing resource 168, may be examples of the payment application 1018. For instance, the payor instance of the payment resource 118 may be an example of the instance of the payment application 1018 running on the user device 1008(A), while the payee instance of the transfer instrument depositing resource 168 and/or the payment resource 118 may be an example of the instance of the payment application 1018 running on the user device 1008(B). For instance, the interactive element 140 can be interacted with, and the corresponding information read by, the user device 1008(A) or the user device 1008(B), and can include a resource identifier that causes the user device 1008(A) or the user device 1008(B) to access a depositing resource of the payment application 1018. The network(s) 105 may be example(s) of the network(s) 1004. The server(s) associated with the transfer instrument generation service 125 may be examples of the server(s) 1002, the server(s) 1010, or a combination thereof. The server(s) associated with the transaction processing service 175 may be examples of the server(s) 1002, the server(s) 1010, or a combination thereof.

The environment 1000 can include a plurality of user devices 1006, as described above. Each one of the plurality of user devices 1006 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 1014. The users 1014 can be referred to as customers, buyers, merchants, sellers, borrowers, employees, employers, payors, payees, couriers and so on. The users 1014 can interact with the user devices 1006 via user interfaces presented via the user devices 1006. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 1006 can have an instance or versioned instance of an application, which can be downloaded from an application store, for example, which can present the user interface(s) described herein. In at least one example, a user 1014 can interact with the user interface via touch input, spoken input, or any other type of input.

In at least one example, the service provider can provide a peer-to-peer payment service that enables peer-to-peer payments between two or more users 1014. Two users, user 1016(A) and user 1016(B) are illustrated in FIG. 10 as "peers" in a peer-to-peer payment. In at least one example, the service provider can communicate with instances of a payment application 1018 (or other access point) installed on devices 1006 configured for operation by users 1014. In an example, an instance of the payment application 1018 executing on a first device 1008(A) operated by a payor (e.g., user 1016(A)) can send a request to the service provider to transfer an asset (e.g., fiat currency, non-fiat currency, cryptocurrency, securities, gift cards, and/or related assets) from the payor to a payee (e.g., user 1016(B)) via a peer-to-peer payment. In some examples, assets associated with an account of the payor are transferred to an account of the payee. In some examples, assets can be held at least temporarily in an account of the service provider prior to transferring the assets to the account of the payee.

In some examples, the service provider can utilize a ledger system to track transfers of assets between users 1006.

Figure 11:
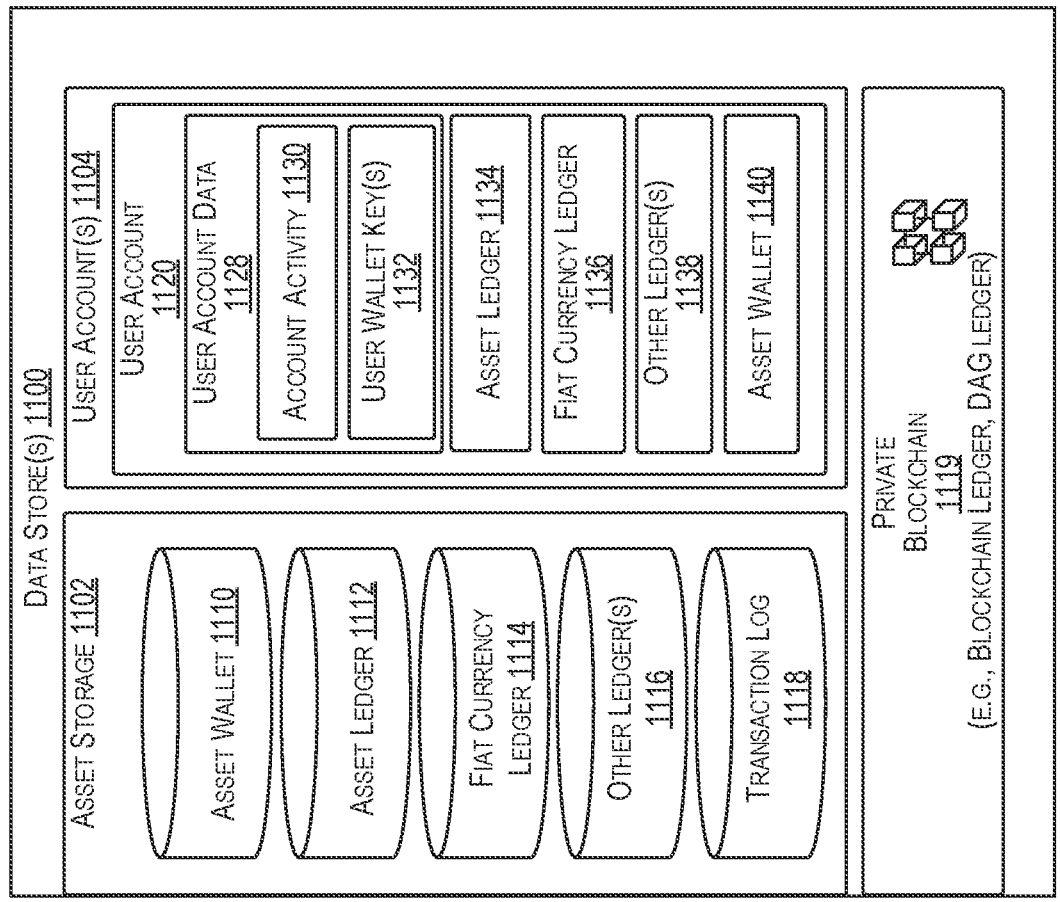
FIG. 11 is a block diagram illustrating a ledger system, in accordance with some examples.
Figure 11:
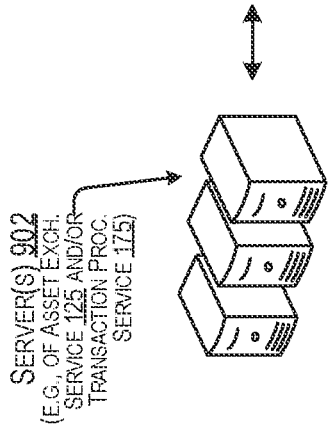

FIG. 11 is a block diagram illustrating a ledger system. The ledger system of FIG. 11 may provide additional details associated with a ledger system that may be used with the systems of FIG. 9 and/or FIG. 10. The ledger system can enable users 1006 to own fractional shares of assets that are not conventionally available. For instance, a user can own a fraction of a Bitcoin or a stock. Additional details are described herein.

In at least one example, the service provider can facilitate transfers and can send notifications related thereto to instances of the payment application 1018 executing on user device(s) of payee(s). As an example, the service provider can transfer assets from an account of user 1016(A) to an account of the user 1016(B) and can send a notification to the user device 1008(B) of the user 1016(B) for presentation via a user interface. The notification can indicate that a transfer is in process, a transfer is complete, or the like. In some examples, the service provider can send additional or alternative information to the instances of the payment application 1018 (e.g., low balance to the payor, current balance to the payor or the payee, etc.). In some examples, the payor and/or payee can be identified automatically, e.g., based on context, proximity, prior transaction history, and so on. In other examples, the payee can send a request for funds to the payor prior to the payor initiating the transfer of funds. In some embodiments, the service provider funds the request to payee on behalf of the payor, to speed up the transfer process and compensate for any lags that may be attributed to the payor's financial network.

In some examples, the service provider can trigger the peer-to-peer payment process through identification of a "payment proxy" having a particular syntax. For example, the syntax can include a monetary currency indicator prefixing one or more alphanumeric characters (e.g., $Cash). The currency indicator operates as the tagging mechanism that indicates to the server(s) 1002 to treat the inputs as a request from the payor to transfer assets, where detection of the syntax triggers a transfer of assets. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol could equally be used. In some examples, additional or alternative identifiers can be used to trigger the peer-to-peer payment process. For instance, email, telephone number, social media handles, and/or the like can be used to trigger and/or identify users of a peer-to-peer payment process.

In some examples, the peer-to-peer payment process can be initiated through instances of the payment application 1018 executing on the user devices 1006. In at least some embodiments, the peer-to-peer process can be implemented within a landing page associated with a user and/or an identifier of a user. The term "landing page," as used here, refers to a virtual location identified by a personalized location address that is dedicated to collect payments on behalf of a recipient associated with the personalized location address. The personalized location address that identifies the landing page can include a payment proxy discussed above. The service provider can generate the landing page to enable the recipient to conveniently receive one or more payments from one or more senders. In some examples, the personalized location address identifying the landing page can be a uniform resource locator (URL) that incorporates the payment proxy. In such examples, the landing page can be a web page, e.g., www.cash.me/$Cash.

In some examples, the peer-to-peer payment process can be implemented within a forum. The term "forum," as used here, refers to a content provider's media channel (e.g., a social networking platform, a microblog, a blog, video sharing platform, a music sharing platform, etc.) that enables user interaction and engagement through comments, posts, messages on electronic bulletin boards, messages on a social networking platform, and/or any other types of messages. In some examples, the content provider can be the service provider as described with reference to FIG. 10 or a third-party service provider associated with the server(s) 1010. In examples where the content provider is a third-party service provider, the server(s) 1010 can be accessible via one or more APIs or other integrations. The forum can be employed by a content provider to enable users of the forum to interact with one another (e.g., through creating messages, posting comments, etc.). In some examples, "forum" may also refer to an application or webpage of an e-commerce or retail organization that offers products and/or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application, such as a messaging application. The term "messaging application," as used here, refers to any messaging application that enables communication between users (e.g., sender and recipient of a message) over a wired or wireless communications network, through use of a communication message. The messaging application can be employed by the service provider referenced in FIG. 10. For instance, the service provider can offer messaging services that provides a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication. The messaging application can be executed on a user device 1006 (e.g., mobile device or conventional personal computer (PC)) based on instructions transmitted to and from the server(s) 1002 (which, in such an example can be called a "messaging server"). In some instances, the messaging application can include a payment application with messaging capability that enables users of the payment application to communicate with one another. In such instances, the payment application can be executed on a user device 1006 based on instructions transmitted to and from the server(s) 1002 (e.g., the payment service discussed in this description or another payment service that supports payment transactions). In some examples, the messaging application can be provided by a third-party service provider associated with the server(s) 1010. In examples where the messaging application is a third-party service provider, the server(s) 1010 can be accessible via one or more APIs or other integrations.

As described above, the service provider can facilitate peer-to-peer transactions, which can enable users 1006 to transfer fiat currency, non-fiat currency, cryptocurrency, securities, or other assets, or portions thereof, to other users 1006. In at least one example, individual users can be associated with user accounts. Additional details associated with user accounts and the transfer of assets between users 1006 are described below with reference to FIG. 11.

Furthermore, the service provider of FIG. 10 can enable users 1006 to perform banking transactions via instances of the payment application 1018. For example, users can configure direct deposits or other deposits for adding assets to their various ledgers/balances. Further, users 1006 can configure bill pay, recurring payments, and/or the like using assets associated with their accounts. In addition to sending and/or receiving assets via peer-to-peer transactions, users 1006 buy and/or sell assets via asset networks such as cryptocurrency networks, securities networks, and/or the like.

FIG. 11 illustrates example data store(s) 1100 that can be associated with the server(s) 1002.

In at least one example, the data store(s) 1100 can store assets in an asset storage 1102, as well as data in user account(s) 1104, merchant account(s) 1106, and/or customer account(s) 1108. In at least one example, the asset storage 1102 can be used to store assets managed by the service provider of FIG. 10. In at least one example, the asset storage 1102 can be used to record whether individual of the assets are registered to users. For example, the asset storage 1102 can include an asset wallet 1110 for storing records of assets owned by the service provider of FIG. 10, such as cryptocurrency, securities, or the like, and communicating with one or more asset networks, such as cryptocurrency networks, securities networks, or the like. In some examples, the asset network can be a first-party network or a third-party network, such as a cryptocurrency exchange or the stock market. In examples where the asset network is a third-party network, the server(s) 1010 can be associated therewith. In some examples, the asset wallet 1110 can communication with the asset network via one or more components associated with the server(s) 1002.

The user asset account(s) 170, the agent asset account(s) 172, and/or the service asset account(s) 174 may be examples of the user account 1120, the asset wallet 1140, and/or the asset wallet 1110, and/or may be associated with the fiat currency ledger 1114, the fiat currency ledger 1136, the asset ledger 1112, the asset ledger 1134, and/or the private blockchain 1119.

The asset wallet 1110 can be associated with one or more addresses and can vary addresses used to acquire assets (e.g., from the asset network(s)) so that its holdings are represented under a variety of addresses on the asset network. In examples where the service provider of FIG. 10 has its own holdings of cryptocurrency (e.g., in the asset wallet 1110), a user can acquire cryptocurrency directly from the service provider of FIG. 10. In some examples, the service provider of FIG. 10 can include logic for buying and selling cryptocurrency to maintain a desired level of cryptocurrency. In some examples, the desired level can be based on a volume of transactions over a period of time, balances of collective cryptocurrency ledgers, exchange rates, or trends in changing of exchange rates such that the cryptocurrency is trending towards gaining or losing value with respect to the fiat currency. In all of these scenarios, the buying and selling of cryptocurrency, and therefore the associated updating of the public ledger of asset network can be separate from any customer-merchant transaction or peer-to-peer transaction, and therefore not necessarily time-sensitive. This can enable batching transactions to reduce computational resources and/or costs. The service provider can provide the same or similar functionality for securities or other assets.

The asset storage 1102 may contain ledgers that store records of assignments of assets to users 1006. Specifically, the asset storage 1102 may include asset wallet 1110 (e.g., asset ledger), fiat currency ledger 1114, and other ledger(s) 1116, which can be used to record transfers of assets between users 1006 of the service provider and/or one or more third-parties (e.g., merchant network(s), payment card network(s), ACH network(s), equities network(s), the asset network, securities networks, etc.). In doing so, the asset storage 1102 can maintain a running balance of assets managed by the service provider of FIG. 10. The ledger(s) of the asset storage 1102 can further indicate some of the running balance for each of the ledger(s) stored in the asset storage 1102 is assigned or registered to one or more user account(s) 1104.

In at least one example, the asset storage 1102 can include transaction logs 1118, which can include records of past transactions involving the service provider of FIG. 10. In at least one example, transaction data, as described herein, can be stored in association with the transaction logs 1118.

In some examples, the data store(s) 1100 can store a private blockchain 1119. A private blockchain 1119 can function to record sender addresses, recipient addresses, public keys, values of cryptocurrency transferred, and/or can be used to verify ownership of cryptocurrency tokens to be transferred. In some examples, the service provider of FIG. 10 can record transactions taking place within the service provider of FIG. 10 involving cryptocurrency until the number of transactions has exceeded a determined limit (e.g., number of transactions, storage space allocation, etc.). Based at least in part on determining that the limit has been reached, the service provider of FIG. 10 can publish the transactions in the private blockchain 1119 to a public blockchain (e.g., associated with the asset network), where miners can verify the transactions and record the transactions to blocks on the public blockchain. In at least one example, the service provider of FIG. 10 can participate as miner(s) at least for its transactions to be posted to the public blockchain.

In at least one example, the data store(s) 1100 can store and/or manage accounts, such as user account(s) 1104, merchant account(s) 1106, and/or customer account(s) 1108. In at least one example, the user account(s) 1104 may store records of user accounts associated with the users 1006. In at least one example, the user account(s) 1104 can include a user account 1120, which can be associated with a user (of the users 1006). Other user accounts of the user account(s) 1104 can be similarly structured to the user account 1120, according to some examples. In other examples, other user accounts may include more or less data and/or account information than that provided by the user account 1120. In at least one example, the user account 1120 can include user account data 1128, which can include, but is not limited to, data associated with user identifying information (e.g., name, phone number, address, etc.), user identifier(s) (e.g., alphanumeric identifiers, etc.), user preferences (e.g., learned or user-specified), purchase history data (e.g., identifying one or more items purchased (and respective item information), linked payment sources (e.g., bank account(s), stored balance(s), etc.), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, user service data, loyalty data (e.g., loyalty account numbers, rewards redeemed, rewards available, etc.), risk indicator(s) (e.g., level(s) of risk), etc.

In at least one example, the user account data 1128 can include account activity 1130 and user wallet key(s) 1132. The account activity 1130 may include a transaction log for recording transactions associated with the user account 1120. In some examples, the user wallet key(s) 1132 can include a public-private key-pair and a respective address associated with the asset network or other asset networks. In some examples, the user wallet key(s) 1132 may include one or more key pairs, which can be unique to the asset network or other asset networks.

In addition to the user account data 1128, the user account 1120 can include ledger(s) for account(s) managed by the service provider of FIG. 10, for the user. For example, the user account 1120 may include an asset ledger 1134, a fiat currency ledger 1136, and/or one or more other ledgers 1138. The ledger(s) can indicate that a corresponding user utilizes the service provider of FIG. 10 to manage corresponding accounts (e.g., a cryptocurrency account, a securities account, a fiat currency account, etc.). It should be noted that in some examples, the ledger(s) can be logical ledger(s) and the data can be represented in a single database. In some examples, individual of the ledger(s), or portions thereof, can be maintained by the service provider of FIG. 10.

In some examples, the asset ledger 1134 can store a balance for each of one or more cryptocurrencies (e.g., Bitcoin, Ethereum, Litecoin, etc.) registered to the user account 1120. In at least one example, the asset ledger 1134 can further record transactions of cryptocurrency assets associated with the user account 1120. For example, the user account 1120 can receive cryptocurrency from the asset network using the user wallet key(s) 1132. In some examples, the user wallet key(s) 1132 may be generated for the user upon request. User wallet key(s) 1132 can be requested by the user in order to send, exchange, or otherwise control the balance of cryptocurrency held by the service provider of FIG. 10 (e.g., in the asset wallet 1110) and registered to the user. In some examples, the user wallet key(s) 1132 may not be generated until a user account requires such. This on-the-fly wallet key generation provides enhanced security features for users, reducing the number of access points to a user account's balance and, therefore, limiting exposure to external threats.

Each account ledger can reflect a positive balance when funds are added to the corresponding account. An account can be funded by transferring currency in the form associated with the account from an external account (e.g., transferring a value of cryptocurrency to the service provider of FIG. 10 and the value is credited as a balance in asset ledger 1134), by purchasing currency in the form associated with the account using currency in a different form (e.g., buying a value of cryptocurrency from the service provider of FIG. 10 using a value of fiat currency reflected in fiat currency ledger 206, and crediting the value of cryptocurrency in asset ledger 1134), or by conducting a transaction with another user (customer or merchant) of the service provider of FIG. 10 wherein the account receives incoming currency (which can be in the form associated with the account or a different form, in which the incoming currency may be converted to the form associated with the account). In some examples, the user account data 1128 can include preferences for maintaining balances of individual of the ledgers. For example, the service provider of FIG. 10 can automatically debit the fiat currency ledger 1136 to increase the asset ledger 1134, or another account associated with the user whenever the cryptocurrency balance (e.g., of the asset ledger 1134) falls below a stated level (e.g., a threshold). Conversely, in some embodiments, the service provider of FIG. 10 can automatically credit the fiat currency ledger 1136 to decrease the asset ledger 1134 whenever cryptocurrency balance rises above a stated level (e.g., a threshold). In some examples, automatic transactions can be further defined by an exchange rate between the cryptocurrency and the fiat currency such that transactions to buy or sell cryptocurrency can occur when exchange rates are favorable.

With specific reference to funding a cryptocurrency account, a user may have a balance of cryptocurrency stored in another cryptocurrency wallet. In some examples, the other cryptocurrency wallet can be associated with a third-party (e.g., associated with third-party server(s)) unrelated to the service provider of FIG. 10 (i.e., an external account). In at least one example, the user can transfer all or a portion of a balance of the cryptocurrency stored in the third-party cryptocurrency wallet to the service provider of FIG. 10. Such a transaction can require the user to transfer an amount of the cryptocurrency in a message signed by user's private key to an address provided by the service provider of FIG. 10. In at least one example, the transaction can be sent to miners to bundle the transaction into a block of transactions and to verify the authenticity of the transactions in the block. Once a miner has verified the block, the block is written to a public, distributed blockchain where the service provider of FIG. 10 can then verify that the transaction has been confirmed and can credit the user's asset ledger 1134 with the transferred amount. When an account is funded by transferring cryptocurrency from a third-party cryptocurrency wallet, an update can be made to the public blockchain. Importantly, this update of the public blockchain need not take place at a time critical moment, such as when a transaction is being processed by a merchant in store or online.

In some examples, a user can purchase cryptocurrency to fund their cryptocurrency account. In some examples, the user can purchase cryptocurrency through services offered by the service provider of FIG. 10. As described above, in some examples, the service provider of FIG. 10 can acquire cryptocurrency from a third-party source (e.g., associated with third-party server(s)). In such examples, the asset wallet 1110 can be associated with different addresses and can vary addresses used to acquire cryptocurrency so that its holdings are represented under a variety of addresses on a blockchain. When the service provider of FIG. 10 has their own holdings of cryptocurrency, users can acquire cryptocurrency directly from the service provider of FIG. 10. In some examples, the service provider of FIG. 10 can include logic for buying and selling cryptocurrency in order to maintain a desired level of cryptocurrency. The desired level can be based on a volume of transactions over a period, balances of collective user profiles cryptocurrency ledgers, exchange rates, or trends in changing of exchange rates such that the cryptocurrency is trending towards gaining or losing value with respect to the fiat currency. In all of these examples, the buying and selling of cryptocurrency, and therefore the associated updating of the public ledger can be separate from any customer-merchant transaction, and therefore not necessarily time-sensitive.

In examples where the service provider of FIG. 10 has its own cryptocurrency assets, cryptocurrency transferred in a transaction (e.g., data with address provided for receipt of transaction and a balance of cryptocurrency transferred in the transaction) can be stored in the asset wallet 1110. In at least one example, the service provider of FIG. 10 can credit the asset ledger 1134 of the user. Additionally, while the service provider of FIG. 10 recognizes that the user retains the value of the transferred cryptocurrency through crediting the asset ledger 1134, any person that inspects the blockchain will see the cryptocurrency as having been transferred to the service provider of FIG. 10. In some examples, the asset wallet 1110 can be associated with many different addresses. In such examples, any person that inspects the blockchain may not easily associate all cryptocurrency stored in asset wallet 1110 as belonging to the same entity. It is this presence of a private ledger that is used for real-time transactions and maintained by the service provider of FIG. 10, combined with updates to the public ledger at other times, that allows for extremely fast transactions using cryptocurrency to be achieved. In some examples, the "private ledger" can refer to the asset wallet 1110 (e.g., asset ledger), which in some examples, can utilize the private blockchain 1119, as described herein. The "public ledger" can correspond to a public blockchain associated with the asset network.

In at least one example, a user's asset ledger 1134, fiat currency ledger 1136, or the like can be credited when conducting a transaction with another user (customer or merchant) wherein the user receives incoming currency. In some examples, a user can receive cryptocurrency in the form of payment for a transaction with another user. In at least one example, such cryptocurrency can be used to fund the asset ledger 1134. In some examples, a user can receive fiat currency or another currency in the form of payment for a transaction with another user. In at least one example, at least a portion of such funds can be converted into cryptocurrency by the service provider of FIG. 10 and used to fund the asset ledger 1134 of the user.

As addressed above, in some examples, users can also have other accounts maintained by the service provider of FIG. 10. For example, a user can also have an account in U.S. dollars, which can be tracked, for example, via the fiat currency ledger 1136. Such an account can be funded by transferring money from a bank account at a third-party bank to an account maintained by the service provider of FIG. 10 as is conventionally known. In some examples, a user can receive fiat currency in the form of payment for a transaction with another user. In such examples, at least a portion of such funds can be used to fund the fiat currency ledger 1136.

In some examples, a user can have one or more internal payment cards registered with the service provider of FIG. 10. Internal payment cards can be linked to one or more of the accounts associated with the user account 1120. In some embodiments, options with respect to internal payment cards can be adjusted and managed using an application (e.g., the payment application 1018).

In at least one example, as described above, each ledger can correspond to an account of the user that is managed by the service provider of FIG. 10. In at least one example, individual of the accounts can be associated with a wallet or a stored balance for use in payment transactions, peer-to-peer transactions, payroll payments, etc.

In at least one example, the user account 1120 can be associated with a asset wallet 1140. The asset wallet 1140 of the user can be associated with account information that can be stored in the user account data 1128 and, in some examples, can be associated with the user wallet key(s) 1132. In at least one example, the asset wallet 1140 can store data indicating an address provided for receipt of a cryptocurrency transaction. In at least one example, the balance of the asset wallet 1140 can be based at least in part on a balance of the asset ledger 1134. In at least one example, funds availed via the asset wallet 1140 can be stored in the asset wallet 1140 or the asset wallet 1110. Funds availed via the asset wallet 1110 can be tracked via the asset ledger 1134. The asset wallet 1140, however, can be associated with additional cryptocurrency funds.

In at least one example, when the service provider of FIG. 10 includes a private blockchain 1119 for recording and validating cryptocurrency transactions, the asset wallet 1140 can be used instead of, or in addition to, the asset ledger 1134. For example, at least one example, a merchant can provide the address of the asset wallet 1140 for receiving payments. In an example where a customer is paying in cryptocurrency and the customer has their own cryptocurrency wallet account associated with the service provider of FIG. 10, the customer can send a message signed by its private key including its wallet address (i.e., of the customer) and identifying the cryptocurrency and value to be transferred to the merchant's asset wallet 1140. The service provider of FIG. 10 can complete the transaction by reducing the cryptocurrency balance in the customer's cryptocurrency wallet and increasing the cryptocurrency balance in the merchant's asset wallet 1140. In addition to recording the transaction in the respective cryptocurrency wallets, the transaction can be recorded in the private blockchain 1119 and the transaction can be confirmed. A user can perform a similar transaction with cryptocurrency in a peer-to-peer transaction as described above. In at least one example, the cryptocurrency wallet account can be funded by a balance transfer from a third-party cryptocurrency wallet, as described above. Such a transaction can require a user to transfer an amount of cryptocurrency in a message signed by the user's private key to an address of the cryptocurrency wallet account. The transferred amount of cryptocurrency can then be within the cryptocurrency wallet account for use in later transactions.

While the asset ledger 1134 and/or asset wallet 1140 are each described above with reference to cryptocurrency, the asset ledger 1134 and/or asset wallet 1140 can alternatively be used in association with securities. In some examples, different ledgers and/or wallets can be used for different types of assets. That is, in some examples, a user can have multiple asset ledgers and/or asset wallets for tracking cryptocurrency, securities, or the like.

It should be noted that user(s) having accounts managed by the service provider of FIG. 10 is an aspect of the technology disclosed that enables technical advantages of increased processing speed and improved security.

Figure 12:
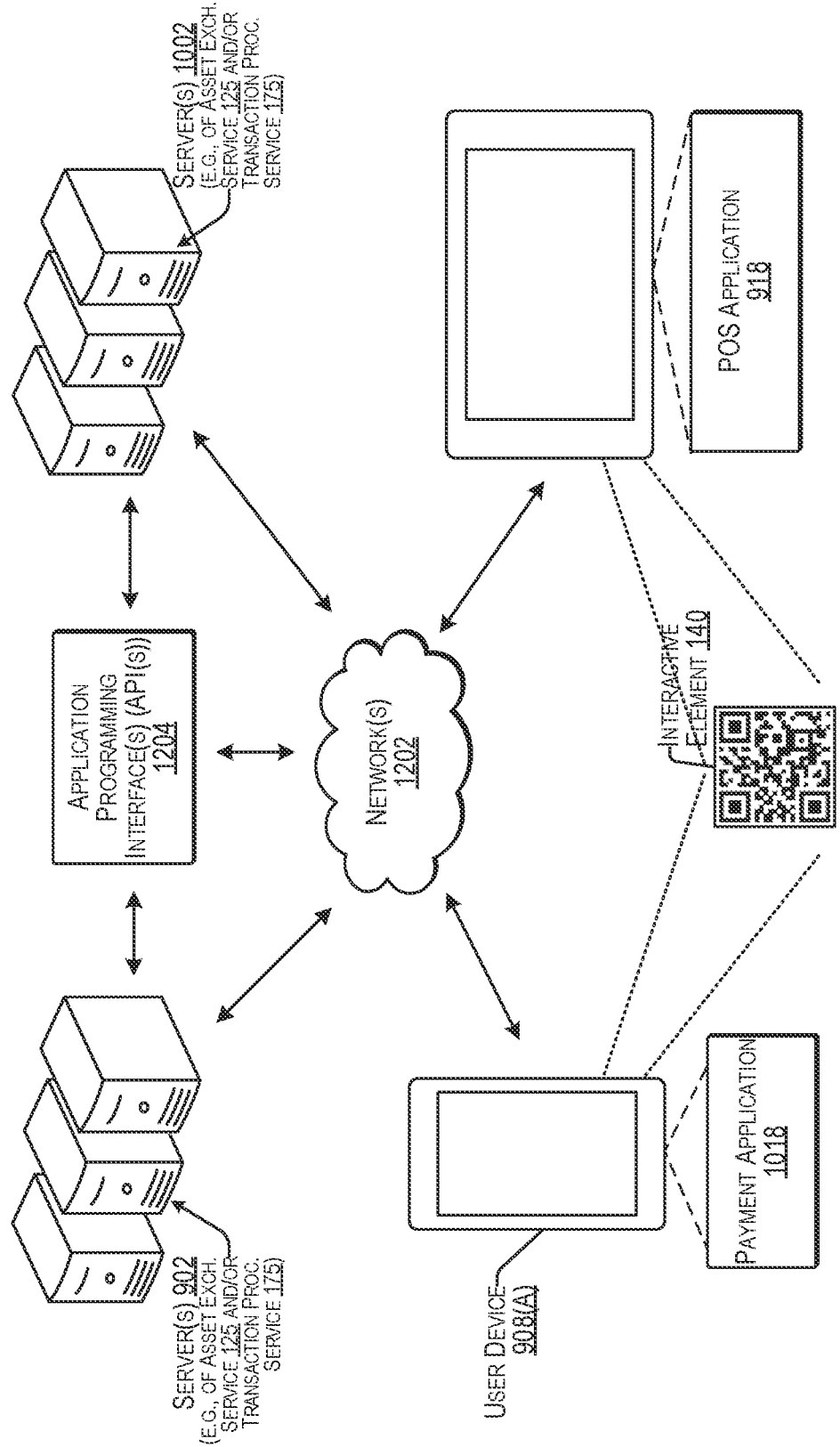
FIG. 12 is a block diagram illustrating an example environment wherein the environment of FIG. 9 and the environment of FIG. 10 can be integrated to enable payments at the point-of-sale using assets associated with user accounts in the peer-to-peer environment of FIG. 10, in accordance with some examples.

FIG. 12 illustrates an example environment 1200 wherein the environment 900 of FIG. 9 and the environment 1000 of FIG. 10 can be integrated to enable payments at the point-of-sale using assets associated with user accounts in the peer-to-peer environment 1000 of FIG. 10. As illustrated, each of the components can communicate with one another via one or more networks 1202. In some examples, one or more APIs 1204 or other functional components can be used to facilitate such communication.

In at least one example, the example environment 1200 can enable contactless payments, via integration of peer-to-peer payment, or other payment making, platform(s) and payment processing platform(s), are described herein. For the purpose of FIG. 12, the environment 900 can refer to a payment processing platform and the environment 1000 can refer to a peer-to-peer payment, or payment making, platform. In an example, such an integration can enable a customer to participate in a transaction via their own computing device instead of interacting with a merchant device of a merchant, such as the merchant device 908(A). In such an example, the POS application 918, associated with a payment processing platform and executable by the merchant device 908(A) of the merchant, can present a Quick Response (QR) code, or other code that can be used to identify a transaction (e.g., a transaction code), in association with a transaction between the customer and the merchant. The QR code, or other transaction code, can be provided to the POS application 918 via an API associated with the peer-to-peer payment platform. In an example, the customer can utilize their own computing device, such as the user device 1008(A), to capture the QR code, or the other transaction code, and to provide an indication of the captured QR code, or other transaction code, to server(s) 902 and/or server(s) 1002.

Based at least in part on the integration of the peer-to-peer payment platform and the payment processing platform (e.g., via the API), the server(s) 902 and/or 1002 associated with each can exchange communications with each other—and with a payment application 1018 associated with the peer-to-peer payment platform and/or the POS application 918—to process payment for the transaction using a peer-to-peer payment where the customer is a first "peer" and the merchant is a second "peer." In at least one example, the peer-to-peer payment platform can transfer funds from an account of the customer, maintained by the peer-to-peer payment platform, to an account of the merchant, maintained by the payment processing platform, thereby facilitating a contactless (peer-to-peer) payment for the transaction. That is, based at least in part on receiving an indication of which payment method a user (e.g., customer or merchant) intends to use for a transaction, techniques described herein utilize an integration between a peer-to-peer payment platform and payment processing platform (which can be a first- or third-party integration) such that a QR code, or other transaction code, specific to the transaction can be used for providing transaction details, location details, customer details, or the like to a computing device of the customer, such as the user device 1008(A), to enable a contactless (peer-to-peer) payment for the transaction.

In at least one example, techniques described herein can offer improvements to conventional payment technologies at both brick-and-mortar points of sale and online points of sale. For example, at brick-and-mortar points of sale, techniques described herein can enable customers to "scan to pay," by using their computing devices to scan QR codes, or other transaction codes, encoded with data as described herein, to remit payments for transactions. In such a "scan to pay" example, a customer computing device, such as the user device 1008(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc. In another example, merchants can "scan for payment" such that a customer can present a QR code, or other transaction code, that can be linked to a payment instrument or stored balance.

Funds associated with the payment instrument or stored balance can be used for payment of a transaction.

As described above, techniques described herein can offer improvements to conventional payment technologies at online points of sale, as well as brick-and-mortar points of sale. For example, multiple applications can be used in combination during checkout. That is, the POS application 918 and the payment application 1018, as described herein, can process a payment transaction by routing information input via the merchant application to the payment application for completing a "frictionless" payment. This can be referred to as "in-application payment." In another example of "in-application payment," the payment application described herein can be created or modified via a software developer kit (SDK) to enable in-application payment.

Returning to the "scan to pay" examples described herein, QR codes, or other transaction codes, can be presented in association with a merchant web page or ecommerce web page. In at least one example, techniques described herein can enable customers to "scan to pay," by using their computing devices to scan or otherwise capture QR codes, or other transaction codes, encoded with data, as described herein, to remit payments for online/ecommerce transactions. In such a "scan to pay" example, a customer computing device, such as the user device 1008(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc.

In an example, a customer can desire to purchase items from a merchant. When the customer approaches the merchant to check out, the merchant (e.g., a worker associated therewith) can add indications of the items to a virtual cart via the POS application 918, associated with a payment processing platform, on the merchant device 908(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, a display of the merchant device 908(A) can present a QR code, or other transaction code, that can be associated with a peer-to-peer payment platform. The customer can use a camera associated with the user device 1008(A) to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction—between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As an additional or alternative example, a customer can desire to purchase items from a merchant. When the customer approaches the merchant to check out, the merchant (e.g., a worker associated therewith) can add indications of the items to a virtual cart via the POS application 918, associated with a payment processing platform, on the merchant device 908(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, the POS application 918 can cause a text message with a resource locator (e.g., uniform resource locator (URL)) that can be associated with a peer-to-peer payment platform to be sent to the user device 1008(A). The customer can interact with the resource locator and, if the customer is already associated with the peer-to-peer payment platform (e.g., has an existing account, previously onboarded, etc.), the peer-to-peer payment platform can provide an indication of the interaction with the resource locator to the payment processing platform. This interaction—between the customer and the resource locator presented via the customer computing device—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. As described above, such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

The same or similar techniques can be applicable in online and/or ecommerce selling channels as well. In such an example, a QR code, or other transaction code, can be presented via an online store/ecommerce web page of a merchant. The customer can use a camera associated with a customer computing device, such as the user device 1008(A), to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction—between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As described above, techniques described herein offer improvements to conventional payment technologies. In an example, techniques described herein can enable transaction data to be sent from a POS application 918 of a merchant device 908(A) at a brick-and-mortar store of a merchant to a payment application 1018 of a user device 1008(A) of a customer to enable the customer to participate in a transaction via their own computing device. For instance, in a "scan to pay" example as described above, based at least in part on capturing the QR code, or other transaction code, via the user device 1008(A), the payment processing platform can provide transaction data to the peer-to-peer payment platform for presentation via the payment application 1018 on the user device 1008(A). In some examples, the customer can watch items being added to their cart (e.g., via a user interface presented via the payment application). As an item is added to a virtual cart by the merchant—via the POS application 918 on the merchant device 908(A) of the merchant—the customer can see the item in their virtual cart on their own computing device in near-real time. In another example, the peer-to-peer payment platform can analyze transaction data as it is received to determine whether an incentive (e.g., a discount, a loyalty reward, prioritized access or booking, etc.) is applicable to the transaction and can automatically apply the incentive or send a recommendation to the payment application 1018 for presentation via a user interface associated therewith. In addition to enabling a customer to participate in a transaction during cart building, techniques described herein can enable a customer to complete a transaction, and in some examples, provide gratuity (i.e., a tip), feedback, loyalty information, or the like, via the user device 1008(A) during or after payment of the transaction.

In some examples, based at least in part on capturing the QR code, or other transaction code, the payment processing platform can provide transaction data to the peer-to-peer payment platform for presentation via the payment application 1018 on the computing device of the customer, such as the user device 1008(A), to enable the customer to complete the transaction via their own computing device. In some examples, in response to receiving an indication that the QR code, or other transaction code, has been captured or otherwise interacted with via the customer computing device, the peer-to-peer payment platform can determine that the customer authorizes payment of the transaction using funds associated with a stored balance of the customer that is managed and/or maintained by the peer-to-peer payment platform. Such authorization can be implicit such that the interaction with the transaction code can imply authorization of the customer. In some examples, in response to receiving an indication that the QR code, or other transaction code, has been captured or otherwise interacted with via the customer computing device, the peer-to-peer payment platform can request authorization to process payment for the transaction using the funds associated with the stored balance and the customer can interact with the payment application to authorize the settlement of the transaction. A response to such a request can provide an express authorization of the customer. In some examples, such an authorization (implicit or express) can be provided prior to a transaction being complete and/or initialization of a conventional payment flow. That is, in some examples, such an authorization can be provided during cart building (e.g., adding item(s) to a virtual cart) and/or prior to payment selection. In some examples, such an authorization can be provided after payment is complete (e.g., via another payment instrument). Based at least in part on receiving an authorization to use funds associated with the stored balance (e.g., implicitly or explicitly) of the customer, the peer-to-peer payment platform can transfer funds from the stored balance of the customer to the payment processing platform. In at least one example, the payment processing platform can deposit the funds, or a portion thereof, into a stored balance of the merchant that is managed and/or maintained by the payment processing platform. That is, techniques described herein enable the peer-to-peer payment platform to transfer funds to the payment processing platform to settle payment of the transaction. In such an example, the payment processing platform can be a "peer" to the customer in a peer-to-peer transaction.

In some examples, techniques described herein can enable the customer to interact with the transaction after payment for the transaction has been settled. For example, in at least one example, the payment processing platform can cause a total amount of a transaction to be presented via a user interface associated with the payment application 1018 such that the customer can provide gratuity, feedback, loyalty information, or the like, via an interaction with the user interface. In some examples, because the customer has already authorized payment via the peer-to-peer payment platform, if the customer inputs a tip, the peer-to-peer payment platform can transfer additional funds, associated with the tip, to the payment processing platform. This pre-authorization (or maintained authorization) of sorts can enable faster, more efficient payment processing when the tip is received. Further, the customer can provide feedback and/or loyalty information via the user interface presented by the payment application, which can be associated with the transaction.

As described above—and also below—techniques described herein enable contactless payments. That is, by integrating the payment processing platform with the peer-to-peer payment platform, merchants and customers can participate in transactions via their own computing devices without needing to touch, or otherwise be in contact, with one another. By moving aspects of a transaction that are traditionally performed on a computing device of a merchant to a computing device of a customer, customers can have more control over the transaction and can have more privacy. That is, customers can monitor items that are added to their cart to ensure accuracy. Further, customers can authorize payments, use rewards, claim incentives, add gratuity, or the like without being watched by the merchant or other customers.

In some examples, such as when the QR code, or other transaction code, is captured by the computing device of the customer prior to a payment selection user interface being presented via the POS application 918, payment for the transaction can be pre-authorized such that when the time comes to complete the transaction, neither the payment processing platform nor the peer-to-peer payment platform need to re-authorize payment at that time. That is, techniques described herein can enable faster, more efficient transactions. Further, in some examples, when a customer adds a tip after payment for a transaction has been settled, in some examples, because the peer-to-peer payment platform has already been authorized, the peer-to-peer payment platform and the payment processing platform may not need to obtain another authorization to settle funds associated with the tip. That is, in such examples, fewer data transmissions are required and thus, techniques described herein can conserve bandwidth and reduce network congestion. Moreover, as described above, funds associated with tips can be received faster and more efficiently than with conventional payment technologies.

In addition to the improvements described above, techniques described herein can provide enhanced security in payment processing. In some examples, if a camera, or other sensor, used to capture a QR code, or other transaction code, is integrated into a payment application 1018 (e.g., instead of a native camera, or other sensor), techniques described herein can utilize an indication of the QR code, or other transaction code, received from the payment application for two-factor authentication to enable more secure payments.

It should be noted that, while techniques described herein are directed to contactless payments using QR codes or other transaction codes, in additional or alternative examples, techniques described herein can be applicable for contact payments. That is, in some examples, instead of scanning, capturing, or otherwise interacting with a QR code or transaction code, a customer can swipe a payment instrument (e.g., a credit card, a debit card, or the like) via a reader device associated with a merchant device, dip a payment instrument into a reader device associated with a merchant computing device, tap a payment instrument with a reader device associated with a merchant computing device, or the like, to initiate the provisioning of transaction data to the customer computing device. For example, based at least in part on detecting a dip, tap, swipe, or the like, the payment processing platform can associate a customer with a transaction and provide at least a portion of transaction data associated with the transaction to a customer computing device associated therewith. In some examples, the payment instrument can be associated with the peer-to-peer payment platform as described herein (e.g., a debit card linked to a stored balance of a customer) such that when the payment instrument is caused to interact with a payment reader, the payment processing platform can exchange communications with the peer-to-peer payment platform to authorize payment for a transaction and/or provision associated transaction data to a computing device of the customer associated with the transaction.

In some examples, the interactive element 140 may include at least one QR code and/or other transaction code and/or payment instrument as described with respect to FIG. 12.

Figure 13:
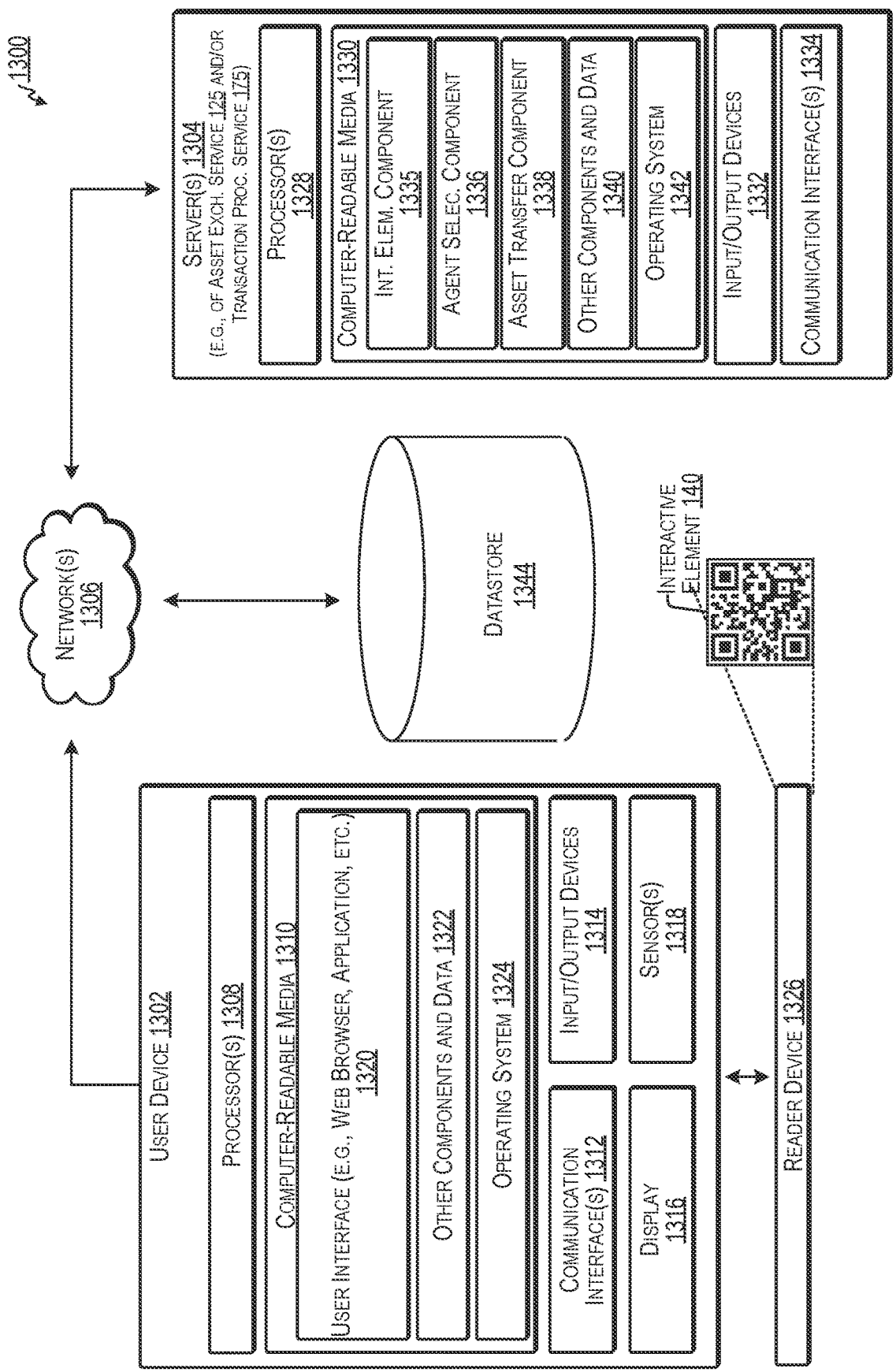
FIG. 13 is a block diagram illustrating a system for performing techniques described herein, in accordance with some examples.

FIG. 13 block diagram illustrating a system 1300 for performing techniques described herein. The system 1300 includes a user device 1302, that communicates with server computing device(s) (e.g., server(s) 1304) via network(s) 1306 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1302 is illustrated, in additional or alternate examples, the system 1300 can have multiple user devices, as described above with reference to FIG. 7.

In some examples, any of the devices and/or elements in the system 1300 (e.g., the user device 1302, the server(s) 1304, the reader device(s) 1326, the datastore 1344) can include, run, or access the asset exchange system 100, the network 105, user device 115, the asset management resource 118, the asset exchange service 125, the printer 150, the agent device 165, the asset management resource 168, the transaction processing service 175, the multi-factor authenticator 185, the trained ML model(s) 190, the user interface 210, the user interface 220, the user interface 310, the user interface 320, the user interface 410, the user interface 420, the user interface 510, the user interface 520, the user interface 610, the user interface 620, the reference data store 780, the server(s) 902, the network(s) 904, the user devices 906, the merchant device(s) 908(A)-908(N), the server(s) 910, the POS application 918, the reader device 922, the POS system 924, the server(s) 1002, the network(s) 1004, the user devices 1006, the user device(s) 1008(A)-908(N), the server(s) 1010, the payment application 1018, the data store(s) 1100, the asset storage 1102, the user account(s) 1104, the private blockchain 1119, the application programming interfaces (APIs) 1204, the network(s) 1202, or a combination thereof.

In at least one example, the user device 1302 can be any suitable type of computing device, e.g., portable, semi-portable, semi-stationary, or stationary. Some examples of the user device 1302 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 1302 can be any computing device capable of sending communications and performing the functions according to the techniques described herein. The user device 1302 can include devices, e.g., payment card readers, or components capable of accepting payments, as described below.

In the illustrated example, the user device 1302 includes one or more processors 1308, one or more computer-readable media 1310, one or more communication interface(s) 1312, one or more input/output (I/O) devices 1314, a display 1316, and sensor(s) 1318.

In at least one example, each processor 1308 can itself comprise one or more processors or processing cores. For example, the processor(s) 1308 can be implemented as one or more microprocessors, microcomputers, microcontrollers, digital signal processors, central processing units, state machines, logic circuitries, and/or any devices that manipulate signals based on operational instructions. In some examples, the processor(s) 1308 can be one or more hardware processors and/or logic circuits of any suitable type specifically programmed or configured to execute the algorithms and processes described herein. The processor(s) 1308 can be configured to fetch and execute computer-readable processor-executable instructions stored in the computer-readable media 1310.

Depending on the configuration of the user device 1302, the computer-readable media 1310 can be an example of tangible non-transitory computer storage media and can include volatile and nonvolatile memory and/or removable and non-removable media implemented in any type of technology for storage of information such as computer-readable processor-executable instructions, data structures, program components or other data. The computer-readable media 1310 can include, but is not limited to, RAM, ROM, EEPROM, flash memory, solid-state storage, magnetic disk storage, optical storage, and/or other computer-readable media technology. Further, in some examples, the user device 1302 can access external storage, such as RAID storage systems, storage arrays, network attached storage, storage area networks, cloud storage, or any other medium that can be used to store information and that can be accessed by the processor(s) 1308 directly or through another computing device or network. Accordingly, the computer-readable media 1310 can be computer storage media able to store instructions, components or components that can be executed by the processor(s) 1308. Further, when mentioned, non-transitory computer-readable media exclude media such as energy, carrier signals, electromagnetic waves, and signals per se.

The computer-readable media 1310 can be used to store and maintain any number of functional components that are executable by the processor(s) 1308. In some implementations, these functional components comprise instructions or programs that are executable by the processor(s) 1308 and that, when executed, implement operational logic for performing the actions and services attributed above to the user device 1302. Functional components stored in the computer-readable media 1310 can include an interactive element component 1335 to generate the interactive element 140 and/or perform identity verification 180 based on the interactive element 140, an agent selection component 1336 to perform at least a portion of the selection 130 of the agent 160 and/or the agent device 165 from a broader set of agents and/or agent devices, an asset transfer component 1338 to process the transfer 155 and/or the transfer 195, and other components and data 1340.

Depending on the type of the user device 1302, the computer-readable media 1310 can also optionally include other functional components and data, such as other components and data 1322, which can include programs, drivers, etc., and the data used or generated by the functional components. In addition, the computer-readable media 1310 can also store data, data structures and the like, that are used by the functional components. Further, the user device 1302 can include many other logical, programmatic and physical components, of which those described are merely examples that are related to the discussion herein.

In at least one example, the computer-readable media 1310 can include additional functional components, such as an operating system 1324 for controlling and managing various functions of the user device 1302 and for enabling basic user interactions.

The communication interface(s) 1312 can include one or more interfaces and hardware components for enabling communication with various other devices, such as over the network(s) 1306 or directly. For example, communication interface(s) 1312 can enable communication through one or more network(s) 1306, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1306 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1302 can further include one or more input/output (I/O) devices 1314. The I/O devices 1314 can include speakers, a microphone, a camera, and various user controls (e.g., buttons, a joystick, a keyboard, a keypad, etc.), a haptic output device, and so forth. The I/O devices 1314 can also include attachments that leverage the accessories (audio-jack, USB-C, Bluetooth, etc.) to connect with the user device 1302.

In at least one example, user device 1302 can include a display 1316. Depending on the type of computing device(s) used as the user device 1302, the display 1316 can employ any suitable display technology. For example, the display 1316 can be a liquid crystal display, a plasma display, a light emitting diode display, an OLED (organic light-emitting diode) display, an electronic paper display, or any other suitable type of display able to present digital content thereon. In at least one example, the display 1316 can be an augmented reality display, a virtually reality display, or any other display able to present and/or project digital content. In some examples, the display 1316 can have a touch sensor associated with the display 1316 to provide a touchscreen display configured to receive touch inputs for enabling interaction with a graphic interface presented on the display 1316. Accordingly, implementations herein are not limited to any particular display technology. Alternatively, in some examples, the user device 1302 may not include the display 1316, and information can be presented by other means, such as aurally, haptically, etc.

In addition, the user device 1302 can include sensor(s) 1318. The sensor(s) 1318 can include a GPS device able to indicate location information. Further, the sensor(s) 1318 can include, but are not limited to, an accelerometer, gyroscope, compass, proximity sensor, camera, microphone, and/or a switch.

In some example, the GPS device can be used to identify a location of a user. In at least one example, the location of the user can be used by the service provider 712, described above, to provide one or more services. That is, in some examples, the service provider 712 can implement geofencing to provide particular services to users. As an example, with a lending service, location can be used to confirm that a stated purpose of a loan corresponds to evidence of use (e.g., Is the user using the loan consistent with what he or she said he or she was going to use it for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users 714 and/or for sending users 714 notifications regarding available appointments with merchant(s) located proximate to the users 714. In at least one example, location can be used for taking payments from nearby customers when they leave a geofence, or location can be used to initiate an action responsive to users 714 enter a brick-and-mortar store of a merchant. Location can be used in additional or alternative ways as well.

Additionally, the user device 1302 can include various other components that are not shown, examples of which include removable storage, a power source, such as a battery and power control unit, a barcode scanner, a printer, a cash drawer, and so forth.

In addition, in some examples, the user device 1302 can include, be connectable to, or otherwise be coupled to a reader device 1326, for reading payment instruments and/or identifiers associated with payment objects. In some examples, as described above, the reader device 1326 can plug in to a port in the user device 1302, such as a microphone port, a headphone port, an audio-jack, a data port, or other suitable port. In additional or alternative examples, the reader device 1326 can be coupled to the user device 1302 via another wired or wireless connection, such as via a Bluetooth®, BLE, and so on. The reader device 1326 can include a read head for reading a magnetic strip of a payment card, and further can include encryption technology for encrypting the information read from the magnetic strip. Additionally or alternatively, the reader device 1326 can be an EMV payment reader, which in some examples, can be embedded in the user device 1302. Moreover, numerous other types of readers can be employed with the user device 1302 herein, depending on the type and configuration of the user device 1302.

The reader device 1326 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 1326 may include hardware implementation, such as slots, magnetic tracks, and rails with one or more sensors or electrical contacts to facilitate detection and acceptance of a payment instrument. That is, the reader device 1326 may include hardware implementations to enable the reader device 1326 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader first until the payment reader prompts the customer to remove the card), or a tap (i.e., a card-present transaction where a customer may tap or hover his or her electronic device such as a smart phone running a payment application over a payment reader to complete a transaction via short-range communication) to obtain payment data associated with a customer. Additionally or optionally, the reader device 1326 may also include a biometric sensor to receive and process biometric characteristics and process them as payment instruments, given that such biometric characteristics are registered with the asset exchange system 100 and connected to a financial account with a bank server.

The reader device 1326 may include processing unit(s), computer-readable media, a reader chip, a transaction chip, a timer, a clock, a network interface, a power supply, and so on. The processing unit(s) of the reader device 1326 may execute one or more components and/or processes to cause the reader device 1326 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program components, program data, and/or one or more operating systems. Depending on the exact configuration and type of the reader device 1326, the computer-readable media may include volatile memory (such as RAM), non-volatile memory (such as ROM, flash memory, miniature hard drive, memory card, or the like), or some combination thereof. In at least one example, the computer-readable media of the reader device 1326 may include at least one component for performing various functions as described herein.

The reader chip may perform functionalities to control the operations and processing of the reader device 1326. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock, which may provide a clock signal indicating a time. Furthermore, the reader chip may perform functionality to control the network interface, which may interface with the network(s) 1306, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 1326. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While, the user device 1302, which can be a POS terminal, and the reader device 1326 are shown as separate devices, in additional or alternative examples, the user device 1302 and the reader device 1326 can be part of a single device, which may be a battery-operated device. In such an example, components of both the user device 1302 and the reader device 1326 may be associated with the single device. In some examples, the reader device 1326 can have a display integrated therewith, which can be in addition to (or as an alternative of) the display 1316 associated with the user device 1302.

The server(s) 1304 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1304 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1304 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 1304 can include one or more processors 1328, one or more computer-readable media 1330, one or more I/O devices 1332, and one or more communication interfaces 1334. Each processor 1328 can be a single processing unit or a number of processing units, and can include single or multiple computing units or multiple processing cores. The processor(s) 1328 can be implemented as one or more microprocessors, microcomputers, microcontrollers, digital signal processors, central processing units, state machines, logic circuitries, and/or any devices that manipulate signals based on operational instructions. For example, the processor(s) 1328 can be one or more hardware processors and/or logic circuits of any suitable type specifically programmed or configured to execute the algorithms and processes described herein. The processor(s) 1328 can be configured to fetch and execute computer-readable instructions stored in the computer-readable media 1330, which can program the processor(s) 1328 to perform the functions described herein.

The computer-readable media 1330 can include volatile and nonvolatile memory and/or removable and non-removable media implemented in any type of technology for storage of information, such as computer-readable instructions, data structures, program components, or other data. Such computer-readable media 1330 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1304, the computer-readable media 1330 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1330 can be used to store any number of functional components that are executable by the processor(s) 1328. In many implementations, these functional components comprise instructions or programs that are executable by the processors 1328 and that, when executed, specifically configure the one or more processors 1328 to perform the actions attributed above to the service provider 712 and/or payment processing service. Functional components stored in the computer-readable media 1330 can optionally include an interactive element component 1335 to generate the interactive element 140 and/or perform identity verification 180 based on the interactive element 140, an agent selection component 1336 to perform at least a portion of the selection 130 of the agent 160 and/or the agent device 165 from a broader set of agents and/or agent devices, an asset transfer component 1338 to process the transfer 155 and/or the transfer 195, and other components and data 1340.

Further, the one or more other components and data 1340 can include programs, drivers, etc., and the data used or generated by the functional components, such as any elements described herein as used by the asset exchange system 100, the network 105, user device 115, the asset management resource 118, the asset exchange service 125, the printer 150, the agent device 165, the asset management resource 168, the transaction processing service 175, the multi-factor authenticator 185, the trained ML model(s) 190, the user interface 210, the user interface 220, the user interface 310, the user interface 320, the user interface 410, the user interface 420, the user interface 510, the user interface 520, the user interface 610, the user interface 620, the reference data store 780, the server(s) 902, the network(s) 904, the user devices 906, the merchant device(s) 908(A)-908(N), the server(s) 910, the POS application 918, the reader device 922, the POS system 924, the server(s) 1002, the network(s) 1004, the user devices 1006, the user device(s) 1008(A)-908(N), the server(s) 1010, the payment application 1018, the data store(s) 1100, the asset storage 1102, the user account(s) 1104, the private blockchain 1119, the application programming interfaces (APIs) 1204, the network(s) 1202, or a combination thereof. Further, the server(s) 1304 can include many other logical, programmatic and physical components, of which those described above are merely examples that are related to the discussion herein.

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Modules are typically functional such that they that may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The computer-readable media 1330 can additionally include an operating system 1342 for controlling and managing various functions of the server(s) 1304.

The communication interface(s) 1334 can include one or more interfaces and hardware components for enabling communication with various other devices, such as over the network(s) 1306 or directly. For example, communication interface(s) 1334 can enable communication through one or more network(s) 1306, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 1306 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 1304 can further be equipped with various I/O devices 1332. Such I/O devices 1332 can include a display, various user interface controls (e.g., buttons, joystick, keyboard, mouse, touch screen, biometric or sensory input devices, etc.), audio speakers, connection ports and so forth.

In at least one example, the system 1300 can include a datastore 1344 that can be configured to store data that is accessible, manageable, and updatable. In some examples, the datastore 1344 can be integrated with the user device 1302 and/or the server(s) 1304. In other examples, as shown in FIG. 13, the datastore 1344 can be located remotely from the server(s) 1304 and can be accessible to the server(s) 1304. The datastore 1344 can comprise multiple databases and/or servers connected locally and/or remotely via the network(s) 1306.

In at least one example, the datastore 1344 can store user profiles, which can include merchant profiles, customer profiles, and so on.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider 712.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, etc.

In at least one example, the payee currency account(s) 170, the payee security asset account(s) 172, and the payee cryptocurrency account(s) 174, described above with reference to FIG. 1, can include or be associated with the merchant profiles and/or customer profiles described above.

Furthermore, in at least one example, the datastore 1344 can store inventory database(s) and/or catalog database(s). As described above, an inventory can store data associated with a quantity of each item that a merchant has available to the merchant. Furthermore, a catalog can store data associated with items that a merchant has available for acquisition. The datastore 1344 can store additional or alternative types of data as described herein.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to components described in the figures for convenience and ease of understanding. However, the methods illustrated are not limited to being performed using components described the figures and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

Example aspects of the disclosure include:

Aspect 1. A method for secure asset exchange implemented by at least one computing device of a payment service, the method comprising: receiving, by the at least one computing device, a request from an instance of a payment application associated with the payment service, wherein the request identifies an amount of a fiat currency to be exchanged for an amount of a cryptocurrency via an agent, wherein the instance of the payment application is executed on a user device associated with a user initiating the request; identifying, by the at least one computing device and based on context data associated with the request, the agent from a plurality of agents; generating, by the at least one computing device, an interactive element having data encoded therein to facilitate a secure exchange between the user and the agent; causing, by the at least one computing device and based on monitoring a location of the user device, the instance of the payment application to surface the interactive element in response to a determination that a location of the user device is within a threshold distance of a location of an agent device associated with the agent; receiving, by the at least one computing device, an indication of an interaction between the interactive element and the agent device associated with the agent; verifying, by the at least one computing device, respective identities of the user and the agent based on the indication of the interaction; receiving, by the at least one computing device, a confirmation that the amount of the fiat currency has been transferred between the user and the agent; and facilitating, by the at least one computing device, a transfer of the amount of the cryptocurrency between an account associated with the payment service and an account associated with the user in response to verifying the respective identities of the user and the agent.

Aspect 2. The method of Aspect 1, wherein the confirmation is indicative of the amount of the fiat currency having been transferred from the user to the agent, and wherein the transfer of the amount of the cryptocurrency is from the account associated with the payment service to the account associated with the user.

Aspect 3. The method of any of Aspects 1 to 2, wherein the confirmation is indicative of the amount of the fiat currency having been transferred from the agent to the user, and wherein the transfer of the amount of the cryptocurrency is from the account associated with the user to the account associated with the payment service.

Aspect 4. The method of any of Aspects 1 to 3, wherein the account associated with the payment service is also associated with the agent.

Aspect 5. The method of any of Aspects 1 to 4, further comprising: causing, by the at least one computing device and based on monitoring a location of the user device, an instance of a payment application to surface the interactive element at the user device in response to a determination that a location of the user device is within a threshold distance of a location of the agent device associated with the agent.

Aspect 6. The method of any of Aspects 1 to 5, wherein the context data includes at least one of user data about the user, agent data about the agent, one or more user preferences of the user, one or more agent preferences of the agent, one or more trust indications for the user, one or more trust indications for the agent, one or more social network indications for the user, one or more social network indications for the agent, one or more relationship indications for the user, one or more relationship indications for the agent, a location of the user, a location of the agent, the amount of the fiat currency, the amount of the cryptocurrency, a total amount of the cryptocurrency that is accessible to draw from for the secure exchange, or a combination thereof.

Aspect 7. The method of any of Aspects 1 to 6, further comprising: providing, from the at least one computing device to the user device associated with the user, at least one of an indication of an identity of the agent, a trust indication of the agent, or an indication of the location of the agent device relative to the location of the user device.

Aspect 8. The method of any of Aspects 1 to 7, wherein the context data includes an output of an analysis of information about the user and information about the agent, wherein the analysis uses at least one of a rule, a heuristic, or a machine learning model.

Aspect 9. The method of any of Aspects 1 to 8, wherein the data encoded in the interactive element identifies at least one of: a user account associated with the user, an asset account for the fiat currency associated with the user, an asset account for the cryptocurrency associated with the user, the fiat currency, the cryptocurrency, the amount of the fiat currency, the amount of the cryptocurrency, or a mechanism for facilitating the transfer of the amount of the cryptocurrency.

Aspect 10. The method of any of Aspects 1 to 9, further comprising: dynamically changing, by the at least one computing device, at least a subset of the data that is encoded in the interactive element over time.

Aspect 11. The method of any of Aspects 1 to 10, wherein the interactive element includes an optical glyph, wherein the data encoded in the interactive element is optically encoded in the optical glyph, wherein the interaction between the interactive element and the agent device includes an optical scan of the optical glyph by the agent device.

Aspect 12. The method of any of Aspects 1 to 11, wherein the interactive element includes a dataset to be transferred wirelessly using a short-range wireless communication interface, wherein providing the interactive element to the user device includes transmitting the dataset to the user device, wherein the interaction between the interactive element and the agent device includes a wireless transfer of the dataset from the user device to the agent device via the short-range wireless communication interface.

Aspect 13. The method of any of Aspects 1 to 12, wherein the cryptocurrency is associated with a non-fungible token (NFT).

Aspect 14. The method of any of Aspects 1 to 13, wherein facilitating the transfer of the amount of the cryptocurrency from the account associated with the payment service to the account associated with the user includes causing, by the at least one computing device, a record indicative of the transfer to be added to a payload of a block of a distributed ledger corresponding to the cryptocurrency.

Aspect 15. A method implemented by at least one computing device of a payment service, the method comprising: receiving, by the at least one computing device, a request associated with the payment service, wherein the request identifies an amount of a first asset to be exchanged for an amount of a second asset in a secure exchange between a first user and a second user; identifying, by the at least one computing device and based on context data associated with the request, the second user from a plurality of users; generating, by the at least one computing device, an interactive element having data encoded therein to facilitate the secure exchange between the first user and the second user; providing, by the at least one computing device, the interactive element to a first user device associated with the first user; receiving, by the at least one computing device, an indication of an interaction between the interactive element and a second user device associated with the second user; verifying, by the at least one computing device, respective identities of the first user and the second user based on the indication of the interaction; receiving, by the at least one computing device, a confirmation that the amount of the first asset has been transferred between the first user and the second user; and facilitating, by the at least one computing device, a transfer of the amount of the second asset between an account associated with the payment service and an account associated with the first user in response to verifying the respective identities of the first user and the second user.

Aspect 16. The method of Aspect 15, wherein the confirmation is indicative of the amount of the first asset having been transferred from the first user to the second user, and wherein the transfer of the amount of the second asset is from the account associated with the payment service to the account associated with the first user.

Aspect 17. The method of any of Aspects 15 to 16, wherein the confirmation is indicative of the amount of the first asset having been transferred from the second user to the first user, and wherein the transfer of the amount of the second asset is from the account associated with the first user to the account associated with the payment service.

Aspect 18. The method of any of Aspects 15 to 17, wherein the account associated with the payment service is also associated with the second user.

Aspect 19. The method of any of Aspects 15 to 18, further comprising: causing, by the at least one computing device and based on monitoring a location of the first user device, an instance of a payment application to surface the interactive element at the first user device in response to a determination that a location of the first user device is within a threshold distance of a location of the second user device associated with the second user.

Aspect 20. The method of any of Aspects 15 to 19, wherein the context data includes at least one of user data about the first user, agent data about the second user, one or more user preferences of the first user, one or more agent preferences of the second user, one or more trust indications for the first user, one or more trust indications for the second user, one or more social network indications for the first user, one or more social network indications for the second user, one or more relationship indications for the first user, one or more relationship indications for the second user, a location of the first user, a location of the second user, the amount of the first asset, the amount of the second asset, a total amount of the second asset that is accessible to draw from for the secure exchange, or a combination thereof.

Aspect 21. The method of any of Aspects 15 to 20, further comprising: providing, from the at least one computing device to the first user device associated with the first user, at least one of an indication of an identity of the second user, a trust indication of the second user, or an indication of a location of the second user device relative to a location of the first user device.

Aspect 22. The method of any of Aspects 15 to 21, wherein the context data includes an output of an analysis of information about the first user and information about the second user, wherein the analysis uses at least one of a rule, a heuristic, or a machine learning model.

Aspect 23. The method of any of Aspects 15 to 22, wherein the data encoded in the interactive element identifies at least one of: a user account associated with the first user, an asset account for the first asset associated with the first user, an asset account for the second asset associated with the first user, the first asset, the second asset, the amount of the first asset, the amount of the second asset, or a mechanism for facilitating the transfer of the amount of the second asset.

Aspect 24. The method of any of Aspects 15 to 23, further comprising: dynamically changing, by the at least one computing device, at least a subset of the data that is encoded in the interactive element over time.

Aspect 25. The method of any of Aspects 15 to 24, wherein the interactive element includes an optical glyph, wherein the data encoded in the interactive element is optically encoded in the optical glyph, wherein the interaction between the interactive element and the second user device includes an optical scan of the optical glyph by the second user device.

Aspect 26. The method of any of Aspects 15 to 25, wherein the interactive element includes a dataset to be transferred wirelessly using a short-range wireless communication interface, wherein providing the interactive element to the first user device includes transmitting the dataset to the first user device, wherein the interaction between the interactive element and the second user device includes a wireless transfer of the dataset from the first user device to the second user device via the short-range wireless communication interface.

Aspect 27. The method of any of Aspects 15 to 26, wherein the second asset is at least one of a cryptocurrency or a non-fungible token (NFT).

Aspect 28. The method of any of Aspects 15 to 27, wherein facilitating the transfer of the amount of the second asset from the account associated with the payment service to the account associated with the first user includes causing, by the at least one computing device, a record indicative of the transfer to be added to a payload of a block of a distributed ledger corresponding to the second asset.

Aspect 29. A system associated with a payment service, the system comprising: at least one memory storing instructions; and at least one processor configured to execute the instructions, wherein execution of the instructions by the at least one processor causes the at least one processor to: receive a request associated with the payment service, wherein the request identifies an amount of a first asset to be exchanged for an amount of a second asset in a secure exchange between a first user and a second user; identify, based on context data associated with the request, the second user from a plurality of users; generate an interactive element having data encoded therein to facilitate the secure exchange between the first user and the second user; provide the interactive element to a first user device; receive an indication of an interaction between the interactive element and a second user device associated with the second user; verify respective identities of the first user and the second user based on the indication of the interaction; receive a confirmation that the second user has received the amount of the first asset from the first user; and facilitate a transfer of the amount of the second asset from an account associated with the payment service to an account associated with the first user in response to receiving the confirmation.

Aspect 30. The system of Aspect 29, wherein the confirmation is indicative of the amount of the first asset having been transferred from the first user to the second user, and wherein the transfer of the amount of the second asset is from the account associated with the payment service to the account associated with the first user.

Aspect 31. The system of any of Aspects 29 to 30, wherein the confirmation is indicative of the amount of the first asset having been transferred from the second user to the first user, and wherein the transfer of the amount of the second asset is from the account associated with the payment service to the account associated with the payment service.

Aspect 32. The system of any of Aspects 29 to 31, wherein the account associated with the payment service is also associated with the second user.

Aspect 33. The system of any of Aspects 29 to 32, wherein execution of the instructions by the at least one processor causes the at least one processor to: cause, based on monitoring a location of the first user device, an instance of a payment application to surface the interactive element at the first user device in response to a determination that a location of the first user device is within a threshold distance of a location of the second user device associated with the second user.

Aspect 34. The system of any of Aspects 29 to 33, wherein the context data includes at least one of user data about the first user, agent data about the second user, one or more user preferences of the first user, one or more agent preferences of the second user, one or more trust indications for the first user, one or more trust indications for the second user, one or more social network indications for the first user, one or more social network indications for the second user, one or more relationship indications for the first user, one or more relationship indications for the second user, a location of the first user, a location of the second user, the amount of the first asset, the amount of the second asset, a total amount of the second asset that is accessible to draw from for the secure exchange, or a combination thereof.

Aspect 35. The system of any of Aspects 29 to 34, wherein execution of the instructions by the at least one processor causes the at least one processor to: provide, to the first user device associated with the first user, at least one of an indication of an identity of the second user, a trust indication of the second user, or an indication of a location of the second user device relative to a location of the first user device.

Aspect 36. The system of any of Aspects 29 to 35, wherein the context data includes an output of an analysis of information about the first user and information about the second user, wherein the analysis uses at least one of a rule, a heuristic, or a machine learning model.

Aspect 37. The system of any of Aspects 29 to 36, wherein the data encoded in the interactive element identifies at least one of: a user account associated with the first user, an asset account for the first asset associated with the first user, an asset account for the second asset associated with the first user, the first asset, the second asset, the amount of the first asset, the amount of the second asset, or a mechanism for facilitating the transfer of the amount of the second asset.

Aspect 38. The system of any of Aspects 29 to 37, wherein execution of the instructions by the at least one processor causes the at least one processor to: dynamically change at least a subset of the data that is encoded in the interactive element over time.

Aspect 39. The system of any of Aspects 29 to 38, wherein the interactive element includes an optical glyph, wherein the data encoded in the interactive element is optically encoded in the optical glyph, wherein the interaction between the interactive element and the second user device includes an optical scan of the optical glyph by the second user device.

Aspect 40. The system of any of Aspects 29 to 39, wherein the interactive element includes a dataset to be transferred wirelessly using a short-range wireless communication interface, wherein providing the interactive element to the first user device includes transmitting the dataset to the first user device, wherein the interaction between the interactive element and the second user device includes a wireless transfer of the dataset from the first user device to the second user device via the short-range wireless communication interface.

Aspect 41. The system of any of Aspects 29 to 40, wherein the second asset is at least one of a cryptocurrency or a non-fungible token (NFT).

Aspect 42. A non-transitory computer-readable medium having stored thereon instructions that, when executed by one or more processors, cause the one or more processors to: receive a request associated with the payment service, wherein the request identifies an amount of a first asset to be exchanged for an amount of a second asset in a secure exchange between a first user and a second user; identify, based on context data associated with the request, the second user from a plurality of users; generate an interactive element having data encoded therein to facilitate the secure exchange between the first user and the second user; provide the interactive element to a first user device; receive an indication of an interaction between the interactive element and a second user device associated with the second user; verify respective identities of the first user and the second user based on the indication of the interaction; receive a confirmation that the second user has received the amount of the first asset from the first user; and facilitate a transfer of the amount of the second asset from an account associated with the payment service to an account associated with the first user in response to receiving the confirmation.

Aspect 43: The non-transitory computer-readable medium of Aspect 42, further comprising operations according to any of Aspects 2 to 14, 16 to 28, and/or 30 to 41.

Aspect 44. An apparatus comprising: means for receiving, by the at least one computing device, a request associated with the payment service, wherein the request identifies an amount of a first asset to be exchanged for an amount of a second asset in a secure exchange between a first user and a second user; means for identifying, by the at least one computing device and based on context data associated with the request, the second user from a plurality of users; means for generating, by the at least one computing device, an interactive element having data encoded therein to facilitate the secure exchange between the first user and the second user; means for providing, by the at least one computing device, the interactive element to a first user device associated with the first user; means for receiving, by the at least one computing device, an indication of an interaction between the interactive element and a second user device associated with the second user; means for verifying, by the at least one computing device, respective identities of the first user and the second user based on the indication of the interaction; means for receiving, by the at least one computing device, a confirmation that the amount of the first asset has been transferred between the first user and the second user; and means for facilitating, by the at least one computing device, a transfer of the amount of the second asset between an account associated with the payment service and an account associated with the first user in response to verifying the respective identities of the first user and the second user.

Aspect 45: The apparatus of Aspect 44, further comprising means for performing operations according to any of Aspects 2 to 14, 16 to 28, and/or 30 to 41.

What is claimed is:

1. A method for secure asset exchange implemented by at least one computing device of a payment service, the method comprising:
   receiving, by the at least one computing device, a request from an instance of a payment application associated with the payment service, wherein the request identifies an amount of a fiat currency to be exchanged for an amount of a cryptocurrency via an agent, wherein the instance of the payment application is executed on a user device associated with a user initiating the request;
   monitoring, by the at least one computing device, a user geographic location of the user device over time based on user positioning data from a first positioning receiver of the user device;
   monitoring, by the at least one computing device as a first factor of authentication, an agent geographic location of an agent device of the agent over time based on agent positioning data from a second positioning receiver of the user device;
   selecting the agent from a plurality of agents, by the at least one computing device, based on context data and based on the user geographic location of the user device being within a first threshold distance of the agent geographic location of the agent device of the agent, wherein the context data indicates that at least the amount of the cryptocurrency is accessible to the agent through an account associated with the payment service;
   generating, by the at least one computing device, an interactive element having encrypted data encoded therein to facilitate a secure exchange between the user and the agent;
   determining, by the at least one computing device and based on the monitoring of the user geographic location and the agent geographic location over time, that the user geographic location of the user device is within a second threshold distance of the agent geographic location of the agent device, wherein the second threshold distance is shorter than the first threshold distance;
   causing, by the at least one computing device, the instance of the payment application to surface the interactive element in response to the determination that the user geographic location of the user device is within the second threshold distance of the agent geographic location of the agent device;
   receiving, by the at least one computing device as a second factor of authentication, an indication of an interaction between the interactive element and the agent device associated with the agent, wherein the interaction between the interactive element and the agent device includes the agent device decrypting the encrypted data;
   verifying, by the at least one computing device and based on the first factor of authentication and the second factor of authentication, (i) respective identities of the user and the agent and (ii) that the user geographic location of the user device is within the second threshold distance of the agent geographic location of the agent device;
   receiving, by the at least one computing device, a confirmation that the amount of the fiat currency has been transferred between the user and the agent; and
   facilitating, by the at least one computing device and using a new block appended to a distributed ledger, a transfer of the amount of the cryptocurrency between the account associated with the payment service and an account associated with the user in response to verifying the respective identities of the user and the agent and that the user geographic location is within the second threshold distance of the agent geographic location.

2. The method of claim 1, wherein the context data includes at least one of user data about the user, agent data about the agent, one or more user preferences of the user, one or more agent preferences of the agent, one or more trust indications for the user, one or more trust indications for the agent, one or more social network indications for the user, one or more social network indications for the agent, one or more relationship indications for the user, one or more relationship indications for the agent, the amount of the fiat currency, the amount of the cryptocurrency, a total amount of the cryptocurrency that is accessible to draw from for the secure exchange, or a combination thereof.

3. The method of claim 1, further comprising:
   providing, from the at least one computing device to the user device associated with the user, at least one of an indication of an identity of the agent, a trust indication of the agent, an indication of the agent geographic location of the agent device, or an indication of the user geographic location of the user device.

4. A method implemented by at least one computing device of a payment service, the method comprising:

receiving, by the at least one computing device, a request associated with the payment service, wherein the request identifies an amount of a first asset to be exchanged for an amount of a second asset in a secure exchange between a first user and a second user;

monitoring, by the at least one computing device, a first user geographic location of a first user device over time based on first user positioning data from a first positioning receiver of the first user device, wherein the first user device is associated with the first user;

monitoring, by the at least one computing device as a first factor of authentication, a second user geographic location of a second user device over time based on second user positioning data from a second positioning receiver of the second user device, wherein the second user device is associated with the second user;

selecting the second user from a plurality of users, by the at least one computing device based on context data and based on the first user geographic location of the first user device being within a first threshold distance of the second user geographic location of the second user device, wherein the context data indicates that at least the amount of the second asset is accessible through an account associated with the payment service;

generating, by the at least one computing device, an interactive element having encrypted data encoded therein to facilitate the secure exchange between the first user and the second user;

determining, by the at least one computing device and based on the monitoring of the first user geographic location and the second user geographic location over time, that the first user geographic location of the first user device is within a second threshold distance of the second user geographic location of the second user device, wherein the second threshold distance is shorter than the first threshold distance;

providing, by the at least one computing device and in response to the determination that the first user geographic location of the first user device is within the second threshold distance of the second user geographic location of the second user device, the interactive element to the first user device;

receiving, by the at least one computing device as a second factor of authentication, an indication of an interaction between the interactive element and the second user device while the first user geographic location of the first user device is within a second threshold distance of the second user geographic location of the second user device, wherein the interaction between the interactive element and the second user device includes the second user device decrypting the encrypted data;

verifying, by the at least one computing device and based on the first factor of authentication and the second factor of authentication, (i) respective identities of the first user and the second user and (ii) that the first user geographic location of the first user device is within the second threshold distance of the second user geographic location of the second user device;

receiving, by the at least one computing device, a confirmation that the amount of the first asset has been transferred between the first user and the second user; and facilitating, by the at least one computing device and using a new block appended to a distributed ledger, a transfer of the amount of the second asset between the account associated with the payment service and an account associated with the first user in response to verifying the respective identities of the first user and the second user and that the first user geographic location is within the second threshold distance of the second user geographic location.

5. The method of claim 4, wherein the confirmation is indicative of the amount of the first asset having been transferred from the first user to the second user, and wherein the transfer of the amount of the second asset is from the account associated with the payment service to the account associated with the first user.

6. The method of claim 4, wherein the confirmation is indicative of the amount of the first asset having been transferred from the second user to the first user, and wherein the transfer of the amount of the second asset is from the account associated with the first user to the account associated with the payment service.

7. The method of claim 4, wherein the account associated with the payment service is also associated with the second user.

8. The method of claim 4, further comprising:
causing, by the at least one computing device and based on monitoring the first user geographic location of the first user device, an instance of a payment application to surface the interactive element at the first user device in response to a determination that the first user geographic location of the first user device is within the second threshold distance of the second user geographic location of the second user device.

9. The method of claim 4, wherein the context data includes at least one of user data about the first user, agent data about the second user, one or more user preferences of the first user, one or more agent preferences of the second user, one or more trust indications for the first user, one or more trust indications for the second user, one or more social network indications for the first user, one or more social network indications for the second user, one or more relationship indications for the first user, one or more relationship indications for the second user, the amount of the first asset, the amount of the second asset, a total amount of the second asset that is accessible to draw from for the secure exchange, or a combination thereof.

10. The method of claim 4, further comprising:
providing, from the at least one computing device to the first user device associated with the first user, at least one of an indication of an identity of the second user, a trust indication of the second user, an indication of the second user geographic location of the second user device, or an indication of the first user geographic location of the first user device.

11. The method of claim 4, wherein the context data includes an output of an analysis of information about the first user and information about the second user, wherein the analysis uses at least one of a rule, a heuristic, or a trained machine learning model.

12. The method of claim 4, wherein the encrypted data encoded in the interactive element identifies at least one of: a user account associated with the first user, an asset account for the first asset associated with the first user, an asset account for the second asset associated with the first user, the first asset, the second asset, the amount of the first asset, the amount of the second asset, or a mechanism for facilitating the transfer of the amount of the second asset.

13. The method of claim 4, further comprising:
dynamically modifying, by the at least one computing device, the interactive element over time to dynamically change at least a subset of the encrypted data that is encoded in the interactive element over time.

14. The method of claim 4, wherein the interactive element includes an optical glyph, wherein the encrypted data encoded in the interactive element is optically encoded in the optical glyph, wherein the interaction between the interactive element and the second user device includes an optical scan of the optical glyph by the second user device.

15. The method of claim 4, wherein the interactive element includes a dataset to be transferred wirelessly using a short-range wireless communication interface, wherein providing the interactive element to the first user device includes transmitting the dataset to the first user device, wherein the interaction between the interactive element and the second user device includes a wireless transfer of the dataset from the first user device to the second user device via the short-range wireless communication interface.

16. The method of claim 4, wherein the second asset is at least one of a cryptocurrency or a non-fungible token (NFT).

17. The method of claim 4, wherein facilitating the transfer of the amount of the second asset from the account associated with the payment service to the account associated with the first user includes causing, by the at least one computing device, a record indicative of the transfer to be added to a payload of a block of a distributed ledger corresponding to the second asset.

18. A system associated with a payment service, the system comprising:
   at least one memory storing instructions; and
   at least one processor configured to execute the instructions, wherein execution of the instructions by the at least one processor causes the at least one processor to:
      receive a request associated with the payment service, wherein the request identifies an amount of a first asset to be exchanged for an amount of a second asset in a secure exchange between a first user and a second user;
      monitor a first user geographic location of a first user device over time based on first user positioning data from a first positioning receiver of the first user device, wherein the first user device is associated with the first user;
      monitor, as a first factor of authentication, a second user geographic location of a second user device over time based on second user positioning data from a second positioning receiver of the second user device, wherein the second user device is associated with the second user;
      select the second user from a plurality of users, based on context data and based on the first user geographic location of the first user device being within a first threshold distance of the second user geographic location of the second user device, wherein the context data indicates that at least the amount of the second asset is accessible through an account associated with the payment service;
      generate an interactive element having encrypted data encoded therein to facilitate the secure exchange between the first user and the second user;
      determine, based on the monitoring of the first user geographic location and the second user geographic location over time, that the first user geographic location of the first user device is within a second threshold distance of the second user geographic location of the second user device, wherein the second threshold distance is shorter than the first threshold distance;
      provide, in response to the determination that the first user geographic location of the first user device is within the second threshold distance of the second user geographic location of the second user device, the interactive element to the first user device;
      receive, as a second factor of authentication, an indication of an interaction between the interactive element and the second user device while the first user geographic location of the first user device is within a second threshold distance of the second user geographic location of the second user device, wherein the distance interaction between the interactive element and the second user device includes the second user device decrypting the encrypted data;
      verify, based on the first factor of authentication and the second factor of authentication, (i) respective identities of the first user and the second user and (ii) that first user geographic location of the first user device is within the second threshold distance of the second user geographic location of the second user device;
      receive a confirmation that the second user has received the amount of the first asset from the first user; and
      facilitate, and using a new block appended to a distributed ledger, a transfer of the amount of the second asset from the account associated with the payment service to an account associated with the first user in response to receiving the confirmation.

19. The system of claim 18, wherein the confirmation is indicative of the amount of the first asset having been transferred from the first user to the second user, and wherein the transfer of the amount of the second asset is from the account associated with the payment service to the account associated with the first user.

20. The system of claim 18, wherein the confirmation is indicative of the amount of the first asset having been transferred from the second user to the first user, and wherein the transfer of the amount of the second asset is from the account associated with the first user to the account associated with the payment service.

* * * * *

UNITED STATES PATENT AND TRADEMARK OFFICE
CERTIFICATE OF CORRECTION

| | |
|---|---|
| PATENT NO. | : 12,277,562 B1 |
| APPLICATION NO. | : 17/865158 |
| DATED | : April 15, 2025 |
| INVENTOR(S) | : Rocky Medure and Christopher Walker |

Page 1 of 1

It is certified that error appears in the above-identified patent and that said Letters Patent is hereby corrected as shown below:

In the Claims

In Claim 18, Column 78, Line 26:
"the distance interaction between the interactive ele-"
Should be as follows:
"the interaction between the interactive ele-"

Signed and Sealed this
Twenty-fourth Day of June, 2025

Coke Morgan Stewart
*Acting Director of the United States Patent and Trademark Office*